United States Patent
Ota et al.

(10) Patent No.: US 11,637,575 B2
(45) Date of Patent: Apr. 25, 2023

(54) WIRELESS COMMUNICATION APPARATUS AND WIRELESS COMMUNICATION METHOD

(71) Applicant: NIPPON TELEGRAPH AND TELEPHONE CORPORATION, Tokyo (JP)

(72) Inventors: Atsushi Ota, Musashino (JP); Kota Ito, Musashino (JP); Kazuto Goto, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 292 days.

(21) Appl. No.: 17/257,269

(22) PCT Filed: Jun. 26, 2019

(86) PCT No.: PCT/JP2019/025362
§ 371 (c)(1),
(2) Date: Dec. 30, 2020

(87) PCT Pub. No.: WO2020/008974
PCT Pub. Date: Jan. 9, 2020

(65) Prior Publication Data
US 2021/0281453 A1    Sep. 9, 2021

(30) Foreign Application Priority Data
Jul. 4, 2018 (JP) .............................. JP2018-127881

(51) Int. Cl.
*H04B 1/10* (2006.01)
*H04L 27/26* (2006.01)
(Continued)

(52) U.S. Cl.
CPC .......... *H04B 1/10* (2013.01); *H04L 27/26524* (2021.01); *H04L 5/001* (2013.01); *H04L 5/0048* (2013.01); *H04W 72/0453* (2013.01)

(58) Field of Classification Search
CPC ........................... H04L 27/26524; H04B 1/10
See application file for complete search history.

(56) References Cited

U.S. PATENT DOCUMENTS

2019/0020384 A1* 1/2019 Kamiya ................. H04B 7/005

OTHER PUBLICATIONS

Atsushi, Oota et al., Wireless Backhaul for Train-type Moving Cell with Time-domain Beam-forming, IEICE Technical Report, 2015, vol. 115,No. 369, pp. 169-174.
(Continued)

*Primary Examiner* — Kevin C. Harper

(57) ABSTRACT

A first wireless communication apparatus assigns a pilot signal without an effective signal component at least in an adjacent frequency component to a generated transmit signal, and transmits the transmit signal including the pilot signal. A second wireless communication apparatus converts the received signal or a frequency-converted signal obtained by frequency conversion of the signal into a signal in a frequency domain, sets an approximate value of the distance between the second wireless communication apparatus and the first wireless communication apparatus, calculates a coefficient γk, based on the approximate value of the distance, the effective bandwidth, the speed of light, the number of FFT points, and the frequency component number, extracts a signal in the frequency domain, generates a phase noise compensated sampling signal, and reproduces data transmitted by the first wireless communication apparatus.

7 Claims, 27 Drawing Sheets

(51) Int. Cl.
*H04L 5/00* (2006.01)
*H04W 72/04* (2009.01)
*H04W 72/0453* (2023.01)

(56) References Cited

OTHER PUBLICATIONS

Atsushi, Oota et al., Digital Assisted Analog Beamforming (DAABF) on Miller Wave Massive Antenna Array—Basic Concept of DAABF—, IEICE Technical Report, 2016, vol. 116, No. 383, pp. 135-140.

* cited by examiner

WIRELESS COMMUNICATION APPARATUS AND WIRELESS COMMUNICATION METHOD

CROSS-REFERENCE TO RELATED APPLICATIONS

This application is a 371 U.S. National Phase of International Application No. PCT/JP2019/025362, filed on Jun. 26, 2019, which claims priority to Japanese Application No. 2018-127881 filed on Jul. 4, 2018. The entire disclosures of the above applications are incorporated herein by reference.

TECHNICAL FIELD

The present invention relates to a wireless communication apparatus and a wireless communication method.

BACKGROUND ART

High-performance mobile communication terminals, such as smart phones, are currently being widely distributed in an accelerated manner. Mobile telephones have transitioned to the fourth generation mobile communication from the third generation mobile communication, and further research and development of the fifth generation mobile communication (commonly referred to as "5G") are progressing. In 5G, a target value of a transmission rate is set to be 10 Gbit/s (gigabits per second) or higher, and such large capacity of communication needs to be performed in small cells to achieve efficient offloading of traffic. It is assumed that microwave bands with low frequencies are utilized to allow long-range propagation in macro cells. However, in consideration of a current situation of microwave bands where frequency resources have been already depleted, it is assumed to utilize quasi-millimeter wave bands or millimeter wave bands having relatively high frequencies in small cells in which communications in relatively short distances are assumed.

FIG. 17 is a diagram illustrating a circuit configuration of a wireless station apparatus of related art. As illustrated in FIG. 17, the wireless station apparatus 60 includes a transmitter 61, a receiver 65, an interface circuit 67, a Medium Access Control (MAC) layer processing circuit 68, and a communication control circuit 41. The wireless station apparatus 60 inputs/outputs data from/to an external device or a network via the interface circuit 67. The interface circuit 67 detects data to be transferred on the wireless circuit from the data input, and outputs the detected data to the MAC layer processing circuit 68. The MAC layer processing circuit 68 performs processing related to the MAC layer in accordance with an instruction from the communication control circuit 41 configured to perform management control of the operation of the entire wireless station apparatus 60. Here, processing related to the MAC layer includes the conversion of data input and output by the interface circuit 67 and data or wireless packets transmitted and/or received on the wireless circuit, assigning of header information for the MAC layer, and the like. In MIMO transmission, for spatially multiplexing and transmitting signals to one wireless station apparatus 60, signal sequences of a plurality of systems are output from the MAC layer processing circuit 68 to the transmitter 61.

FIG. 18 is a schematic block diagram illustrating an example of a configuration of the transmitter 61 in the wireless station apparatus 60. As illustrated in FIG. 18, the transmitter 61 includes: transmit signal processing circuits 811-1 to 811-$N_{SDM}$ (where $N_{SDM}$ is an integer of 2 or greater); addition synthesis circuits 812-1 to 812-$N_{Ant}$ (where $N_{Ant}$ is an integer of 2 or greater); Inverse Fast Fourier Transform (IFFT) & Guard Interval (GI) assigning circuits 813-1 to 813-$N_{Ant}$; D/A (digital to analog) converters 814-1 to 814-$N_{Ant}$; a local oscillator 815; mixers 816-1 to 816-$N_{Ant}$; filters 817-1 to 817-$N_{Ant}$; high power amplifiers (HPA) 818-1 to 818-$N_{Ant}$; antenna elements 819-1 to 819-$N_{Ant}$; and a transmission weight processing unit 840. The transmit signal processing circuits 811-1 to 811-$N_{SDM}$ and the transmission weight processing unit 840 are connected to the communication control circuit 41 illustrated in FIG. 18.

The transmission weight processing unit 840 includes a channel information acquisition circuit 841, a channel information storage circuit 842, and a transmission weight calculation circuit 843. Here, the subscript $N_{SDM}$ of the transmit signal processing circuits 811-1 to 811-$N_{SDM}$ in FIG. 18 represents the number of multiplexing for performing spatial multiplexing at the same time. The subscript $N_{Ant}$ of the circuits from the addition synthesis circuits 812-1 to 812-$N_{Ant}$ to the antenna elements 819-1 to 819-$N_{Ant}$ represents the number of antenna elements provided in the wireless station apparatus 60.

In the configuration illustrated in FIG. 18, because a single wireless station apparatus 60 spatially multiplexes and transmits signals to other wireless station apparatuses 60, signal sequences of a plurality of systems are input from the MAC layer processing circuit 68 to the transmitter 61, and the input signal sequences of a plurality of systems are input to the transmit signal processing circuits 811-1 to 811-$N_{SDM}$. The transmit signal processing circuits 811-1 to 811-$N_{SDM}$ perform modulation processing on the data (data input #1 to #$N_{SDM}$) to be transmitted to a destination wireless station apparatus 60 when the data to be transmitted (wireless packets) is input from the MAC layer processing circuit 68 on a wireless circuit.

Here, modulation processing is performed on signals of each signal sequence for each subcarrier, for example, in a case of using an Orthogonal frequency-division multiplexing (OFDM) modulation technique. In addition, a baseband signal after the modulation processing is multiplied by a transmission weight for each subcarrier. The signal multiplied by the transmission weight corresponding to each of the antenna elements 819-1 to 819-$N_{Ant}$ is subjected to a remaining signal processing as necessary, and the signal is input from each of the transmit signal processing circuits 811-1 to 811-$N_{SDM}$ to the addition synthesis circuits 812-1 to 812-$N_{Ant}$ as a signal in the frequency domain of the transmit signal in the baseband.

The signal input to the addition synthesis circuits 812-1 to 812-$N_{Ant}$ is synthesized for each subcarrier. The synthesized signal is converted from a signal on the frequency axis to a signal on the time axis in the IFFT & GI assigning circuits 813-1 to 813-$N_{Ant}$, is further subjected to processing such as insertion of a guard interval or waveform shaping in between OFDM symbols (between blocks of block transmission in a case of SC-FDE), and is converted for each of the antenna elements 819-1 to 819-$N_{Ant}$ from digital sampling data to analog signals in the baseband at the D/A converters 814-1 to 814-$N_{Ant}$. Further, each analog signal is multiplied by a local oscillating signal input from the local oscillator 815 by the mixers 816-1 to 816-$N_{Ant}$ and up-converted to a wireless frequency signal. Here, the up-converted signal angle includes a signal in a region outside of the band of the channel to be transmitted, so that a signal outside of the band is removed at the filters 817-1 to 817-$N_{Ant}$ to generate a signal to be transmitted. The generated signal is amplified by the high power amplifiers 818-1 to 818-N$_{Ant}$ and transmitted from the antenna elements 819-1 to 819-N$_{Ant}$.

FIG. 19 is a schematic block diagram illustrating an example of a configuration of the receiver 65 in the wireless station apparatus 60. As illustrated in FIG. 19, the receiver 65 includes: antenna elements 851-1 to 851-N$_{Ant}$; low noise amplifiers (LNA) 852-1 to 852-N$_{Ant}$; a local oscillator 853: mixers 854-1 to 854-N$_{Ant}$; filters 855-1 to 855-N$_{Ant}$; A/D (analog to digital) converters 856-1 to 856-N$_{Ant}$; Fast Fourier Transform (FFT) circuits 857-1 to 857-N$_{Ant}$; receive signal processing circuits 845-1 to 845-N$_{SDM}$; and a reception weight processing unit 844. The receive signal processing circuits 845-1 to 845-N$_{SDM}$ and the reception weight processing unit 844 are connected to the communication control circuit 41 illustrated in FIG. 17. The reception weight processing unit 844 includes a channel information estimation circuit 846 and a reception weight calculation circuit 847.

First, a signal received at the antenna elements 851-1 to 851-N$_{Ant}$ is amplified by the low noise amplifiers 852-1 to 852-N$_{Ant}$. The amplified signal and a local oscillating signal output from the local oscillator 853 are multiplied by the mixers 854-1 to 854-N$_{Ant}$, and the amplified signal is down-converted from the wireless frequency signal to the baseband signal. The down-converted signal also includes signals outside of the frequency band to be received, so that the filters 855-1 to 855-N$_{Ant}$ remove out-of-band components. The signal from which the out-of-band components have been removed is converted to a digital baseband signal by the A/D converters 856-1 to 856-N$_{Ant}$. For example, in a case that OFDM is used, the digital baseband signal is input to the FFT circuits 857-1 to 857-N$_{Ant}$, and a signal on the time axis is converted (separated into a signal of each subcarrier) to a signal on the frequency axis at a predetermined symbol timing determined by a circuit for timing detection of which description is omitted herein. The signal separated into each subcarrier is input to the receive signal processing circuits 845-1 to 845-N$_{SDM}$, and is also input to the channel information estimation circuit 846.

In the channel information estimation circuit 846, a channel vector of channel information between the antenna elements 819-1 to 819-N$_{Ant}$ on the transmitting station side and the antenna elements 851-1 to 851-N$_{Ant}$ on the receiving station side are estimated for each subcarrier, based on a known signal for channel estimation separated into each subcarrier (such as a preamble signal assigned to the head of the wireless packet), and the estimation result is output to the reception weight calculation circuit 847. In the reception weight calculation circuit 847, the reception weight to be multiplied is calculated for each subcarrier, based on the input channel information. For this reception weight, for example, a ZF type pseudo-inverse is utilized as described above, or an MMSE type reception weight matrix is utilized. At this time, the reception weight vectors for synthesizing the signals received at each of the antenna elements 851-1 to 851-N$_{Ant}$ are different from each other for each signal sequence, correspond to a row vector, such as the ZF type pseudo-inverse matrix or the MMSE type reception weight matrix described above, and are input to the receive signal processing circuits 845-1 to 845-N$_{SDM}$ corresponding to the signal sequence to be extracted.

In the receive signal processing circuits 845-1 to 845-N$_{SDM}$, the reception weight input from the reception weight calculation circuit 847 is multiplied by the signal input from the FFT circuits 857-1 to 857-N$_{Ant}$ for each subcarrier, and the signals received at each of the antenna elements 851-1 to 851-N$_{Ant}$ are added and synthesized for each subcarrier. The receive signal processing circuits 845-1 to 845-N$_{SDM}$ perform demodulation processing on the added and synthesized signals, and output the reproduced data to the MAC layer processing circuit 68.

Here, different signal processing of signal sequences are performed in different receive signal processing circuits 845-1 to 845-N$_{SDM}$. MLD or simple MLD using QR decomposition or the like may be used as the receive signal processing across the plurality of receive signal processing circuits 845-1 to 845-N$_{SDM}$. The MAC layer processing circuit 68 performs processing related to the MAC layer (e.g., conversion of data input and output to and from the interface circuit 67, and data transmitted and/or received on the wireless circuit, i.e., wireless packets, termination of header information of the MAC layer, or the like). The receive data processed by the MAC layer processing circuit 68 is output to an external device or a network via the interface circuit 67. The communication control circuit 41 manages control related to the overall communication, such as overall timing control.

The biggest features of the above configuration described above is that different weight is used for each frequency component in multiplication processing of the transmission and/or reception weight performed by the receive signal processing circuits 845-1 to 845-N$_{SDM}$ and the transmit signal processing circuits 811-1 to 811-N$_{SDM}$, signals of different subcarriers are mutually orthogonal, and signals assigned to a predetermined subcarrier on the transmitting side are separated into signals for each subcarrier by the FFT circuits 857-1 to 857-N$_{Ant}$ without leaking into the other subcarriers, which is typical in a case that, corresponding to different weight for each frequency component, an OFDM modulation scheme is used that implements the FFT circuits 857-1 to 857-N$_{Ant}$ configured to convert a signal on the time axis into a signal on the frequency axis (separate into a signal of each subcarrier) and IFFT & GI assigning circuits 813-1 to 813-N$_{Ant}$ configured to convert a signal on the frequency axis to a signal on the time axis. As such, it has a feature that a processing is performed assuming that there is no signal interference between subcarriers.

Non Patent Literature (NPL) 1 describes a configuration different from the configuration described above. In a configuration of a wireless station apparatus described in NPL 1, the configuration of the wireless station apparatus takes an equivalent configuration as the wireless station apparatus 60 illustrated in FIG. 17. The difference from FIG. 17 is only that the transmitter 61 is replaced with a transmitter 62a, the receiver 65 is replaced with a receiver 66a, and the communication control circuit 41 is replaced with a communication control circuit 42, so that the overall functions and features are in accordance with FIG. 17, and the details of the drawings and descriptions are omitted herein.

FIG. 20 is a schematic block diagram illustrating an example of a configuration of a transmitter of a wireless station apparatus according to NPL 1. As illustrated in FIG. 20, the transmitter 62a includes: transmit signal processing circuits 711-1 to 711-N$_{SDM}$; addition synthesis circuits 812-1 to 812-N$_{Ant}$; IFFT & GI assigning circuits 313-1 to 313-N$_{SDM}$; D/A converters 814-1 to 814-N$_{Ant}$; a local oscillator 815; mixers 816-1 to 816-N$_{Ant}$; filters 817-1 to 817-N$_{Ant}$; high power amplifiers 818-1 to 818-N$_{Ant}$; antenna elements 819-1 to 819-N$_{Ant}$; a transmission weight processing unit 740; and time axis transmission weight multiplication circuits 761-1 to 761-N$_{SDM}$. The transmit signal processing circuits 711-1 to 711-N$_{SDM}$ and the transmission weight processing unit 740 are connected to the communication control circuit 42.

The transmission weight processing unit 740 includes a channel information acquisition circuit 741, a channel information storage circuit 742, and a time axis transmission weight calculation circuit 743. The subscript N$_{Ant}$ of the circuits such as the addition synthesis circuits 812-1 to 812-N$_{Ant}$ to the antenna elements 819-1 to 819-N$_{Ant}$ represents the number of antenna elements provided in the wireless station apparatus 60. For the difference from FIG. 18, in FIG. 18, IFFT & GI assigning circuits 813-1 to 813-N$_{Ant}$ are provided for each antenna system, and IFFT processing or the like is performed for each antenna system, and the multiplication of the transmission weight is performed in the frequency domain. However, in the transmit signal processing circuits 711-1 to 711-N$_{SDM}$, the transmission weight is basically not multiplied, and time axis transmission weight multiplication circuits 761-1 to 761-N$_{SDM}$ for multiplying the transmission weight in the time domain and the transmission weight processing unit 740 configured to perform signal processing of the transmission weight associated with the this are implemented instead of the transmission weight processing unit 840.

In the technique according to NPL 1, because a single wireless station apparatus 60 spatially multiplexes and transmits signals to other wireless station apparatuses 60, signal sequences of a plurality of systems are input from the MAC layer processing circuit 68 to the transmitter 62*a*, and the input signal sequences of a plurality of systems are input to the transmit signal processing circuits 711-1 to 711-N$_{SDM}$. The transmit signal processing circuits 711-1 to 711-N$_{SDM}$ perform modulation processing on the data (data input #1 to #N$_{SDM}$) to be transmitted to a destination wireless station apparatus 60 when the data to be transmitted (wireless packets) is input from the MAC layer processing circuit 68 on a wireless circuit.

Here, modulation processing is performed on signals of each signal sequence for each subcarrier, for example, in a case of using an OFDM modulation scheme. Here, the multiplication of the transmission weight is basically not performed, but basically a signal processing necessary for transmission of the wireless signal, such as modulation processing of each signal sequence is performed. After performing such signal processing, the signal is input from each of the transmit signal processing circuits 711-1 to 711-N$_{SDM}$ to the IFFT & GI assigning circuits 313-1 to 313-N$_{SDM}$ as a signal in the frequency domain of the transmit signal in the baseband. In the IFFT & GI assigning circuits 313-1 to 313-N$_{SDM}$, the signal in the frequency domain input from the transmit signal processing circuits 711-1 to 711-N$_{SDM}$ is subjected to IFFT processing, a guard interval is further inserted into the IFFT processed signal, the interval-inserted signal is subjected to processing such as waveform shaping as necessary, and the processed signal is converted to a signal in the time domain.

These signals are input to the time axis transmission weight multiplication circuits 761-1 to 761-N$_{SDM}$, in which the time axis transmission weight per signal sequence is multiplied for each sampling data. For the time axis transmission weight, information for calculating the reception weight in the reception system, information on which the information for calculating the reception weight in the reception system has been subjected to calibration processing, or the like, is collected by the channel information acquisition circuit 741, and the channel information storage circuit 742 stores this necessary information. Based on the information stored in the channel information storage circuit 742, the time axis transmission weight calculation circuit 743 calculates the transmission weight in the time domain addressed to the wireless station apparatus 60, which is a communication partner. The processing of the transmission weight processing unit 740 is basically to calculate the transmission weight in the time domain, and, in addition to this configuration, the time axis transmission weight may be calculated by performing calibration processing for correcting the rotation amount of the complex phase for each antenna element during transmission/reception, on the reception weight in the time domain calculated on the receiving side. With such a function, the configuration of the transmission weight processing unit 740 may be any configuration. The time axis transmission weight may be updated sequentially, or in a case that time variations of the channel can be ignored, the weight calculated once may be stored and used again.

In this manner, the signals multiplied by the transmission weight in the time domain for each antenna element system are input to the addition synthesis circuits 812-1 to 812-N$_{Ant}$ over the signal sequences for spatial multiplexing, and are added and synthesized for each sampling data. The synthesized signal is converted for each of the antenna elements 819-1 to 819-N$_{Ant}$ from digital sampling data to analog signals in the baseband at the D/A converters 814-1 to 814-N$_{Ant}$. Further, each analog signal is multiplied by a local oscillating signal input from the local oscillator 815 by the mixers 816-1 to 816-N$_{Ant}$ and up-converted to a wireless frequency signal. Here, the up-converted signal includes a signal in a region outside of the band of the channel to be transmitted, so that a signal outside of the band is removed at the filters 817-1 to 817-N$_{Ant}$ to generate a signal to be transmitted. The generated signal is amplified by the high power amplifiers 818-1 to 818-N$_{Ant}$ and transmitted from the antenna elements 819-1 to 819-N$_{Ant}$. In a case that the wireless station apparatus is a base station apparatus, the communication control circuit 42 manages which terminal station apparatus the destination station is, and specifies which time axis transmission and/or reception weight to use to communicate with a plurality of terminal station apparatuses.

Note that the transmission weight of the time axis used in the technique described in NPL 1 corresponds to an approximate solution of a first right singular vector for each channel matrix from the antenna elements of a wireless station apparatus 60 toward the antenna elements of a wireless station apparatus 60, which is a communication partner. Note that, in the technique described in NPL 1, the signals of the N$_{SDM}$ systems output from the time axis transmission weight multiplication circuits 761-1 to 761-N$_{SDM}$ are synthesized in the addition synthesis circuits 812-1 to 812-N$_{Ant}$, and the following D/A converters 814-1 to 814-N$_{Ant}$ to the antenna elements 819-1 to 819-N$_{Ant}$ are used together, but the signals may be implemented individually from the following D/A converters 814-1 to 814-N$_{Ant}$ to the antenna elements 819-1 to 819-N$_{Ant}$ without being synthesized at the addition synthesis circuits 812-1 to 812-N$_{Ant}$, and a subarray may be configured by the antenna elements 819-1 to 819-N$_{Ant}$ in each of the antennas.

FIG. 21 is a schematic block diagram illustrating an example of a configuration of a receiver of a wireless station apparatus according to NPL 1. As illustrated in FIG. 21, the receiver 66*a* includes: antenna elements 851-1 to 851-N$_{Ant}$; low noise amplifiers 852-1 to 852-N$_{Ant}$; a local oscillator 853; mixers 854-1 to 854-N$_{Ant}$; filters 855-1 to 855-N$_{Ant}$; A/D converters 856-1 to 856-N$_{Ant}$; FFT circuits 257-1 to 257-N$_{SDM}$; receive signal processing circuits 745-1 to 745-N$_{SDM}$; a reception weight processing unit 744; time axis reception weight multiplication circuits 755-1 to 755-N$_{SDM}$; and a time axis reception weight calculation circuit 757. The receive signal processing circuits 745-1 to 745-N$_{SDM}$, the reception weight processing unit 744, and the time axis reception weight calculation circuit 757 are connected to the communication control circuit 42. The reception weight processing unit 744 includes a channel information estimation circuit 746 and a reception weight calculation circuit 747.

First, a signal received at the antenna elements 851-1 to 851-N$_{Ant}$ is amplified by the low noise amplifiers 852-1 to 852-N$_{Ant}$. The amplified signal and a local oscillating signal output from the local oscillator 853 are multiplied by the mixers 854-1 to 854-N$_{Ant}$, and the amplified signal is down-converted from the wireless frequency signal to the baseband signal. The down-converted signal also includes signals outside of the frequency band to be received, so that the filters 855-1 to 855-N$_{Ant}$ remove out-of-band components. The signal from which the out-of-band components have been removed is converted to a digital baseband signal in the time domain by the A/D converters 856-1 to 856-N$_{Ant}$.

The digital baseband signal in this time domain is input to the time axis reception weight multiplication circuits 755-1 to 755-N$_{SDM}$ corresponding to each signal sequence to be spatially multiplexed, and the sampling data of each antenna system is multiplied by the time axis reception weight, which is the reception weight in the time domain, for each sampling data, and added for the entire antenna system. This processing is performed individually in the N$_{SDM}$ time axis reception weight multiplication circuits 755-1 to 755-N$_{SDM}$, and the result is output to the FFT circuits 257-1 to 257-N$_{SDM}$. In the FFT circuits 257-1 to 257-N$_{SDM}$, the guard interval is removed at a predetermined symbol timing determined by the circuit for timing detection of which description has been omitted herein, and the signal in the time domain is converted to the signal in the frequency domain by FFT processing. The signal in the frequency domain is input to the receive signal processing circuits 745-1 to 745-N$_{SDM}$, mutual interference between each signal sequence is suppressed for each subcarrier by using the reception weight provided by the reception weight processing unit 744, and remaining processing such as error correction is performed as necessary to reproduce the transmit signal. The result is output to the MAC layer processing circuit 68.

Here, in different receive signal processing circuits 745-1 to 745-N$_{SDM}$, different signal processing of signal sequences are performed, but MLD or simple MLD using QR decomposition or the like may be used as the receive signal processing across the plurality of receive signal processing circuits 745-1 to 745-N$_{SDM}$.

Here, the output from the FFT circuits 257-1 to 257-N$_{SDM}$ is also input to the channel information estimation circuit 746. In the channel information estimation circuit 746, channel information between signal sequences (the number of signal sequences is N$_{SDM}$) to be spatially multiplexed between the transmitting station and the receiving station side is estimated for each subcarrier, based on a known signal for channel estimation separated into each subcarrier (such as a preamble signal assigned to the head of the wireless packet), and the estimation result is output to the reception weight calculation circuit 747. In the reception weight calculation circuit 747, the reception weight to be multiplied is calculated for each subcarrier, based on the input channel information. For this reception weight, for example, a ZF type pseudo-inverse is utilized as described above, or an MMSE type reception weight matrix is utilized. At this time, the reception weight vectors corresponding to the receive signal processing circuits 745-1 to 745-N$_{SDM}$ are different from each other for each signal sequence, correspond to a row vector, such as the ZF type inverse matrix or the MMSE type reception weight matrix described above, and are input to the receive signal processing circuits 745-1 to 745-N$_{SDM}$ corresponding to the signal sequence to be extracted.

Furthermore, the output from the A/D converters 856-1 to 856-N$_{Ant}$ is also input to the time axis reception weight calculation circuit 757. Here, the time axis reception weight is calculated so as to take a correlation with the sampling data in which the known signal for channel estimation of the reference antenna is one cycle of OFDM symbols (data portions excluding the guard interval) or an integer multiple of the cycle. Specifically, in a case where the sampling data of the k-th sample of the j-th antenna that is transmitted for each signal sequence to be spatially-multiplexed is set, for example, as x$_j^{(k)}$, and the reference antenna is the first antenna, the time axis reception weight of the signal sequence is calculated by Equation (1) below.

[Math. 1]

$$w_j = \frac{1}{\left|\sum_k x_1^{(k)} x_j^{(k)*}\right|} \sum_k x_1^{(k)} x_j^{(k)*} \qquad (1)$$

The coefficient is individually determined for the N$_{SDM}$ systems, and each is input to a corresponding individual time axis reception weight multiplication circuits 755-1 to 755-N$_{SDM}$. Similar to the transmitter 62a, the receiver 66a uses the antenna elements 851-1 to 851-N$_{Ant}$ to the A/D converters 856-1 to 856-N$_{Ant}$ together, and copies the output from the A/D converters 856-1 to 856-N$_{Ant}$ into the N$_{SDM}$ systems to input to the individual time axis reception weight multiplication circuits 755-1 to 755-N$_{SDM}$, but the antenna elements 851-1 to 851-N$_{Ant}$ to the A/D converters 856-1 to 856-N$_{Ant}$ may be implemented individually, and each of the antenna elements 851-1 to 851-N$_{Ant}$ may be implemented to have a subarray configuration.

NPL 2 describes a configuration different from each of the configurations described above. In a configuration of a wireless station apparatus described in NPL 2, the configuration of the wireless station apparatus takes an equivalent configuration as the wireless station apparatus 60 illustrated in FIG. 17. The difference from FIG. 17 is only that the transmitter 61 is replaced with a transmitter 62b, the receiver 65 is replaced with a receiver 66b, and the communication control circuit 41 is replaced with a communication control circuit 43, so that the overall functions and features are in accordance with FIG. 17, and the details of the drawings and descriptions are omitted herein.

FIG. 22 is a schematic block diagram illustrating an example of a configuration of a transmitter of a wireless station apparatus according to NPL 2. As illustrated in FIG. 22, the transmitter 62b includes: transmit signal processing circuits 711-1 to 711-N$_{SDM}$; IFFT & GI assigning circuits 313-1 to 313-N$_{SDM}$; D/A converters 314-1 to 314-N$_{SDM}$; a local oscillator 815; mixers 316-1 to 316-N$_{SDM}$; filters 317-1 to 317-N$_{SDM}$; high power amplifiers 818-1 to 818-N$_{Ant}$; antenna elements 819-1 to 819-N$_{Ant}$; synthesizers 671-1 to 671-N$_{Ant}$; phase shifter groups 681-1 to 681-N$_{SDM}$; distributors 673-1 to 673-N$_{SDM}$; a phase control circuit 688; and a time axis transmission weight calculation circuit 642. The transmit signal processing circuits 711-1 to 711-$N_{SDM}$ and the time axis transmission weight calculation circuit 642 are connected to the communication control circuit 43.

NPL 2 describes a method for calculating a time axis transmission weight. In the background art described above, the A/D converters 856 is implemented for each antenna element as illustrated in FIGS. 19 and 21, for example, and the estimation of the channel for each antenna element, the correlation between the reference antenna element and each antenna element, and the like can be directly acquired by using the sampling data from the A/D converter 856. However, in NPL 2, in the receiver 66b described below, similar to the transmitter 62b, the complex phase of the signal of each antenna element is rotated by using a phase shifter, so that the A/D converter is implemented for each signal sequence to be spatially multiplexed, rather than for each antenna element, and the time axis transmission weight and the time axis reception weight related to all the antenna elements are not necessarily directly calculated.

However, using the approach described in NPL 2 or the like, it is possible to estimate the direction of arrival of the wireless signal by using some of the antenna elements and calculate the time axis transmission and/or reception weight of all the antenna element so as to direct the direction of arrival. Thus, the time axis transmission weight calculation circuit 743 is provided with a function of calculating the time axis transmission weight by using any arrival direction estimation section or the like not described in this diagram.

The difference from FIG. 20 is that the time axis transmission weight multiplication circuits 761-1 to 761-$N_{SDM}$ and the addition synthesis circuits 812-1 to 812-$N_{Ant}$ are omitted, the synthesizers 671-1 to 671-$N_{Ant}$, the phase shifter groups 681-1 to 681-$N_{SDM}$, the distributors 673-1 to 673-$N_{SDM}$, and the phase control circuit 688 are added instead, and the time axis transmission weight calculation circuit 743 is changed to the time axis transmission weight calculation circuit 642. This is because the multiplication processing of the time axis transmission weight is implemented as digital signal processing by the time axis transmission weight multiplication circuits 761-1 to 761-$N_{SDM}$ and the addition synthesis circuits 812-1 to 812-$N_{Ant}$ in FIG. 20, while the multiplication processing of the time axis transmission weight is implemented as analog signal processing by the synthesizers 671-1 to 671-$N_{Ant}$, the phase shifter groups 681-1 to 681-$N_{SDM}$, and the distributors 673-1 to 673-$N_{SDM}$ in the present background art.

Furthermore, with this change, it is changed from implementing the D/A converters 814-1 to 814-$N_{Ant}$, the mixers 816-1 to 816-$N_{Ant}$, and the filters 817-1 to 817-$N_{Ant}$ for each antenna element as described above, to implementing as the D/A converters 314-1 to 314-$N_{SDM}$, the mixers 316-1 to 316-$N_{SDM}$, and the filters 317-1 to 317-$N_{SDM}$ for each signal sequence of spatial multiplex transmission. In general, $N_{Ant}$ will be a sufficiently larger value than $N_{SDM}$ because $N_{Ant}$ is a super large number of antenna elements, and as a result the number of parts throughout the circuit will be significantly reduced. The difference between the time axis transmission weight calculation circuit 743 and the time axis transmission weight calculation circuit 642 is that the time axis transmission weight calculation circuit 743 is configured to calculate the time axis transmission weight on the basis of the signal from the A/D converters 856-1 to 856-$N_{Ant}$ of each antenna system on the receiving side, while the time axis transmission weight is calculated by using any approach using the approach described in NPL 2 or the like in the case of the time axis transmission weight calculation circuit 642.

Details of the signal processing will be described below with reference to the drawings. In the technique described in NPL 2, because a single wireless station apparatus 60 spatially multiplexes and transmits signals to other wireless station apparatuses 60, signal sequences of a plurality of systems are input from the MAC layer processing circuit 68 to the transmitter 62b, and the input signal sequences of a plurality of systems are input to the transmit signal processing circuits 711-1 to 711-$N_{SDM}$. The transmit signal processing circuits 711-1 to 711-$N_{SDM}$ perform modulation processing on the data (data input #1 to #$N_{SDM}$) to be transmitted to a destination wireless station apparatus 60 when the data to be transmitted on a wireless channel (wireless packets) is input from the MAC layer processing circuit 68.

Here, for example, in a case that an OFDM modulation scheme is used, in the effective bandwidth W illustrated in FIG. 23, the signal of each signal sequence is subjected to modulation processing for each subcarrier, is input from each of the transmit signal processing circuits 711-1 to 711-$N_{SDM}$ to the IFFT & GI assigning circuits 313-1 to 313-$N_{SDM}$ as a signal in the frequency domain of the transmit signal in the baseband, is converted from a signal on the frequency axis to a signal on the time axis in the IFFT & GI assigning circuits 313-1 to 313-$N_{SDM}$, and is further performed with processing such as guard interval insertion and the waveform shaping between OFDM symbols (between blocks of block transmission in the case of SC-FDE).

FIG. 23 is a diagram illustrating a specific example of a waveform of an OFDM signal in the of related art. In FIG. 23, 901 represents a waveform region of the OFDM signal, 902 represents a signal of an individual subcarrier, and 903 and 904 represent a subcarrier signal of the guard band. For the bandwidth W allocated to the wireless system, guard bands constituted of the unused subcarriers 903, 904 are actually present on both sides of the bandwidth to suppress interference to adjacent channels, and as the result, the actually available effective bandwidth W is slightly smaller than the bandwidth W. Here, "effective" means available for data transmission. That is, "effective bandwidth" means a bandwidth available for data transmission. In FIG. 23, the "effective bandwidth" is the bandwidth in which the guard bands are excluded from the bandwidth W. The guard band is provided to prevent frequency jamming. Thus, placing a signal on the guard band is not preferable in the sense of preventing jamming. Thus, the "effective bandwidth" means the bandwidth available for data transmission.

Digital sampling data converted to a signal in the time domain in the IFFT & GI assigning circuits 313-1 to 313-$N_{SDM}$ are converted from the digital sampling data to an analog signal in the baseband in the D/A converters 314-1 to 314-$N_{SDM}$ for each signal system to be spatially multiplexed. Further, each analog signal is multiplied by a local oscillating signal input from the local oscillator 815 by the mixers 316-1 to 316-$N_{SDM}$ and up-converted to a wireless frequency signal. Here, the up-converted signal includes a signal in a region outside of the band of the channel to be transmitted, so that a signal outside of the band is removed at the filters 317-1 to 317-$N_{SDM}$ to generate a signal to be transmitted. The generated signals are distributed to signals for each antenna element in the distributors 673-1 to 673-$N_{SDM}$. That is, the signals for each antenna of the $N_{Ant}$ systems are output for the $N_{SDM}$ sets.

For example, the signal of the signal sequence of the first system is independently given the rotation amount of the complex phase for each antenna system by using the $N_{Ant}$ phase shifters in the phase shifter groups 681-1, and is input into the synthesizers 671-1 to 671-N$_{Ant}$. Similarly, each of the signals of the signal sequences from the second system to the N$_{SDM}$ system are independently given the rotation amount of the complex phase for each antenna system by each using the N$_{Ant}$ phase shifters in the phase shifter groups 681-2 to 681-N$_{SDM}$, and are input into the synthesizers 671-1 to 671-N$_{Ant}$. These signals are synthesized for each antenna element in the synthesizers 671-1 to 671-N$_{Ant}$, are amplified by the high power amplifiers 818-1 to 818-N$_{Ant}$, and are transmitted from the antenna elements 819-1 to 819-N$_{Ant}$.

Note that the phase rotation amount of the N$_{Ant}$ phase shifters of each of the phase shifter groups 681-1 to 681-N$_{SDM}$ is indicated by the phase control circuit 688. The phase control circuit 688 converts the rotation amount of the phase calculated by the time axis transmission weight calculation circuit 642 from the complex number in the Exp (jθ) format to an angle θ, and sets the phase amount (angle θ) to the phase shifter. In a case that, for example, the wireless station apparatus 60 is the base station apparatus, the communication control circuit 43 indicates information of the communication partner station to the time axis transmission weight calculation circuit 642, and the time axis transmission weight calculation circuit 642 selects the phase information to apply based on the information.

Note that, similarly in the technique described in NPL 2, a configuration is taken in which N$_{SDM}$ systems from the distributors 673-1 to 673-N$_{SDM}$ to the phase shifter groups 681-1 to 681-N$_{SDM}$ are synthesized by the synthesizers 671-1 to 671-N$_{Ant}$, and the high power amplifiers 818-1 to 818-N$_{Ant}$ to the antenna elements 819-1 to 819-N$_{Ant}$ are used together in each signal sequence, but the N$_{SDM}$ systems may be implemented individually from the following the antenna elements 819-1 to 819-N$_{Ant}$ to the high power amplifiers 818-1 to 818-N$_{Ant}$ without being synthesized by the synthesizers 671-1 to 671-N$_{Ant}$, and a subarray may be configured by the antenna elements 819-1 to 819-N$_{Ant}$ in each of the antennas.

Other precautions are omitted here as they are similar to the descriptions regarding other background arts.

FIG. 24 is a schematic block diagram illustrating an example of a configuration of the receiver of the wireless station apparatus according to NPL 2. As illustrated in FIG. 24, the receiver 66b includes antenna elements 851-1 to 851-N$_{Ant}$; low noise amplifiers 852-1 to 852-N$_{Ant}$; a local oscillator 853; mixers 254-1 to 254-N$_{SDM}$; filters 255-1 to 255-N$_{SDM}$; A/D converters 256-1 to 256-N$_{SDM}$; FFT circuits 257-1 to 257-N$_{SDM}$; receive signal processing circuits 745-1 to 745-N$_{SDM}$; a reception weight processing unit 744; and a time axis reception weight calculation circuit 657. The receive signal processing circuits 745-1 to 745-N$_{SDM}$, the reception weight processing unit 744, and the time axis reception weight calculation circuit 657 are connected to the communication control circuit 43. The reception weight processing unit 744 includes a channel information estimation circuit 746, a reception weight calculation circuit 747, and a phase control circuit 678.

NPL 2 described above describes a method for calculating a time axis reception weight in the same manner as the time axis transmission weight. However, as illustrated in the present drawing, in the receiver 66b, similar to the transmitter 62b, the complex phase of the signal of each antenna element is rotated by using a phase shifter, so that the A/D converter is implemented for each signal sequence to be spatially multiplexed, rather than for each antenna element, and the time axis transmission weight and the time axis reception weight related to all the antenna elements are not necessarily directly calculated.

However, using the approach described in NPL 2 or the like, it is possible to estimate the direction of arrival of the wireless signal by using some of the antenna elements and calculate the time axis transmission and/or reception weight of all the antenna element so as to direct the direction of arrival. The time axis reception weight calculation circuit 757 is provided with a function of calculating the time axis reception weight by using any arrival direction estimation section or the like not described in this diagram.

The difference from FIG. 21 is that the time axis reception weight multiplication circuits 755-1 to 755-N$_{SDM}$ are omitted, the distributors 672-1 to 672-N$_{Ant}$, the phase shifter groups 682-1 to 682-N$_{SDM}$, the synthesizers 674-1 to 674-N$_{SDM}$, and the phase control circuit 678 are added instead, and the time axis reception weight calculation circuit 757 is changed to the time axis reception weight calculation circuit 657. This is because the multiplication processing of the time axis reception weight is implemented as digital signal processing by the time axis reception weight multiplication circuits 755-1 to 755-N$_{SDM}$ in FIG. 21, while the multiplication processing of the time axis reception weight is implemented as analog signal processing by the distributers 672-1 to 672-N$_{Ant}$, the phase shifter groups 682-1 to 682-N$_{SDM}$, and the synthesizers 674-1 to 674-N$_{SDM}$ in the present background art.

Furthermore, with this change, it is changed from implementing the A/D converters 856-1 to 856-N$_{Ant}$, the mixers 854-1 to 854-N$_{Ant}$, and the filters 855-1 to 855-N$_{Ant}$ for each antenna element as described above, to implementing as the A/D converters 256-1 to 256-N$_{SDM}$, the mixers 254-1 to 254-N$_{SDM}$, and the filters 255-1 to 255-N$_{SDM}$ for each signal sequence of spatial multiplex transmission. In general, N$_{Ant}$ will be a sufficiently larger value than N$_{SDM}$ because N$_{Ant}$ is a super large number of antenna elements, and as a result the number of parts throughout the circuit will be significantly reduced. The difference between the time axis reception weight calculation circuit 757 and the time axis reception weight calculation circuit 657 is that the time axis reception weight calculation circuit 757 is configured to calculate the time axis reception weight by Equation (6), on the basis of the signal from the A/D converters 256-1 to 256-N$_{SDM}$ of each antenna system, while the time axis reception weight is calculated by using any approach using the approach described in NPL 2 or the like in the case of the time axis reception weight calculation circuit 657.

Details of the signal processing will be described below with reference to the drawings. In the technique described in NPL 2, a signal received at the antenna elements 851-1 to 851-N$_{Ant}$ is amplified by the low noise amplifiers 852-1 to 852-N$_{Ant}$. The amplified signals are distributed per signal sequence (N$_{SDM}$ systems) spatially multiplexed by the distributors 672-1 to 672-N$_{Ant}$, and input to the phase shifter groups 682-1 to 682-N$_{SDM}$ for each signal sequence. For example, N$_{Ant}$ phase shifters are implemented in the phase shifter group 682-1, and the rotation amount of the complex phase for each antenna system is independently provided. The signal of the N$_{Ant}$ system for each of these antenna elements is input to the synthesizer 674-1, and the signal of the signal sequence of the first system is output to the mixer 254-1. Similarly, each of the signals input to the phase shifter groups 682-2 to 682-N$_{SDM}$ is independently provided a rotation amount of the complex phase for each antenna system by each using N$_{Ant}$ phase shifters. The signals of the N$_{Ant}$ systems for each of these antenna elements are input to the synthesizers 674-2 to 674-N$_{SDM}$, and the signals of the signal sequences of the second to $N_{SDM}$ systems are output to the mixers 254-2 to 254-$N_{SDM}$. In this way, the signals of the $N_{Ant}$ systems for each antenna element are converted to signals of the $N_{SDM}$ systems for each signal sequence to be spatially multiplexed.

These signals are multiplied by the local oscillating signal output from the local oscillator 853 by the mixers 254-1 to 254-$N_{SDM}$, and these signals are down-converted from the wireless frequency signal to the baseband signal. The down-converted signals also include signals outside of the frequency band to be received, so that the filters 255-1 to 255-$N_{SDM}$ remove out-of-band components. The signal from which the out-of-band components have been removed is converted to a digital baseband signal in the time domain at the A/D converters 256-1 to 256-$N_{SDM}$, and is output to the FFT circuits 257-1 to 257-$N_{SDM}$. In the FFT circuits 257-1 to 257-$N_{SDM}$, the guard interval is removed at a predetermined symbol timing determined by the circuit for timing detection of which description has been omitted herein, and the signal in the time domain is converted to the signal in the frequency domain by FFT processing.

The signal in the frequency domain is input to the receive signal processing circuits 745-1 to 745-$N_{SDM}$, mutual interference between each signal sequence is suppressed for each subcarrier by using the reception weight provided by the reception weight processing unit 744, and remaining processing such as error correction is performed as necessary to reproduce the transmit signal. The result is output to the MAC layer processing circuit 68.

Here, the output from the FFT circuits 257-1 to 257-$N_{SDM}$ is also input to the channel information estimation circuit 746. In the channel information estimation circuit 746, channel information between signal sequences (the number of signal sequences is $N_{SDM}$) to be spatially multiplexed between the transmitting station and the receiving station side is estimated for each subcarrier, based on a known signal for channel estimation separated into each subcarrier (such as a preamble signal assigned to the head of the wireless packet), and the estimation result is output to the reception weight calculation circuit 747. In the reception weight calculation circuit 747, the reception weight to be multiplied is calculated for each subcarrier, based on the input channel information.

For this reception weight, for example, a ZF type pseudo-inverse is utilized as described above, or an MMSE type reception weight matrix is utilized. At this time, the reception weight vectors corresponding to the receive signal processing circuits 745-1 to 745-$N_{SDM}$ are different from each other for each signal sequence, correspond to a row vector, such as the ZF type inverse matrix or the MMSE type reception weight matrix described above, and are input to the receive signal processing circuits 745-1 to 745-$N_{SDM}$ corresponding to the signal sequence to be extracted.

Note that the phase rotation amount of the $N_{Ant}$ phase shifters of each of the phase shifter groups 682-1 to 682-$N_{SDM}$ is indicated by the phase control circuit 678. The phase control circuit 678 converts the rotation amount of the phase calculated by the time axis reception weight calculation circuit 657 from the complex number in the Exp (j$\theta$) format to an angle $\theta$, and sets the phase amount (angle $\theta$) to the phase shifter. In a case that, for example, the wireless station apparatus 60 is the base station apparatus, the communication control circuit 43 indicates information of the communication partner station to the time axis reception weight calculation circuit 657, and the time axis reception weight calculation circuit 657 selects the phase information to apply based on the information.

Here, as the common attention in the phase shifter groups 681-1 to 681-$N_{SDM}$ on the transmitting side and the phase shifter groups 682-1 to 682-$N_{SDM}$ on the receiving side, the phase rotation amount given here will rotate the complex phase corresponding to Equation (1) in the description relating to NPL 1 described above, but it should be noted that rotating the complex phase $\theta$ in the phase shifters in the phase shifter groups 681-1 to 681-$N_{SDM}$ and the phase shifter groups 682-1 to 682-$N_{SDM}$ will usually delay the complex phase by $\theta$ by the addition of a delay by a delay line, and thus the complex phase of the coefficient obtained by Equation (1) or the like described in NPL 1 is reversed in sign. That is, in a case that a coefficient of "positive real number*Exp (j$\phi$))" is obtained in the coefficient obtained in Equation (1), the complex phase $\theta$ to be set to the phase shifters in the phase shifter groups 681-1 to 681-$N_{SDM}$ and the phase shifter groups 682-1 to 682-$N_{SDM}$ is given as $\theta=-\phi$.

Note that, similarly in the technique described in NPL 2, a configuration is taken in which the signals from the antenna elements 851-1 to 851-$N_{Ant}$ and the low noise amplifiers 852-1 to 852-$N_{Ant}$ are distributed at the distributors 672-1 to 672-$N_{Ant}$, and thus the $N_{SDM}$ systems from the phase shifter groups 682-1 to 682-$N_{SDM}$ to the synthesizers 674-1 to 674-$N_{SDM}$ use the antenna elements 851-1 to 851-$N_{Ant}$ and the low noise amplifiers 852-1 to 852-$N_{Ant}$ together, but the $N_{SDM}$ systems may be implemented individually by the antenna elements 851-1 to 851-$N_{Ant}$ and the low noise amplifiers 852-1 to 852-$N_{Ant}$ without being distributed by the distributors 672-1 to 672-$N_{Ant}$, and a subarray may be configured by the antenna elements 851-1 to 851-$N_{Ant}$ in each of the antennas.

Other precautions are omitted here as they are similar to the descriptions regarding other background arts.

In general, in wireless communication, the signal from the local oscillator of the wireless frequency and the baseband signal described above are multiplied by a mixer and subjected to frequency conversion to convert from a baseband signal, which is a transmit and/or receive signal in which a modulation processing has been applied to the transmit and/or receive data, to a wireless frequency signal that is actually used in the communication. At this time, a sine wave signal from the local oscillator is input to the mixer, and in a case of a high frequency band like a millimeter wave, a phenomenon that the phase fluctuates slightly with respect to the sine wave signal occurs, which behaves as noise and degrades the communication characteristic. This is referred to as phase noise, and when a sine wave signal without phase noise is viewed in the frequency domain, the signal density is concentrated on only the components of the center frequency, whereas in a case that phase noise is involved, the distribution with other frequency components around the center frequency is indicated. In other words, in view of a signal of a certain subcarrier, it is meant that the transmit signal of the subcarrier has leaked out to other frequency components adjacent to the subcarrier on the receiving station side, and in a case of an OFDM modulation scheme, the orthogonality between subcarriers is broken and interference between subcarriers has occurred.

In order to reduce the influence of such phase noise, common millimeter wave systems often employ single carrier transmission. For example, while the largest weak point of single carrier transmission is the frequency selectivity distortion due to the reflection wave components, in a case that the transmitting station and the receiving station are implemented with a large aperture parabola antenna or the like and a one-to-one counter communication is performed, the pencil beams formed by the parabola antenna suppress the influence of the reflection waves and allow communication in a clean wave shape without distortion. Phase noise is due to the fluctuation of the frequency of the local signal, and thus is not a large problem in a short period of time, but it has a nonnegligible impact as an accumulation of the fluctuations in some time scale. Thus, for example, in a system of single carrier transmission, the influence of the phase noise is reduced by estimating the accumulation of the complex phase associated with the phase noise from the receive signal and performing a processing for cancelling this.

Specifically, signal detection is performed at the receiving station at a stage before the phase error as the accumulation of the phase noise is increased, and the transmit signal on the transmitting side is reproduced after error correction. Thereafter, at the receiving station, the reproduced signal is subjected to encoding and modulation processing similarly to the transmitting side and multiplied by a transfer function corresponding to the attenuation of the amplitude and the rotation of the complex phase on the channel to generate a replica signal of the receive signal. The transfer function multiplied here is performed by using a training signal or the like assigned to the leading region when the reception is started. As a result, phase noise accumulates over time, resulting in errors in the complex phase components. Thus, with respect to the replica signal generated by using the transfer function acquired from this training signal or the like, the actual receive signal is in a condition where the complex phase is entirely offset. Thus, complex noise of the difference between the replica signal and the actual receive signal is acquired and statistical processing is performed.

In general, thermal noise is considered to be an isotropic white Gaussian noise on the complex space of the receive signal, and thus is aggregated to the origin on the complex space by averaging with a certain number of samples. However, in a case that offset of the complex phase is constantly added due to phase noise, the thermal noise does not aggregate to the origin. In this way, by statistically processing the difference between the replica signal and the actual receive signal at a predetermined period, the constant offset added to the complex phase is sequentially estimated, and signal processing is performed to cancel the estimated offset. In this way, it is possible to cancel the phase noise by performing a tracking processing that predicts and tracks the accumulation value of the phase noise.

The processing of generating the replica signal of the receive signal described above is assumed to be capable of successfully performing signal detection of single carrier signals. However, in a case of dealing with spatially multiplexed signals, a plurality of signal sequences are received in a jammed state, so it is not possible to generate a replica signal of the receive signal without signal separation. In order to perform signal separation, generally the interference components between the signal sequences are suppressed by using different coefficients for each frequency component. For example, in an OFDM modulation scheme, the guard interval is removed from the OFDM symbol length signal, and the signal is converted from the signal in the time domain to the signal in the frequency domain by Fast Fourier Transform (FFT). The OFDM symbol length includes the effective data region and a guard interval for removing interference between symbols, and the guard interval length sets a value corresponding to the delay time of the delay wave to be eliminated.

Because this guard interval is actually discarded without use for the receive signal processing (FFT processing), the value of the "time length of the effective data region" divided by the "OFDM symbol length" is the efficiency in the signal transmission. In order to achieve this efficiency to a certain degree, the OFDM symbol length needs to set a value a few times higher than the delay time of the delay wave to be eliminated, and fluctuation in the phase generated in the OFDM symbol length leads to a break in the orthogonality of the frequency components of the signal performed FFT. The tracking processing in single carrier transmission described above is to compensate for the fluctuation in the phase in a time scale sufficiently shorter than the OFDM symbol length, but in a case of performing signal processing in the frequency domain, the phase noise generated in the OFDM symbol length accumulates and appears as a break in the orthogonality of the frequency components at a nonnegligible level.

That is, in order to apply a phase noise compensation technique in a single carrier transmission of related art, a signal separation processing of signals that have been spatially multiplexed and jammed is required in advance, and in order to perform signal separation processing, it is necessary to perform the multiplication processing of the transmission and/or reception weight in the frequency domain by performing FFT processing of the receive signal. Because the orthogonality between the frequency components will be broken when performing FFT processing, phase noise compensation needs to be performed before performing FFT in advance, but signal separation of the spatially multiplexed signals needs to be performed in order to perform the phase noise compensation. In this way, phase noise compensation cannot be performed for signals that are spatially multiplexed in related art. As a result, there is a problem in that throughput decreases due to interference between subcarriers.

In the above description, the phase noise breaks the orthogonality between the plurality of frequency components, and, for example, in a case of an OFDM modulation scheme, the components of the signal of the subcarrier A are jammed with the subcarrier B, and similarly, the signal of the subcarrier B is jammed with the subcarrier A. Even in a case where channel estimation of each subcarrier is performed by using a training signal, due to the interference between subcarriers, the channel estimation result itself has degraded estimation accuracy with the phase noise. Thus, once the signal in the time domain is converted to the signal in the frequency domain, the interference between subcarriers becomes a confirmed state, which makes subsequent compensation difficult.

On the other hand, consider a case that a simple sine wave is transmitted, and this is received on the receiving side where FFT is performed.

In a case where there is no phase noise influence, the signal components only appear in the frequency components corresponding to the frequency of the sine wave transmitted by FFT, and there is no value in the remaining frequency components except for the noise components. On the other hand, in a case that there is phase noise, a significant value of signal components is detected with some spread around the frequency components of the sine wave. Because the level of signal leakage into adjacent subcarriers generally decreases as the frequency is farther away, the signal components are concentrated on some subcarriers around the frequency components focused, and there is approximately no large difference even when the other components are regarded as zero. Thus, when signal components of the subcarriers focused and subcarriers in the vicinity thereof are extracted, and IFFT processing is performed on the signal with the other values considered as zero, the fluctuation in phase caused by relatively low frequency components of the phase noise can be reproduced. A technique of utilizing this feature to solve the problem described above has been proposed. The principles of the operation will be described below.

Operating Principles of Background Arts of Present Invention

First, a case of an OFDM modulation scheme will be described as an example. In the baseband signal, when only the sine wave signal at the frequency $f_k$ of the k-th subcarrier is converted to the wireless frequency as a training signal and transmitted, and the signal received on the receiving side is down-converted to a baseband signal, the sampling data obtained by sampling the baseband signal at time t is denoted as $\psi_k$ (t). Furthermore, the sampling data $\psi_k$ (t) for one cycle of OFDM symbols from which the guard interval has been removed can be separated into the signal in the frequency component as in Equation (2) below by performing FFT.

[Math. 2]

$$\Psi_k(t) = \sum_{k'=-N_{FFT}/2}^{+N_{FFT}/2} h_{k'} \alpha_{k'} e^{2\pi j f_{k'} t} \quad (2)$$

Where $h_k$ is the transfer function of the k-th subcarrier, and the $N_{FFT}$ is the number of points of FFT. In practice, because the number of effective subcarriers K is a slightly smaller value than the number of points of FFT $N_{FFT}$ taking into consideration the guard band, the guard band region is not used for signal transmission, but here the signal leakage to adjacent subcarriers is considered in the influence of phase noise, and the description is made for the entire bandwidth. $\alpha_k$ is a coefficient of a signal component received at the k-th subcarrier under the influence of the phase noise on the sine wave signal of the frequency of the k-th subcarrier. That is, in the case that the transfer function is 1, $\alpha_k$ is a value of the complex number defined by the amplitude at the subcarrier of the receive signal and the initial phase at t=0. Assuming that the subcarrier interval is $\Delta f$ and the phase noise can be approximated in the frequency components of the back and forth $N_{PN}$ carriers of the k-th subcarrier, Equation (2) can be written as in Equation (3) below.

[Math. 3]

$$\Psi_k(t) \approx \sum_{k'=-N_{PS}}^{N_{PS}} h_{k+k'} \alpha_{k+k'} e^{2\pi j(f_k + k'\Delta f)t} \quad (3)$$

Furthermore, assuming that the transfer function $h_k$ is generally a constant in the frequency domain in the range of approximately $\Delta f * 2N_{PN}$ of the back and forth $N_{PN}$ carriers of the k-th subcarrier, Equation (3) can be described as in Equation (4) below by $h_k \approx h_{k+k'}$

[Math. 4]

$$\Psi_k(t) \approx h_k \alpha_k e^{2\pi j f_k t} \sum_{k'=-N_{PS}}^{N_{PS}} \frac{\alpha_{k+k'}}{\alpha_k} e^{2\pi j k' \Delta f t} \quad (4)$$

Here, a function $\Phi_k$ (t) is defined in Equation (5) below.

[Math. 5]

$$\Phi_k(t) = \left( \sum_{k'=-N_{PS}}^{N_{PS}} \frac{\alpha_{k+k'}}{\alpha_k} e^{2\pi j k' \Delta f t} \right)^{-1} \quad (5)$$

In other words, the sine wave signal of the k-th subcarrier is transmitted, FFT is performed on the signal received on the receiving side, the coefficient of each frequency component divided by the coefficient of the component of the k-th subcarrier is extracted until the back and forth $N_{PN}$ carriers of the k-th subcarrier, and the function $\Phi_k$ (t) of each sampling time defined by Equation (5) is determined by using this coefficient. The converted sampling data $\psi_k$ (t) $\phi_k$ (t) obtained by multiplying this function by the sampling data $\psi_k$ (t) at each time is given by Equation (6) below.

$$\Psi_k(t)\Phi_k(t) \approx h_k \alpha_k e^{2\pi j k t} \quad \text{[Math. 6]}$$

That is, while the signal of the k-th subcarrier is converted to a signal having components other than the k-th subcarrier and received on the receiving station side, in a case where the function $\phi_k$ (t) can be obtained, by multiplying this function, the signal can be converted to a sine wave signal represented by Equation (6) with the signal components of the k-th subcarrier having no phase noise. Here, while the coefficient ($\alpha_{k+k'}/\alpha_k$) represents the interference components between subcarriers in which the signal of the k-th subcarrier leaks into subcarriers separated by subcarriers k, because the phase noise is caused by the fluctuation of the phase occurring in the local oscillator, it is unlikely that the degree of leakage to adjacent subcarriers is different due to the frequency $f_k$ of the input baseband signal being different. Thus, the coefficient ($\alpha_{k+k'}/\alpha_k$) as well as the function $\phi_k$ (t) have properties that do not depend on the value of the subcarrier number k, and even in a case where the subcarrier of the sine wave transmitted by the transmitting side is any subcarrier in the band, the common function $\phi_k$ (t) can be obtained, and it is expected that phase noise compensation can be performed by this function. This expectation has been confirmed by a simulation performed separately, which is not specified here. Note that Equation (5) corresponds to the signal processing of IFFT for the coefficient ($\alpha_{k+k'}/\alpha_k$), and thus it is possible to determine by performing IFFT by inserting zero into the remaining frequency components.

901 to 904 in the waveform of the OFDM signal illustrated in FIG. 25 are the same as the waveform of the OFDM signal illustrated in FIG. 23, in which 905 represents a reduced waveform region of the OFDM signal, 906 and 907 represent a pilot signal, and 908 and 909 represent an empty subcarrier. In contrast to the OFDM signal illustrated in FIG. 23, the subcarrier 902 that includes the user data is limited to the region of the reduced effective bandwidth W'' that is narrower than the effective bandwidth W, the subcarriers 908 and 909 between the effective bandwidth W and the reduced effective bandwidth W'' are set as unused empty subcarriers, and the pilot signals 906 and 907 are placed on subcarriers on both ends of the effective bandwidth W. Using this pilot signal, a function $\phi_k$ (t) for phase noise compensation is acquired. That is, the effective bandwidth W within ±W/2 from the center frequency is used for communication, and the subcarriers on both ends are allocated to the pilot signals 906 and 907, and the subcarrier numbers are defined as ±K/2. K is the number of subcarriers in the effective bandwidth W. Furthermore, the regions of the subcarriers 908 and 909 between ±W/2 and ±W"/2 inside thereof are empty subcarriers, in which the user data or the like is not allocated, and a frequency region for user data transmission is allocated to the region within ±W"/2 from the center frequency.

FIG. 26 illustrates a relationship between a transmission training signal and a reception waveform thereof. FIG. 26(A) illustrates a transmission training signal on the transmitting side, and FIG. 26 (B) illustrates a reception waveform on the receiving side. In FIG. 26, 906 represents a training signal on the transmitting side, 903 and 908 represent subcarriers in the vicinity of the training signal, 911 represents a training signal on the receiving side, and 912 and 913 represent the leaked training signal. For example, a predetermined signal is allocated to subcarrier numbers ±K/2 at both ends of ±W/2 a from the center frequency, and no signal is allocated to subcarriers in the region ±W/2 to ±W"/2. In a case where the training signal 906 illustrated in FIG. 26(A) is a subcarrier −K/2, in FIG. 25, the subcarrier 903 corresponds to a guard band and the subcarrier 908 corresponds to an empty subcarrier. No signal is allocated to the regions of the subcarriers 903 and 908. In contrast, in the receive signal, the leaked training signal 912 leaks out to the region of the subcarrier 903 and the leaked training signal 913 leaks out to the region of the subcarrier 908. The training signal 911 is also in a state in which attenuation of the amplitude and rotation of the complex phase are applied compared with the training signal 906 of the transmit signal.

In the training signal as well as subcarriers including the user data, the signal of each subcarrier transmitted will be affected by the phase noise of the local oscillator of the transmitting and receiving stations, and the signal of each subcarrier leaks to the adjacent subcarriers, as in FIG. 26, but this way of leakage is common for all subcarriers. The pilot signal 906 similarly leaks to the adjacent subcarriers, but there is no allocation to the subcarriers on both sides of the pilot signal, the situation of leakage from the pilot signal can be recognized by using the empty subcarriers.

FIG. 27 illustrates a relationship of waveforms between a transmit signal and a receive signal. FIG. 27(A) illustrates a transmit signal on a transmitting side, and FIG. 27(B) illustrates a receive signal on a receiving side. In FIG. 27, 902 represents signals of individual subcarriers, 905 represents a reduced waveform region of the OFDM signal, 906 and 907 represent a pilot signal, 911 and 915 represent a training signal on the receiving side, 914 and 916 represent waveforms of the leakage signals from the pilot signals, 917 and 918 represent regions corresponding to FIG. 26, 919 represents signals of individual subcarriers on the receiving side, and 920 represents waveforms of individual subcarriers and leakage signals from the individual subcarriers.

For example, in a case where there are $2N_{PN}$ empty subcarriers between ±W/2 and ±W"/2, the $N_{PN}$ empty subcarriers on the center frequency side of the half of the subcarriers are strongly affected by leakage from the effective subcarriers used for the transmission of the user data (corresponding to the subcarriers including the user data and its leakage signal 920), and the signal detected on the remaining outer $N_{PN}$ empty subcarriers can be considered to be strongly affected by leakage from the pilot signals at both ends (the waveforms 914 and 916 of the leakage signals from the pilot signals). Thus, in the regions 917 and 918 including the guard band, considering the pilot signals on both ends and signal components detected on the $N_{PN}$ empty subcarriers on both sides of the pilot signals as the leakage components from the pilot signals as in FIG. 26, the coefficient $\beta_{k+k'}/\beta_k$ is calculated when the subcarrier number of the pilot signal is k (here, k=+K/2 or k=−K/2), and the coefficient of the (k+k')-th subcarrier obtained by FFT is $\beta_{k+k'}$. Here, the meaning of the description of "including the guard band" is to effectively utilize the FFT results of the guard band regions beyond the range where the subcarrier numbers are −K/2 to +K/2 to which the effective signals are allocated in Equation (2) (except for the center frequency).

Because the coefficient $\beta_k$ is detected as the coefficient obtained by multiplying the transfer function $h_k$ and the coefficient $\alpha_k$ described above, the transfer function $h_{k+k'}$ and the transfer function $h_k$ are canceled between the denominator and the numerator in the operation of the coefficient $\beta_{k+k'}/\beta_k$, and corresponds to the coefficient $\alpha_{k+k'}/\alpha_k$ that is not dependent on the transfer function. Thus, it is possible to determine the function $\phi_k$ (t) of Equation (5), in accordance with the pilot signals and the output information from FFT for the total ($2N_{PN}+1$) subcarriers adjacent to the pilot signal. Precisely, two functions $\Phi_{K/2}$ (t) and $\Phi_{-K/2}$ (t) are determined with respect to the (+K/2)-th subcarrier and the (−K/2)-th subcarrier at both ends of the band, and because each is expected to be the same value, it is possible to improve the accuracy of the function by making the average value {$\Phi_{K/2}$ (t)+$\Phi_{-K/2}$ (t)}/2 to be the function $\phi_k$ (t).

It is also possible to manage by the following procedure, which is substantially equivalent to the above processes. Because $h_{k+k'}\alpha_{k+k'}$ in Equation (3) above is equivalent to $\beta_{k+k'}$ as described above, based on the acquired coefficient $\beta_{k+k'}$, by inserting zero to the components other than k−$N_{PS}$ to k+$N_{PS}$ and performing IFFT processing on this, it is possible to reproduce $\psi_k$ (t) of Equation (3).

[Math. 7]

$$\Psi_k(t) \approx \sum_{k'=-N_{PS}}^{N_{PS}} \beta_{k+k'} e^{2\pi j(f_k + k'\Delta f)t} \tag{7}$$

By multiplying this $\psi_k$ (t) by $(1/\beta_k)^* \exp\{-2\pi j f_k t\}$, $\phi_k$ (t)$^{-1}$ corresponding to the inverse of Equation (5) can be obtained.

[Math. 8]

$$\Phi_k(t)^{-1} = \Psi_k(t) \times \frac{1}{\beta_k} e^{-2\pi j f_k t} \tag{8}$$

Note that although the amplitude components vary over time either in Equation (5) or Equation (7), even in a case where this amplitude variation is ignored to focus on the phase components only, and $\phi_k$ (t) is replaced by $\phi_k$ (t)/|$\phi_k$ (t)| to perform processing to compensate for the phase variations alone, a roughly equivalent effect can be obtained.

When the function $\phi_k$ (t) determined in this manner is multiplied by the sampling data (excluding the guard interval) for the actual one OFDM symbol, the receive signal of each subcarrier constituting the OFDM signal including phase noise is individually compensated for the phase noise, and as a result, interference between subcarriers of all subcarriers can be eliminated. In this manner, once the interference between subcarriers is compensated for, by performing FFT on this signal, it is possible to extract signals in the frequency domain without interference between subcarriers.

Note that, in a case that a training signal for channel estimation is transmitted in advance of the wireless signal in the payload region containing the user data, the processing related to the pilot signal is similarly required. In other words, in all OFDM symbols including the preamble signal, phase noise compensation processing in the symbol unit described above (note: the FFT processing is also incorporated into the phase noise compensation processing) is performed in advance of the FFT processing for the signal detection processing, and FFT and subsequent usual signal detection processing are performed on the sampling signal after the phase noise compensation and the conversion.

CITATION LIST

Non Patent Literature

NPL 1: Atsushi Ota, Yushi Shirato, Satoru Kurosaki, Kazuki Maruta, Takuto Arai, Tatsuhiko Iwakuni, Ken Tanaka, Masataka Iizuka, "Wireless Backhaul for Train-type Moving Cell with Time-domain Beam-forming", IEICE Technical Report, vol. 115, no. 369, RCS2015-272, pp. 169-174, December, 2015.

NPL 2: Atsushi Ota, Kazuki Maruta, Yushi Shirato, Satoru Kurosaki, Ken Tanaka, Masataka Iizuka, "Digital Assisted Analog Beamforming (DAABF) on Millimeter Wave Massive Antenna Array: Basic Concept of DAABF", IEICE Technical Report, vol. 116, no. 383, RCS2016-232, pp. 135-140, December, 2016.

SUMMARY OF THE INVENTION

Technical Problem

Although the above description has been described with the assumption that the transfer function $h_k$ is generally a constant in the frequency domain in the range of approximately $\Delta f^*2N_{PN}$ of the back and forth $N_{PN}$ carriers of the k-th subcarrier, it should be noted that the transfer function $h_k$ precisely behaves as follows.

For example, in a case of focusing on the frequency domain in the range of approximately $\Delta f^*2N_{PN}$ of the back and forth $N_{PN}$ carriers of the k-th subcarrier, the wavelengths are different for the frequency components $f_{k-NPN}$ and $f_{k+NPN}$ at both ends so as to be $c/f_{k-NPN}$ and $c/f_{k+NPN}$ for the speed of light c ($3*10^8$ m/s). In a case where the distance between the transmitting and receiving stations is L, the complex phase rotation amount will be $2\pi^*L^*f_{k-NPN}/c$ and $2\pi^*L^*f_{k+NPN}/c$ respectively while propagating the distance L at each wavelength, and the difference is $4\pi^*L^*\Delta f^*N_{PN}/C$. In a case where this value is sufficiently small, the above approximation holds true, but in a case where the value is a certain level, the approximation described above will be broken.

Here, assuming a one-wave model of only the full direct wave, the complex phase is simply rotated in proportion to the frequency so that the complex phase of the k-th subcarrier at the frequency $f_k$ is given as $L^*f_k/c$ at a point of the distance L. A graph of frequency dependence of the complex phase rotation with the frequency in the horizontal direction and the complex phase rotation amount in the vertical direction can be expressed in a monotonic linear function, and because of this monotonicity, the complex phase rotation does not affect the property degradation as frequency selectivity distortion in normal wireless signal processing, but even with a flat channel of only such direct waves, this complex phase rotation may not be negligible in the phase noise compensation described above.

Here, when the bandwidth is W at the center frequency $f_c$, the difference between the complex phase rotation amount $2\pi^*L^*(f_c+W/2)/c$ at $f_c+W/2$ with the shortest wavelength and the complex phase rotation amount $2\pi^*L^*(f_c-W/2)/c$ at $f_c-W/2$ with the longest wavelength is $2\pi^*L^*W/c$. Here, $N_p$ is defined as $N_p=L^*W/c$.

Next, consider the response of the time domain after performing inverse Fourier Transform to a channel with such frequency properties. With the number of FFT points being $N_{FFT}$, assume the channel in which channel response of each subcarrier is given by Equation (9) below.

[Math. 9]

$$h_k = e^{-2\pi j \times \frac{LW}{c} \times \frac{k}{N_{FFT}}} = e^{-2\pi j \times \frac{N_p}{N_{FFT}} \times k} \quad (9)$$

The time waveform obtained by performing IFFT on this channel has a value only in the time components delayed by $N_p$ samples, and the values of the other time components are zero, for the clock interval given by $\Delta T=1/W$. As a typical example, the inverse Fourier Transform of the channel, which is a constant for all frequency components where $N_p=0$, has a value only in the preceding wave components like a delta function, and the remaining components are zero. What is meant by this mathematical feature is that the behavior of a channel with such a linear complex phase rotation will appear in various phenomena as a delay for $N_p$ samples in the time domain.

In conclusion, in a case that the phase noise compensation of the channel in which the complex phase rotation of $2\pi^*N_p$ occurs in the entire band is processed by approximation only with a constant (no complex phase rotation), the estimated replica signal of the phase noise is determined to be a waveform delayed by $N_p$ samples. In a case where the temporal variation of the phase noise is gentle, the delay of the $N_p$ samples does not appear to be a large deviation from the waveform of the temporal variation of the actual phase noise, but in a case that the temporal variation of the phase noise is relatively steep and nonnegligible phase variations have occurred during the delay of the $N_p$ samples, then the phase shift due to the phase noise cannot be compensated appropriately without performing this compensation, and as a result, sufficient phase noise compensation effects may not be obtained. In such a case, there is a problem in that throughput decreases due to interference between subcarriers.

In light of the foregoing, an object of the present invention is to provide a technique capable of suppressing a decrease in throughput due to interference between subcarriers in wireless transmissions using high frequency bands such as millimeter waves.

Means for Solving the Problem

An aspect of the present invention is a wireless communication apparatus in a wireless communication system including a first wireless communication apparatus and a second wireless communication apparatus,
the first wireless communication apparatus including a transmit signal generation section configured to generate a transmit signal including information to be transmitted in a region or a portion of the region excluding an empty region within an effective bandwidth, the empty region being a predetermined frequency region within the effective bandwidth, a pilot signal assigning section configured to generate a pilot signal without an effective signal component at least in an adjacent frequency component to a predetermined frequency component within the effective bandwidth and assign the pilot signal to the transmit signal generated by the transmit signal generation section, and a transmission section configured to transmit the transmit signal including the pilot signal generated by the pilot signal assigning section at a wireless frequency, and the second wireless communication apparatus including a reception section configured to receive a signal of the wireless frequency, a time/frequency signal conversion section configured to convert the received signal received by the reception section or a frequency-converted signal obtained by frequency conversion of the received signal from a sampling signal in a time domain to a signal in a frequency domain, a section configured to set an approximate value L of a distance between the second wireless communication apparatus and the first wireless communication apparatus, a section configured to calculate a coefficient $\gamma_k$ given by Equation (10) below for the approximate value L of the distance, an effective bandwidth W, a speed of light c, a number of FFT points $N_{FFT}$ of the time/frequency conversion section, and a frequency component number k, a phase noise replica generation section configured to extract, from an output from the time/frequency signal conversion section, a signal in a frequency domain including a frequency component of the pilot signal and a plurality of peripheral frequency components including at least adjacent frequency components of the pilot signal, and generate a replica of phase noise, based on a coefficient for each frequency component of the extracted signal and the coefficient $\gamma_k$, a phase noise compensation section configured to generate a phase noise compensated sampling signal by using the replica of the phase noise and the sampling signal in the time domain or a sampling signal modified based on the sampling signal in the time domain, and a data reproduction section configured to reproduce data transmitted by the first wireless communication apparatus, based on an output signal from the phase noise compensation section.

An aspect of the present invention is the wireless communication apparatus described above, wherein the pilot signal assigning section is configured to allocate a subcarrier for a pilot signal to frequency components of both ends or to a frequency component of either end of the effective bandwidth, and set a neighboring subcarrier including an adjacent subcarrier as an empty subcarrier.

An aspect of the present invention is the wireless communication apparatus described above, wherein the pilot signal assigning section further includes a memory that stores sampling data of a length of one cycle or an integer multiple times of the cycle of a sine wave signal of a predetermined frequency or a synthesized signal of a plurality of sine wave signals of predetermined frequencies and a pilot signal output section configured to output continuous time domain signals of the pilot signal by repeatedly reading the sampling data from the memory at predetermined intervals.

An aspect of the present invention is the wireless communication apparatus described above, wherein the phase noise replica generation section is configured to generate sampling data at a time t by above-described Equation (5) or sampling data given by an inverse of Equation (5) as a replica of phase noise, based on a coefficient $\beta_k$ of the pilot signal of a k-th frequency component and a coefficient $\beta_{k+k}$ of a (k+k)-th frequency component acquired by the time/frequency signal conversion section, for a positive integer $N_{PN}$ greater than or equal to 1 and an integer k which satisfies $-N_{PN} \le k' \le N_{PN}$.

An aspect of the present invention is the wireless communication apparatus described above, wherein the phase noise replica generation section is configured to generate sampling data at a time t by following Equations (8) and (12) or sampling data given by an inverse of Equation (8) as a replica of phase noise, based on a coefficient $\beta_k$ of the pilot signal of a k-th frequency component and a coefficient $\beta_{k+k}$ of a (k+k)-th frequency component acquired by the time/frequency signal conversion section, for a positive integer $N_{PN}$ greater than or equal to 1 and an integer k which satisfies $-N_{PN} \le k' \le N_{PN}$.

An aspect of the present invention is the wireless communication apparatus described above, wherein the phase noise compensation section further includes a removal section configured to remove the pilot signal and predetermined frequency components around the pilot signal from a receive signal.

An aspect of the present invention is a wireless communication method performed by a wireless communication apparatus in a wireless communication system including a first wireless communication apparatus and a second wireless communication apparatus, the wireless communication method including, generating, by the first wireless communication apparatus, a transmit signal including information to be transmitted in a region or a portion of the region excluding an empty region within an effective bandwidth, the empty region being a predetermined frequency region within the effective bandwidth, generating, by the first wireless communication apparatus, a pilot signal without an effective signal component at least in an adjacent frequency component to a predetermined frequency component within the effective bandwidth and assigning the pilot signal to the transmit signal generated by the generating of the transmit signal, transmitting, by the first wireless communication apparatus, the transmit signal including the pilot signal generated by the assigning of the pilot signal at a wireless frequency, receiving, by the second wireless communication apparatus, a signal of the wireless frequency, converting, by the second wireless communication apparatus. the received signal received by the receiving or a frequency-converted signal obtained by frequency conversion of the received signal from a sampling signal in a time domain to a signal in a frequency domain, setting, by the second wireless communication apparatus, an approximate value L of a distance between the second wireless communication apparatus and the first wireless communication apparatus, calculating, by the second wireless communication apparatus, a coefficient $\gamma_k$ given by Equation (10) below for the approximate value L of the distance, an effective bandwidth W, a speed of light c, a number of FFT points $N_{FFT}$ of the time/frequency conversion section, and a frequency component number k, extracting, by the second wireless communication apparatus, from an output in the converting of the signal, a signal in a frequency domain including a frequency component of the pilot signal and a plurality of peripheral frequency components including at least adjacent frequency components of the pilot signal, and generating a replica of phase noise, based on a coefficient for each frequency component of the extracted signal and the coefficient $\gamma_k$, generating, by the second wireless communication apparatus, a phase noise compensated sampling signal by using the replica of the phase noise and the sampling signal in the time domain or a sampling signal modified based on the sampling signal in the time domain, and reproducing, by the second wireless communication apparatus, data transmitted by the first wireless communication apparatus, based on an output signal in the compensating of the phase noise.

Effects of the Invention

According to the present invention, it is possible to suppress a decrease in throughput due to interference between subcarriers caused by phase noise in wireless transmission using high frequency bands such as millimeter waves. Even in a case that the distance between the two wireless station apparatuses is relatively far away, it is possible to avoid the influence of frequency dependency of the channel caused by the distance, and it is possible to compensate for phase noise.

DESCRIPTION OF EMBODIMENTS

Figure 1:
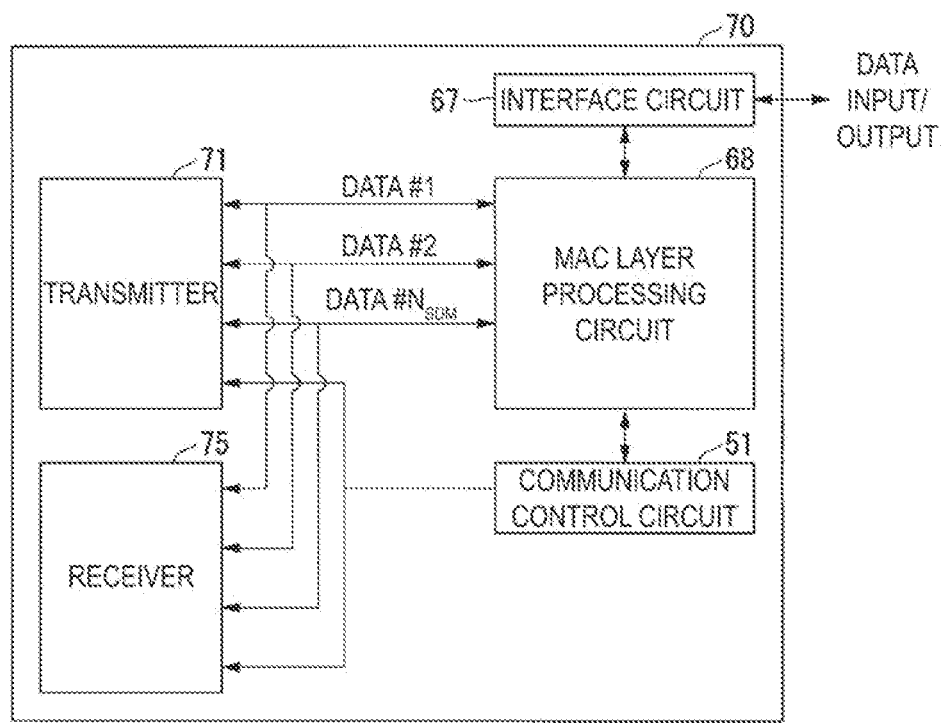
FIG. 1 is a diagram illustrating a circuit configuration of a wireless station apparatus according to a first embodiment.

In the following description, the processing of the related inventions which are the background of the present invention will be cited for description.

Basic Principles of Present Invention

The fundamental cause of the above problem is because the channel information used to estimate the phase noise includes a term of phase rotation proportional to the distance. For example, assuming that the approximate value of the distance of the two wireless station apparatuses is L, the cancellation of the phase rotation amount proportional to the distance can be performed by the coefficient $\gamma_k$ for the subcarrier number k indicated by the following Equation (10).

[Math. 10]

$$\gamma_k = e^{2\pi j \times \frac{L'W}{c} \times \frac{k}{N_{FFT}}} \tag{10}$$

Here, for the subcarrier number of k, the center frequency may be considered as zero, or the subcarrier having the lowest frequency may have k=1. In any case, all the subcarriers are only multiplied by a predetermined coefficient, and thus, for the subcarrier number of k, the subcarrier number may be assigned in a manner that is added one at a time from the lower to the higher of the frequency. With such a configuration, for the influence of the phase rotation proportional to the distance per subcarrier, the error can be suppressed to the value of the error of the estimated distance L instead of the actual distance L, that is, the degree of δL=(L−L'). As an example, assuming that L=100 [m], δL=3

[m], and W=1 [GHz], the original phase rotation $N_p$ (=L*W/c) is approximately 333, and the time lag of 333 samples cannot be ignored. On the other hand, in a case that the above-described compensation is performed, the phase rotation amount remaining in the bandwidth is $2\pi*(L-L)*W/c$, and in a case where this is let to be $N_p$, $N_p$ is approximately 10. In a case where the error is approximately 10 samples, the amount of phase shift due to phase noise is expected to be within error margin, so the problem described above can be generally solved.

Note that the measurement of this distance may be measured directly by using a laser pointer type distance measurement apparatus, or may be calculated based on the information of the installation location. In any case, in a case where the distance can be determined with an error of a few percent, the time lag of the replica of the phase noise will be significantly modified.

The coefficient determined in this manner can be used, for example, by replacing Equation (5) with the following Equation (11).

[Math. 11]

$$\Phi_k(t) = \left( \sum_{k'=-N_{PS}}^{N_{PS}} \frac{\alpha_{k+k'}}{\alpha_k} \times \gamma_{k+k'} e^{2\pi j k' \Delta f t} \right)^{-1} \quad (11)$$

Alternatively, the coefficient determined in this manner can be used by replacing Equation (7) with the following Equation (12).

[Math. 12]

$$\Psi_k(t) \approx \sum_{k'=-N_{PS}}^{N_{PS}} \beta_{k+k'} \times \gamma_{k+k'} e^{2\pi j (f_k + k' \Delta f) t} \quad (12)$$

In the present invention, the coefficient $\gamma_k$ is calculated in the wireless station apparatus of the receiving side so as to cancel the phase rotation amount proportional to the distance as described above. The wireless station apparatus of the receiving side generates a replica signal of the phase noise by using the calculated coefficient $\gamma_k$ and the coefficient for each frequency component of the signal, and cancels the phase rotation amount by using the generated replica signal of the phase noise. The problem described above is solved by performing such a process.

Features of the circuit configurations in each embodiment will be described below with reference to the drawings. For a representative example, an OFDM modulation scheme is described as an example herein, but extension is possible even in a case of other single carrier transmission, which will be described later. Although the transmission weight and the reception weight in the time domain are also referred to herein as the time axis transmission weight and the time axis reception weight, these "time axis" and "time domain" are synonymous.

First Embodiment

Hereinafter, the first embodiment of the present invention will be described with mainly reference to diagrams related to circuit configurations.

Circuit Configuration According to First Embodiment

FIG. 1 is a diagram illustrating a circuit configuration of a wireless station apparatus 70 according to the first embodiment. As illustrated in FIG. 1, the wireless station apparatus 70 includes a transmitter 71, a receiver 75, an interface circuit 67, a Medium Access Control (MAC) layer processing circuit 68, and a communication control circuit 51.

The wireless station apparatus 70 inputs/outputs data from/to an external device or a network via the interface circuit 67. The interface circuit 67 detects data to be transferred on the wireless circuit from the data input, and outputs the detected data to the MAC layer processing circuit 68. The MAC layer processing circuit 68 performs processing related to the MAC layer in accordance with an instruction from the communication control circuit 51 configured to perform management control of the operation of the entire wireless station apparatus 70. In MIMO transmission, for spatially multiplexing and transmitting signals to one wireless station apparatus 70, signal sequences of a plurality of systems are output from the MAC layer processing circuit 68 to the transmitter 71.

Figure 2:
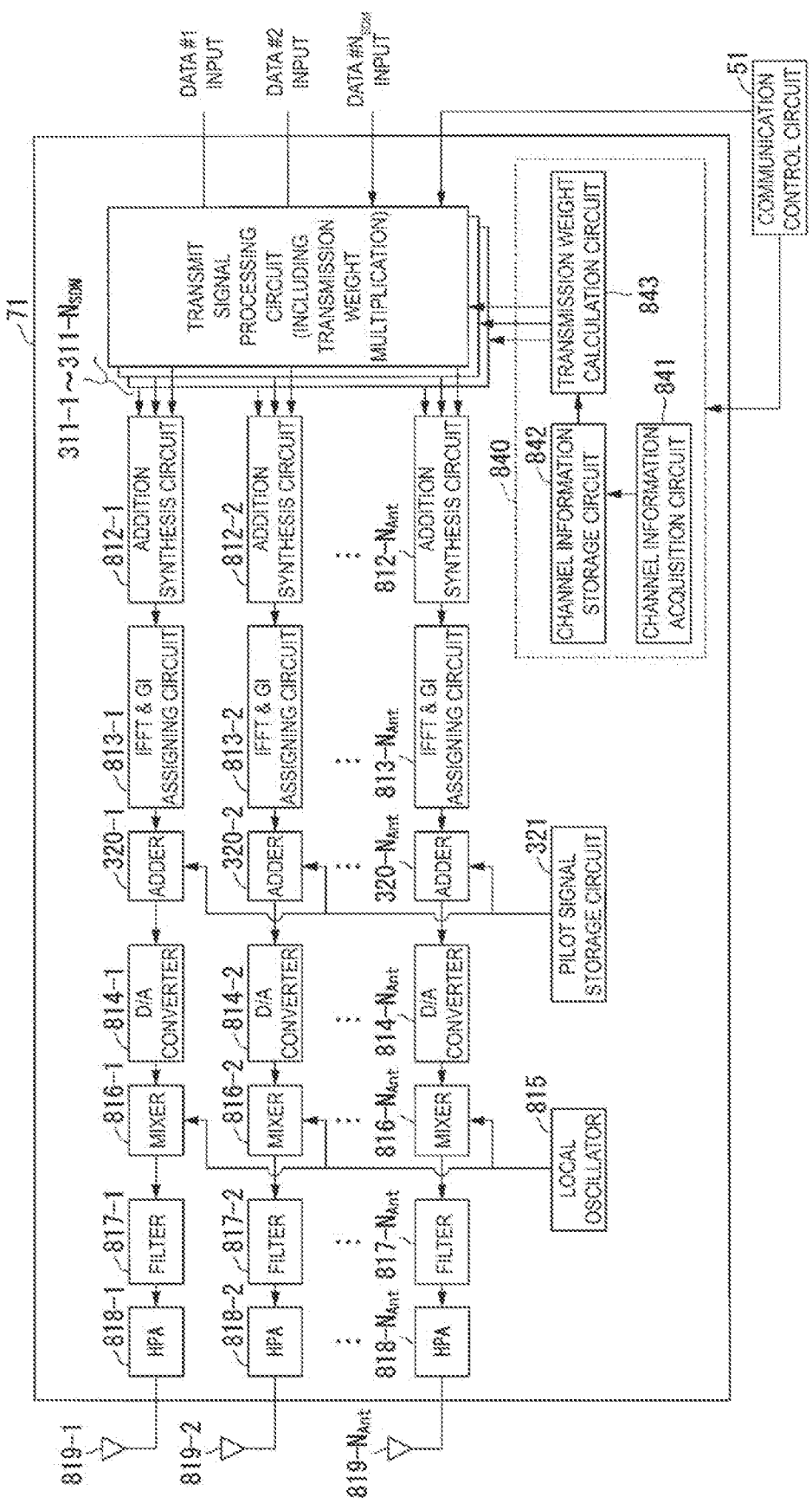
FIG. 2 is a schematic block diagram illustrating an example of a configuration of a transmitter of the wireless station apparatus according to the first embodiment.

FIG. 2 is a schematic block diagram illustrating an example of a configuration of the transmitter 71 of the wireless station apparatus 70 according to the first embodiment. As illustrated in FIG. 2, the transmitter 71 includes: transmit signal processing circuits 311-1 to 311-$N_{SDM}$; addition synthesis circuits 812-1 to 812-$N_{Ant}$; IFFT & GI assigning circuits 813-1 to 813-$N_{Ant}$; D/A converters 814-1 to 814-$N_{Ant}$; a local oscillator 815; mixers 816-1 to 816-$N_{Ant}$; filters 817-1 to 817-$N_{Ant}$; high power amplifiers 818-1 to 818-$N_{Ant}$; antenna elements 819-1 to 819-$N_{Ant}$; adders 320-1 to 320-$N_{Ant}$; a pilot signal storage circuit 321; and a transmission weight processing unit 840. The transmit signal processing circuits 311-1 to 311-$N_{SDM}$ and the transmission weight processing unit 840 are connected to the communication control circuit 51.

The transmission weight processing unit 840 includes a channel information acquisition circuit 841, a channel information storage circuit 842, and a transmission weight calculation circuit 843. Here, the subscript $N_{SDM}$ of the transmit signal processing circuits 311-1 to 311-$N_{SDM}$ in FIG. 2 represents the number of multiplexing for performing spatial multiplexing at the same time. $N_{SDM}$ representing the number of multiplexing for performing spatial multiplexing at the same time is the same in the following embodiments. The subscript $N_{Ant}$ of the circuits from the addition synthesis circuits 812-1 to 812-$N_{Ant}$ to the antenna elements 819-1 to 819-$N_{Ant}$ represents the number of antenna elements provided in the wireless station apparatus 70. $N_{ANT}$ representing the number of antenna elements provided in the wireless station apparatus 70 is the same in the following embodiments.

Figure 23:
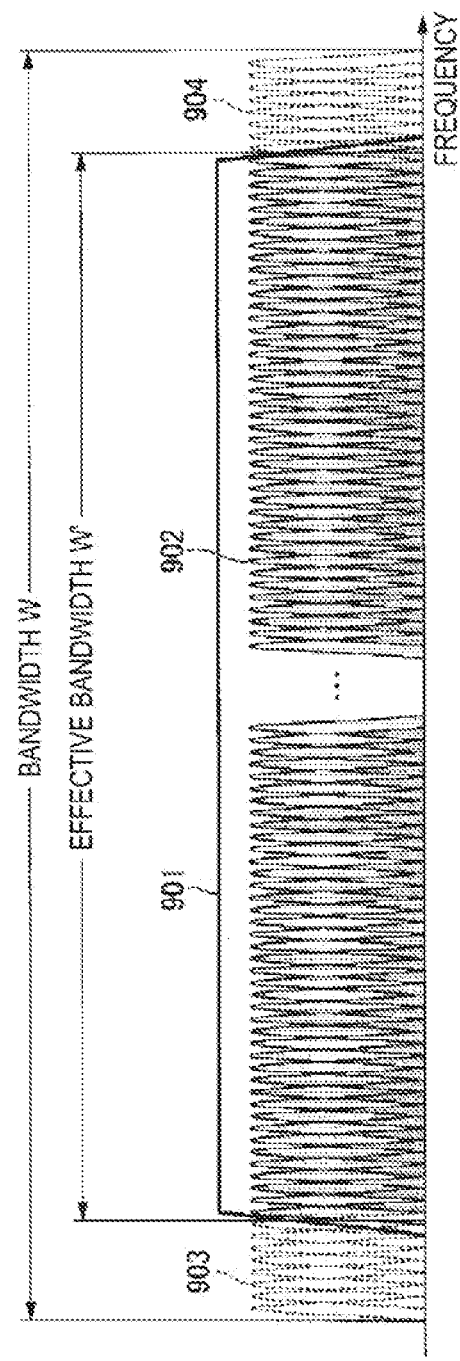
FIG. 23 is a diagram illustrating a specific example of a waveform of an OFDM signal in related art.
Figure 25:
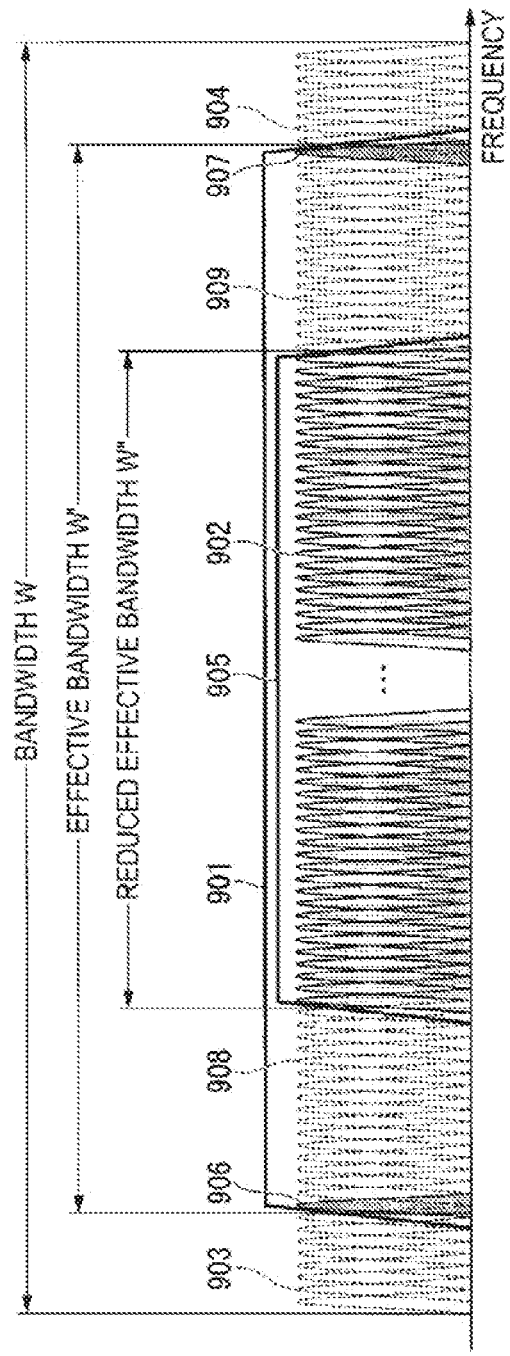
FIG. 25 is a diagram illustrating a specific example of a waveform of an OFDM signal according to related art.

Here, the transmit signal processing circuits 311-1 to 311-$N_{SDM}$ differ from the transmit signal processing circuits configured to generate the OFDM signal having the effective bandwidth W illustrated in FIG. 23 in that the transmit signal processing circuits 311-1 to 311-$N_{SDM}$ generate an OFDM signal having a reduced effective bandwidth W" in FIG. 25, but other functions are the same. The transmit signal processing circuits 311-1 to 311-$N_{SDM}$ perform signal processing of the reduced effective bandwidth W", and thus the transmission weight input from the transmission weight processing unit 840 is only for a subcarrier for allocation.

In the background art, because a single wireless station apparatus 70 spatially multiplexes and transmits signals to other wireless station apparatuses 70, signal sequences of a plurality of systems are input from the MAC layer processing circuit 68 to the transmitter 71, and the input signal sequences of a plurality of systems are input to the transmit signal processing circuits 311-1 to 311-$N_{SDM}$. The transmit signal processing circuits 311-1 to 311-$N_{SDM}$ perform modulation processing on the data (data input #1 to #$N_{SDM}$) to be transmitted to a destination wireless station apparatus 70 when the data to be transmitted (wireless packets) is input from the MAC layer processing circuit 68 on a wireless circuit. Here, modulation processing is performed on signals of each signal sequence for each subcarrier in the reduced effective bandwidth W" illustrated in FIG. 25, for example, in a case of using an OFDM modulation scheme. Furthermore, the transmit signal processing circuits 311-1 to 311-$N_{SDM}$ multiply the baseband signal after the modulation processing with the transmission weight for each subcarrier.

The signal multiplied by the transmission weight corresponding to each of the antenna elements 819-1 to 819-$N_{Ant}$ is subjected to a remaining signal processing as necessary, and the signal is input from each of the transmit signal processing circuits 311-1 to 311-$N_{SDM}$ to the addition synthesis circuits 812-1 to 812-$N_{Ant}$ as a signal in the frequency domain of the transmit signal in the baseband. The signal input to the addition synthesis circuits 812-1 to 812-$N_{Ant}$ is synthesized for each subcarrier. The synthesized signal is converted from a signal on the frequency axis to a signal on the time axis in the IFFT & GI assigning circuits 813-1 to 813-$N_{Ant}$, and is further subjected to processing such as insertion of a guard interval or waveform shaping in between OFDM symbols (between blocks of block transmission in a case of SC-FDE). Sampling data of the pilot signal is output from the pilot signal storage circuit 321 and is added to the output signal from the IFFT & GI assigning circuits 813-1 to 813-$N_{Ant}$ by the adders 320-1 to 320-$N_{Ant}$. From the pilot signal storage circuit 321, the sampling data is repeatedly output in a form that each sine wave waveform of the pilot signal is continuous. The signal added by the adders is converted for each system of the antenna elements 819-1 to 819-$N_{Ant}$ from digital sampling data to analog signals in the baseband at the D/A converters 814-1 to 814-$N_{Ant}$. Further, each analog signal is multiplied by a local oscillating signal input from the local oscillator 815 by the mixers 816-1 to 816-$N_{Ant}$ and up-converted to a wireless frequency signal. Here, the up-converted signal includes a signal in a region outside of the band of the channel to be transmitted, so that a signal outside of the band is removed at the filters 817-1 to 817-$N_{Ant}$ to generate a signal to be transmitted. The generated signal is amplified by the high power amplifiers 818-1 to 818-$N_{Ant}$ and transmitted from the antenna elements 819-1 to 819-$N_{Ant}$.

Note that, in FIG. 2, processing such as IFFT processing, insertion of a guard interval, waveform shaping, or the like is performed after the addition synthesis of the signal of each subcarrier is performed by the addition synthesis circuits 812-1 to 812-$N_{Ant}$, but by causing these processes to be performed in the transmit signal processing circuits 311-1 to 311-$N_{SDM}$, and by synthesizing the sampling signals on the time axis after IFFT by the addition synthesis circuits 812-1 to 812-$N_{Ant}$, the IFFT & GI assigning circuits 813-1 to 813-$N_{Ant}$ may be omitted (precisely, the IFFT & GI assigning circuits 813-1 to 813-$N_{Ant}$ may be included in the transmit signal processing circuits 311-1 to 311-$N_{SDM}$). In this case, remaining signal processing as necessary after the transmission weight multiplication in the transmit signal processing circuits 311-1 to 311-$N_{SDM}$ refers to processing such as IFFT processing, insertion of a guard interval, waveform shaping, or the like.

The transmission weight multiplied by the transmit signal processing circuits 311-1 to 311-$N_{SDM}$ is acquired from the transmission weight calculation circuit 843 included in the transmission weight processing unit 840 during the signal transmission processing. The transmission weight processing unit 840 separately acquires the channel information acquired at the receiver 75 via the communication control circuit 51 in the channel information acquisition circuit 841, and stores the channel information in the channel information storage circuit 842 while sequentially updating the channel information. Upon transmission of the signal, in accordance with an instruction from the communication control circuit 51, the transmission weight calculation circuit 843 reads the channel information corresponding to the destination station from the channel information storage circuit 842, and calculates the transmission weight on the basis of the read channel information. The transmission weight calculation circuit 843 outputs the calculated transmission weight to the transmit signal processing circuits 311-1 to 311-$N_{SDM}$. In a case that the wireless station apparatus is a base station, the communication control circuit 51 manages which terminal station apparatus the destination station is to communicate with a plurality of terminal station apparatuses.

Note that the signals of the $N_{SDM}$ systems output from the transmit signal processing circuits 311-1 to 311-$N_{SDM}$ are synthesized in the addition synthesis circuits 812-1 to 812-$N_{Ant}$, and the following D/A converters 814-1 to 814-$N_{Ant}$ to the antenna elements 819-1 to 819-$N_{Ant}$ are used together, but the signals may be implemented individually from the following D/A converters 814-1 to 814-$N_{Ant}$ to the antenna elements 819-1 to 819-$N_{Ant}$ without being synthesized at the addition synthesis circuits 812-1 to 812-$N_{Ant}$, and a subarray may be configured by the antenna elements 819-1 to 819-$N_{Ant}$ in each of the antennas. Furthermore, in this case, the transmission weight calculation circuit 843 can use a virtual transmission line corresponding to the first singular value between the array antennas or the subarrays in the transmitter 71 of a wireless station apparatus 70 and in the receiver 75 of a wireless station apparatus 70 in the calculation of the transmission weight. There are several variations in the method of channel estimation and the method of calculating the transmission and/or reception weight in a case of utilizing the virtual transmission line corresponding to the first singular value. For example, a first right singular vector upon singular value decomposition may be used for the transmission weight vector for each channel matrix from the wireless station apparatus 70 towards the antenna elements 819-1 to 819-$N_{Ant}$ of another wireless station apparatus 70. In this case, the transmission weight calculation circuit 843 has the function of calculating this first right singular vector. Otherwise, various approaches to acquiring an approximate solution of such a singular vector may be used.

For example, a first right singular vector upon singular value decomposition may be used for the transmission weight vector for each channel matrix from the wireless station apparatus 70 towards the antenna elements 819-1 to 819-$N_{Ant}$ of another wireless station apparatus 70. In this case, the transmission weight calculation circuit 843 has the function of calculating this first right singular vector. Otherwise, various approaches to acquiring an approximate solution of such a singular vector may be used.

In the above description, the assignment of the pilot signal at both ends of the effective bandwidth is performed at the adders 320-1 to 320-$N_{Ant}$ between the IFFT & GI assigning circuits 813-1 to 813-$N_{Ant}$ and the D/A converters 814-1 to 814-$N_{Ant}$. In contrast, a configuration may be adopted in which a signal allocated a pilot signal to the subcarriers on both ends of the effective bandwidth is generated in the transmit signal processing circuits 311-1 to 311-$N_{SDM}$, and a predetermined signal processing such as multiplication of the transmission weight is performed on the signal. In this case, the adders 320-1 to 320-$N_{Ant}$ and the pilot signal storage circuit 321 are unnecessary, and equivalent processing is performed in the transmit signal processing circuits 311-1 to 311-$N_{SDM}$.

Figure 3:
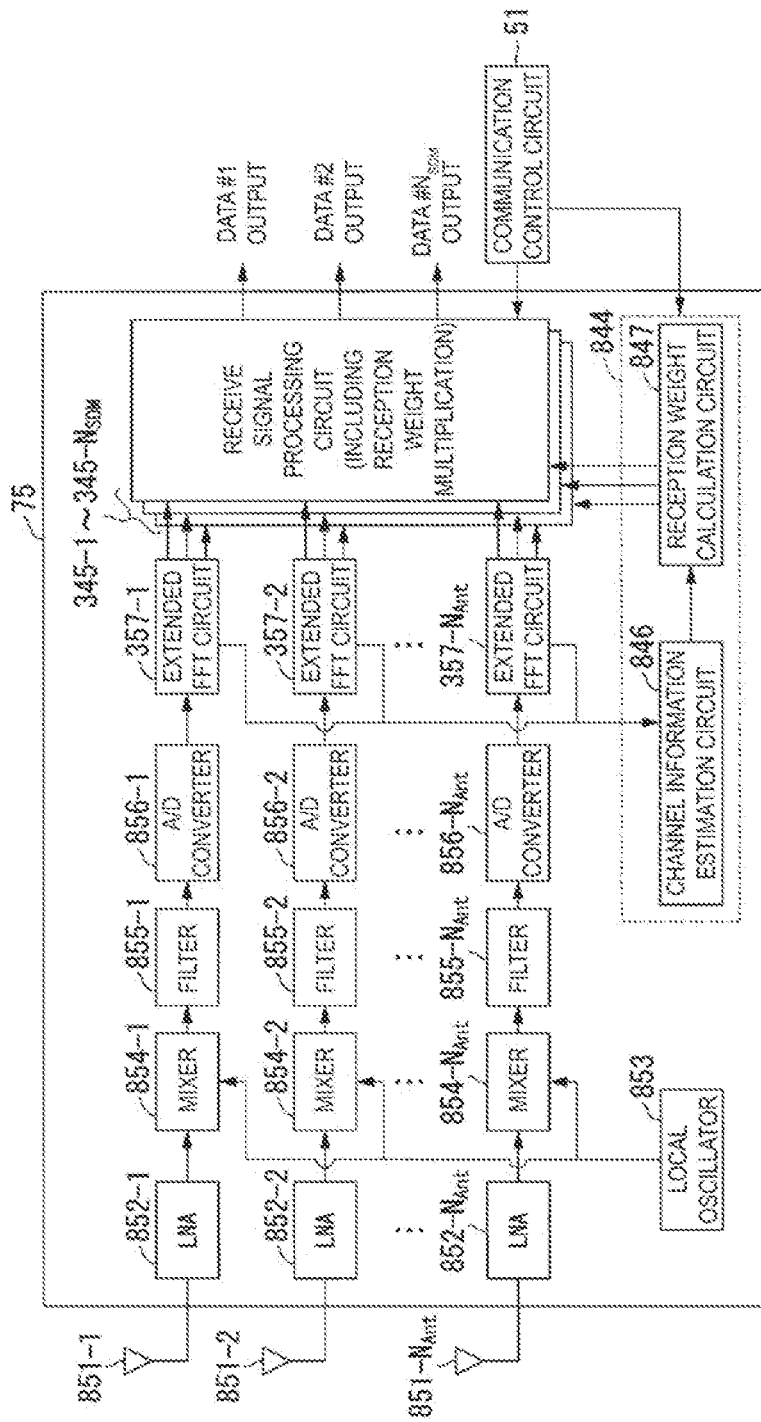
FIG. 3 is a schematic block diagram illustrating an example of a configuration of a receiver of the wireless station apparatus according to the first embodiment.

Next, FIG. 3 is a schematic block diagram illustrating an example of a configuration of the receiver 75 of the wireless station apparatus 70 according to the first embodiment. As illustrated in FIG. 3, the receiver 75 includes: antenna elements 851-1 to 851-$N_{Ant}$; low noise amplifiers (LNA) 852-1 to 852-$N_{Ant}$; a local oscillator 853: mixers 854-1 to 854-$N_{Ant}$; filters 855-1 to 855-$N_{Ant}$; A/D (analog to digital) converters 856-1 to 856-$N_{Ant}$; extended FFT circuits 357-1 to 357-$N_{Ant}$; receive signal processing circuits 345-1 to 345-$N_{SDM}$; and a reception weight processing unit 844. The receive signal processing circuits 345-1 to 345-$N_{SDM}$ and the reception weight processing unit 844 are connected to the communication control circuit 51 illustrated in FIG. 1. The reception weight processing unit 844 includes a channel information estimation circuit 846 and a reception weight calculation circuit 847.

First, a signal received at the antenna elements 851-1 to 851-$N_{Ant}$ is amplified by the low noise amplifiers 852-1 to 852-$N_{Ant}$. The amplified signal and a local oscillating signal output from the local oscillator 853 are multiplied by the mixers 854-1 to 854-$N_{Ant}$, and the amplified signal is down-converted from the wireless frequency signal to the baseband signal. The down-converted signal also includes signals outside of the frequency band to be received, so that the filters 855-1 to 855-$N_{Ant}$ remove out-of-band components. The signal from which the out-of-band components have been removed is converted to a digital baseband signal by the A/D converters 856-1 to 856-$N_{Ant}$. For example, in a case that OFDM is used, the digital baseband signal is input to the extended FFT circuits 357-1 to 357-$N_{Ant}$, the extended FFT circuits 357-1 to 357-$N_{Ant}$ perform the phase noise compensation processing described below, and a signal on the time axis is converted (separated into a signal of each subcarrier) to a signal on the frequency axis at a predetermined symbol timing determined by a circuit for timing detection of which description is omitted herein. The signal separated into each subcarrier is input to the receive signal processing circuits 345-1 to 345-$N_{SDM}$, and is also input to the channel information estimation circuit 846.

In the channel information estimation circuit 846, a channel vector of channel information between the antenna elements 819-1 to 819-$N_{Ant}$ on the transmitting station side and the antenna elements 851-1 to 851-$N_{Ant}$ on the receiving station side are estimated for each subcarrier, based on a known signal for channel estimation separated into each subcarrier (such as a preamble signal assigned to the head of the wireless packet), and the estimation result is output to the reception weight calculation circuit 847. In the reception weight calculation circuit 847, the reception weight to be multiplied is calculated for each subcarrier, based on the input channel information.

For this reception weight, for example, a ZF type pseudo-inverse is utilized as described above, or an MMSE type reception weight matrix is utilized. At this time, the reception weight vectors for synthesizing the signals received at each of the antenna elements 851-1 to 851-$N_{Ant}$ are different from each other for each signal sequence, correspond to a row vector, such as the ZF type pseudo-inverse matrix or the MMSE type reception weight matrix described above, and are input to the receive signal processing circuits 345-1 to 345-$N_{SDM}$ corresponding to the signal sequence to be extracted.

In the receive signal processing circuits 345-1 to 345-$N_{SDM}$, the reception weight input from the reception weight calculation circuit 847 is multiplied by the signal input from the extended FFT circuits 357-1 to 357-$N_{Ant}$ for each subcarrier, and the signals received at each of the antenna elements 851-1 to 851-$N_{Ant}$ are added and synthesized for each subcarrier. The receive signal processing circuits 345-1 to 345-$N_{SDM}$ perform demodulation processing on the added and synthesized signals, and output the reproduced data to the MAC layer processing circuit 68.

Here, different signal processing of signal sequences are performed in different receive signal processing circuits 345-1 to 345-$N_{SDM}$. MLD or simple MLD using QR decomposition or the like may be used as the receive signal processing across the plurality of receive signal processing circuits 345-1 to 345-$N_{SDM}$. The MAC layer processing circuit 68 performs processing related to the MAC layer (e.g., conversion of data input and output to and from the interface circuit 67, and data transmitted and/or received on the wireless circuit, i.e., wireless packets, termination of header information of the MAC layer, or the like). The receive data processed by the MAC layer processing circuit 68 is output to an external device or a network via the interface circuit 67. The communication control circuit 51 manages control related to the overall communication, such as overall timing control.

Similarly to the transmitter 71, the receiver 75 uses the antenna elements 851-1 to 851-$N_{Ant}$ to the extended FFT circuits 357-1 to 357-$N_{Ant}$ together, and copies the output from the extended FFT circuits 357-1 to 357-$N_{Ant}$ into $N_{SDM}$ systems to input to the individual receive signal processing circuits 345-1 to 345-$N_{SDM}$. In contrast, the antenna elements 851-1 to 851-$N_{Ant}$ to the extended FFT circuits 357-1 to 357-$N_{Ant}$ may be implemented individually, and each of the antenna elements 851-1 to 851-$N_{Ant}$ may be implemented to have a subarray configuration.

Furthermore, in this case, a virtual transmission line corresponding to the first singular value may be used between the array antennas or the subarrays in the transmitter 71 of a wireless station apparatus 70 and in the receiver 75 of a wireless station apparatus 70 in the calculation of the reception weight. There are several variations in the method of channel estimation and the method of calculating the transmission and/or reception weight in a case of utilizing the virtual transmission line corresponding to the first singular value. For example, a first left singular vector upon singular value decomposition may be used for the reception weight vector for each channel matrix from another wireless station apparatus 70 towards the antenna elements 819-1 to 819-$N_{Ant}$ of the self-station. In this case, the reception weight calculation circuit 847 has the function of calculating this first left singular vector. Otherwise, various approaches to acquiring an approximate solution of such a singular vector may be used.

Figure 4:
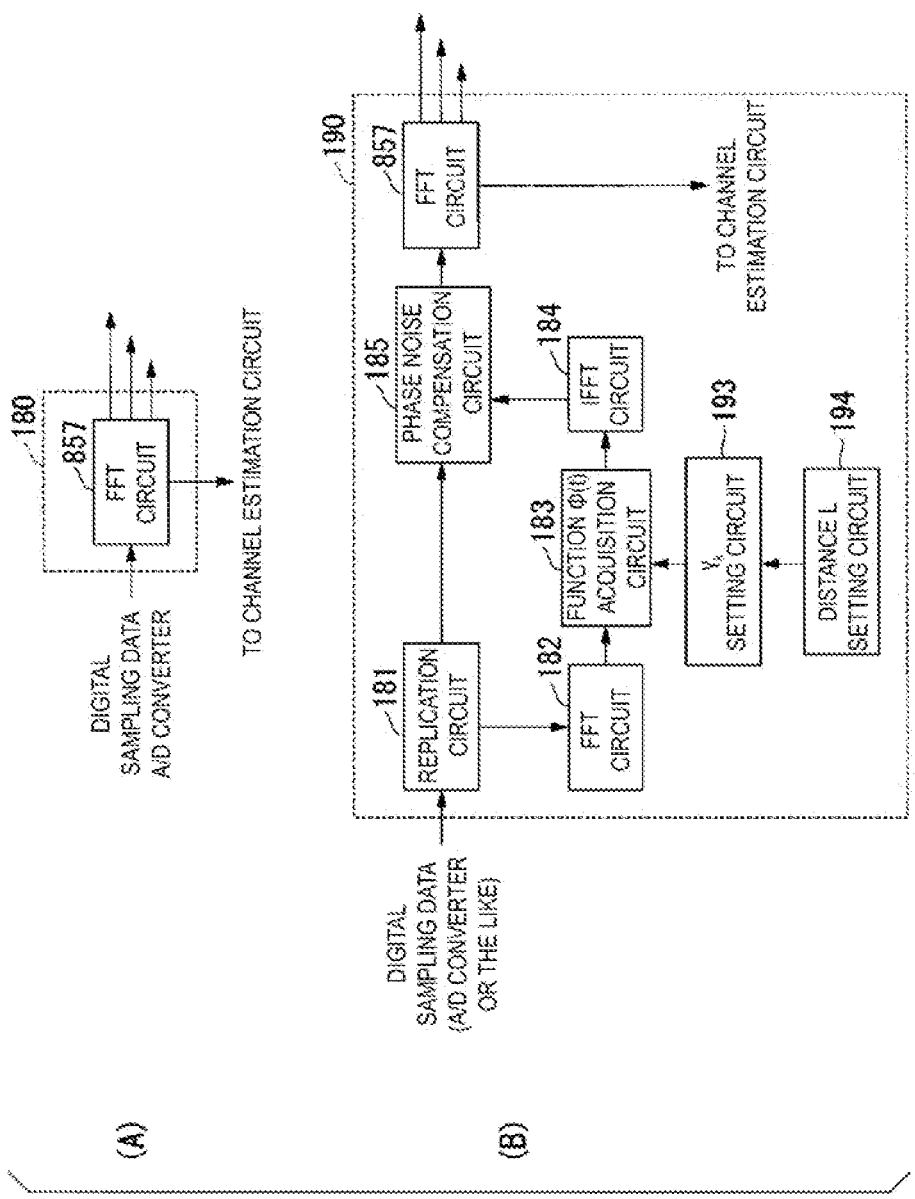
FIG. 4 is a schematic block diagram illustrating an example of a configuration of an extended FFT circuit according to the first embodiment.

The phase noise compensation processing performed by the extended FFT circuits 357-1 to 357-$N_{Ant}$ will be described below. FIG. 4 is a schematic block diagram illustrating an example of a configuration of the extended FFT circuit 357 according to the first embodiment. As illustrated in FIG. 4, a block 180 (FIG. 4(A)) corresponding to a functional block of an FFT circuit according to related art is changed to a block 190 (FIG. 4(B)) in the extended FFT circuit according to the first embodiment. As illustrated in FIG. 4(B), the extended FFT circuit 357 includes a replication circuit 181, an FFT circuit 182, a function φ (t) acquisition circuit 183, an IFFT circuit 184, a phase noise compensation circuit 185, a $\gamma_k$ setting circuit 193, a distance L setting circuit 194, and an FFT circuit 857. The extended FFT circuits 357 is connected to the receive signal processing circuit 345, the reception weight processing unit 844, and the A/D converter 856 in FIG. 3.

First, when the wireless station apparatus is placed before the operation is started, the installer calculates an approximate value L of the distance between two wireless station apparatuses in any approach, and sets this by the distance L setting circuit 194. For this setting, there may be a section for numerical input on the apparatus, or a configuration may be used in which another apparatus for control (such as a PC) is connected and setting is performed from outside. The distance L' set in this way is input to the $\gamma_k$ setting circuit 193, $\gamma_k$ is calculated by Equation (10) by using the L' in the $\gamma_k$ setting circuit 193, and this is input to the function Φ (t) acquisition circuit 183 for preliminary preparation.

Next, digital sampling data is input from the A/D converter 856 to the extended FFT circuits 357 (block 190), the sampling data is replicated in the replication circuit 181, and one of the replicated sampling data is input to the FFT circuit 182 and the other is input to the phase noise compensation circuit 185. The FFT circuit 182 performs FFT on the sampling data cut at a predetermined symbol timing determined by the timing detection unit not illustrated in the drawing, extracts components related to the pilot signal and the subcarrier regions 917 and 918 in the vicinity of this in FIG. 3, and inputs this information into the function Φ (t) acquisition circuit 183. The function Φ (t) acquisition circuit 183 calculates the value corresponding to the coefficient $\gamma_{k+k}*\alpha_{k+k}/\alpha_k$ of the function $\Phi_k$ (t) of Equation (5) by the approach described above by the operation of the coefficient described above $\gamma_{k+k}*\beta_{k+k}/\beta_k$, based on the output of the FFT circuit 182. Thus, the coefficient in the frequency domain of the inverse of the function Φ (t) is determined.

Furthermore, based on this information, the IFFT circuit 184 converts the signal in the frequency domain into a signal in the time domain, and inputs the signal in the time domain into the phase noise compensation circuit 185. The phase noise compensation circuit 185 multiplies the values of the inverse of the time domain signal input from the IFFT circuit 184 (i.e., function φ (t)) and the time domain signal to be input from the replication circuit 181 (precisely, the time axis signal corresponding to the region from which the guard interval has been removed with FFT performed in the FFT circuit 182) for each sampling data as illustrated in Equation (6), and reproduces the signal in the time domain on which phase noise compensation has been performed. This reproduced signal in the time domain (sampling data) is input to the FFT circuit 857, and is again converted from the signal in the time domain to the signal in the frequency domain. However, the signal in the frequency domain is a signal compensated for phase noise, and the leakage of power between subcarriers is suppressed. The signal in the frequency domain is input to the receive signal processing circuit 345, and the receive signal processing circuit 345 performs predetermined receive signal processing.

Although the signal processing performed by the receive signal processing circuit 345 is basically equivalent to the conventional receive signal processing circuit, the receive signal processing circuit of related art processes the OFDM signal of the effective bandwidth W illustrated in FIG. 23, whereas in the embodiment of the present invention, the receive signal processing circuit 345 performs receive signal processing of the reduced effective bandwidth W" illustrated in FIG. 25. At this time, the signal components of the pilot signal or an empty subcarrier region are neglected to perform processing and thus the signal components are illustrated as different functional blocks precisely, but while the range of the effective subcarrier is different, the signal processing other than that is equivalent at all. Thus, the configuration is equivalent at all to the known configuration except that the effective bandwidth W is changed to the reduced effective bandwidth W" in this manner, including the output of the information to the reception weight processing unit 844.

Figure 5:
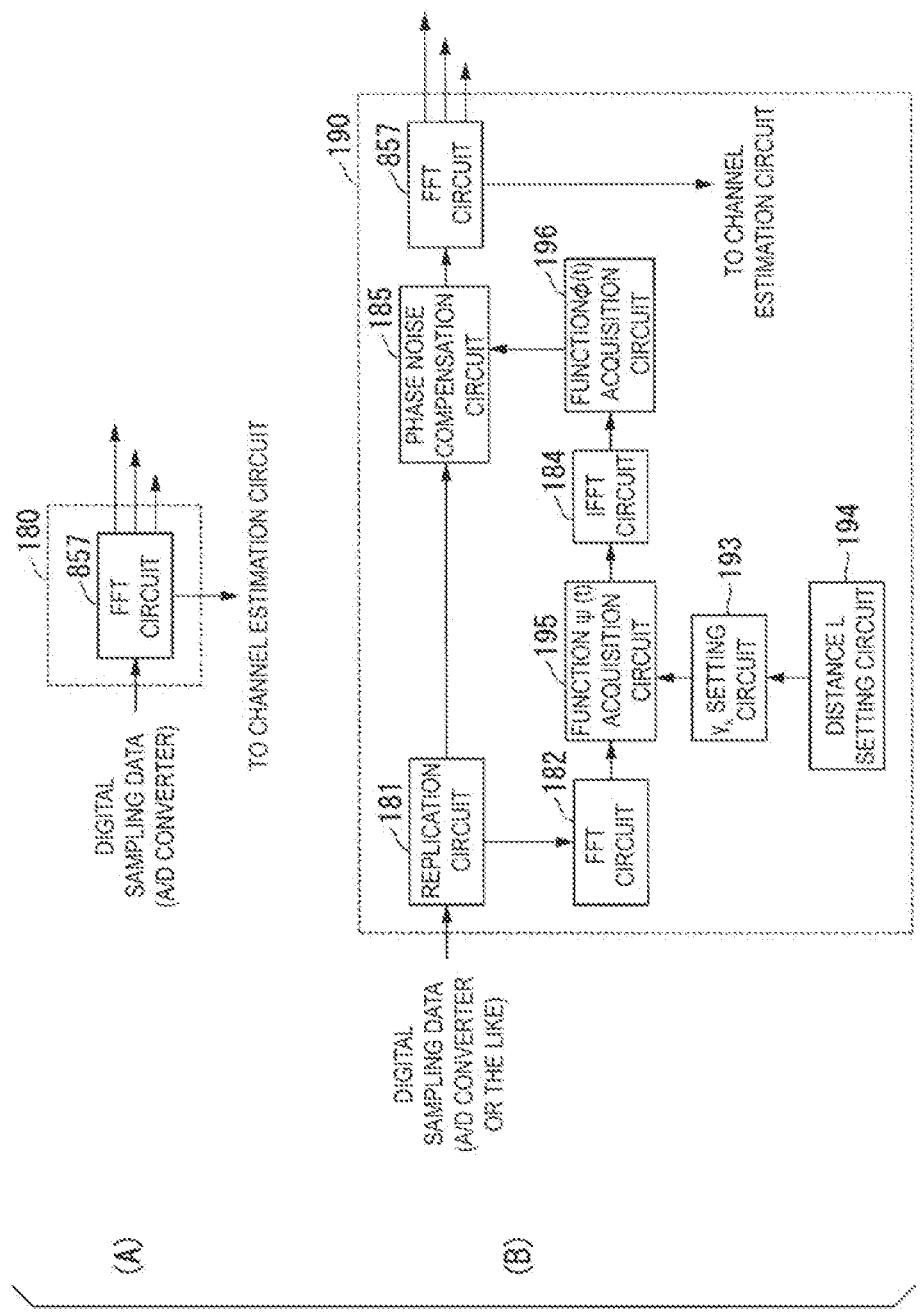
FIG. 5 is a schematic block diagram illustrating another example of a configuration of an extended FFT circuit according to the first embodiment.

For another configuration to achieve a similar effect, the configuration of FIG. 5 may be used in which processing is performed in Equation (12) instead of Equation (11). In FIG. 5, in addition to FIG. 4, a function ψ (t) acquisition circuit 195, and a function φ (t) acquisition circuit 196 are added, and the function φ (t) acquisition circuit 183 is deleted.

In FIG. 5, the configuration is the same as FIG. 4 until $\gamma_k$ is calculated according to Equation (10), but is only different in that this result is input to the function ψ (t) acquisition circuit 195 for preliminary preparation.

As a difference of processing other than this, the FFT circuit 182 performs FFT on the sampling data cut at a predetermined symbol timing determined by the timing detection unit not illustrated in the drawing, extracts components related to the pilot signal and the subcarrier regions 917 and 918 in the vicinity of this in FIG. 3, and inputs this information into the function ψ (t) acquisition circuit 195. The function ψ (t) acquisition circuit 195 calculates the value corresponding to the coefficient $\gamma_{k+k}*\beta_{k+k}$ of the function $\psi_k$ (t) of Equation (12), based on the output of the FFT circuit 182. Thus, the coefficient in the frequency domain of the function ψ (t) is determined.

Furthermore, based on this information, the IFFT circuit 184 converts the signal in the frequency domain into a signal in the time domain, and inputs the signal to the function φ (t) acquisition circuit 196. The function φ (t) acquisition circuit 196 calculates the function φ (t) by using Equation (8) and inputs the signal in the time domain into the phase noise compensation circuit 185. Processing other than this is similar to FIG. 4.

According to the wireless station apparatus 70 configured as described above, the phase rotation amount is canceled by using an approximate value of the distance between the two wireless station apparatuses 70 obtained by using some approach (for example, it may be measured directly by using a laser pointer type distance measurement apparatus, or calculated based on the information of the installation location). In this way, the time lag of the replica of the phase noise can be significantly modified.

As a result, a decrease in throughput can be suppressed.

Second Embodiment

In the first embodiment, a description has been given of a case that phase noise compensation is performed for a circuit configuration in which an FFT circuit is implemented for each antenna element. However, in the background art, there is a signal processing technique that aggregates signals of antennas of a plurality of elements for each signal sequence to be transmitted, and limits the signal processing of FFT or IFFT to the number of signal sequences to be spatially multiplexed. Thus, in the second embodiment, an embodiment in a case that the present invention is applied to the technique described in NPL 1 will be described.

Circuit Configuration According to Second Embodiment

In the second embodiment of the present invention, the configuration of the wireless station apparatus 70 takes an equivalent configuration as the wireless station apparatus 70 illustrated in FIG. 1. The difference from FIG. 1 is only that the transmitter 71 is replaced with a transmitter 72a, the receiver 75 is replaced with a receiver 76a, and the communication control circuit 51 is replaced with a communication control circuit 52, so that the overall functions and features are in accordance with FIG. 1, and the details of the drawings and descriptions are omitted herein.

Figure 6:
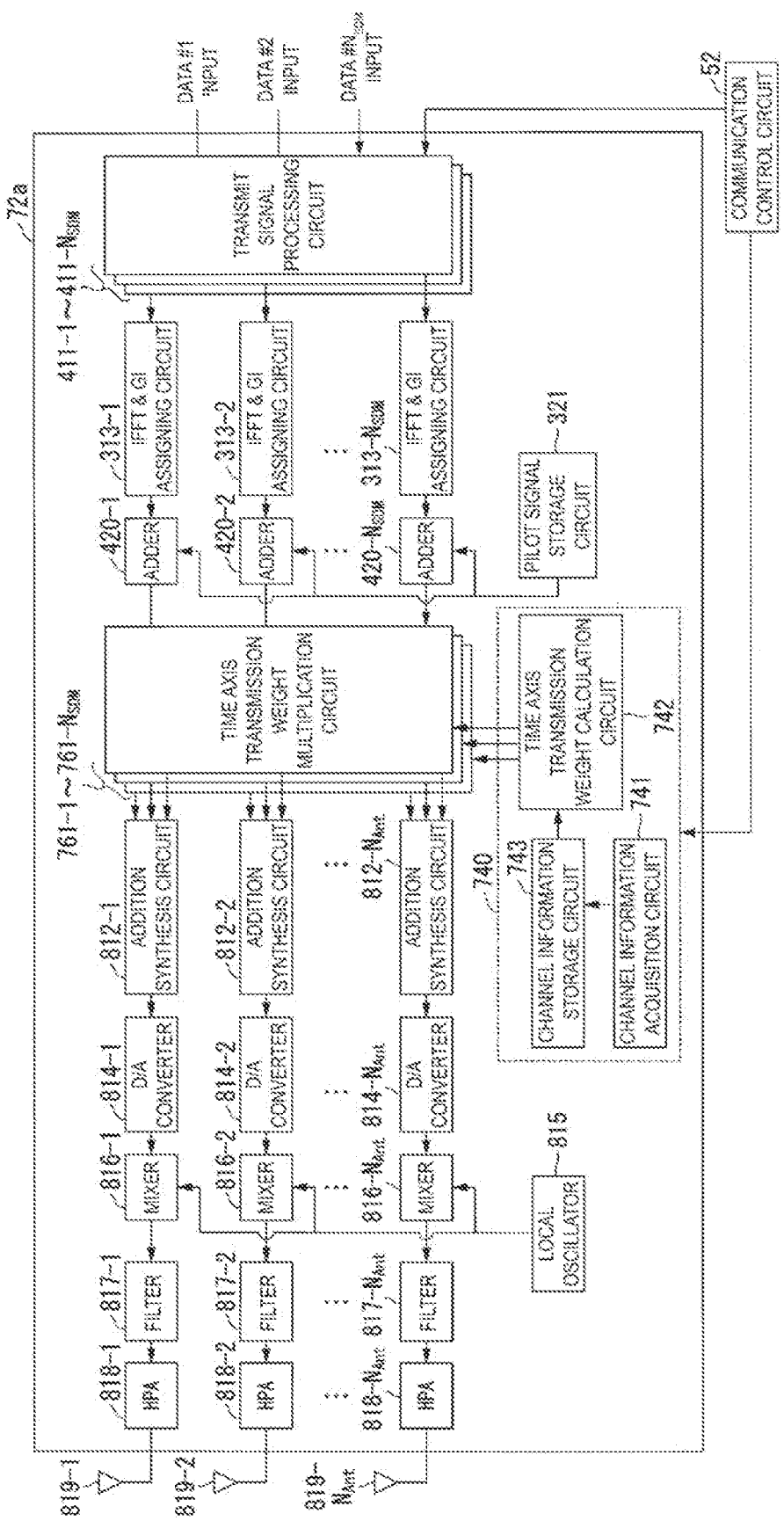
FIG. 6 is a schematic block diagram illustrating an example of a configuration of a transmitter of a wireless station apparatus according to a second embodiment.

FIG. 6 is a schematic block diagram illustrating an example of a configuration of the transmitter 72a of the wireless station apparatus 70 according to the second embodiment. As illustrated in FIG. 6, the transmitter 72a includes: transmit signal processing circuits 411-1 to 411-$N_{SDM}$; addition synthesis circuits 812-1 to 812-$N_{Ant}$; IFFT & GI assigning circuits 313-1 to 313-$N_{SDM}$; D/A converters 814-1 to 814-$N_{Ant}$; a local oscillator 815; mixers 816-1 to 816-$N_{Ant}$; filters 817-1 to 817-$N_{Ant}$; high power amplifiers 818-1 to 818-$N_{Ant}$; antenna elements 819-1 to 819-$N_{Ant}$; a transmission weight processing unit 740; and time axis transmission weight multiplication circuits 761-1 to 761-$N_{SDM}$; adders 420-1 to 420-$N_{SDM}$; and a pilot signal storage circuit 321. The transmit signal processing circuits 411-1 to 411-$N_{SDM}$ and the transmission weight processing unit 740 are connected to the communication control circuit 52. The transmission weight processing unit 740 includes a channel information acquisition circuit 741, a channel information storage circuit 742, and a time axis transmission weight calculation circuit 743.

The difference between the configurations of the transmitters described in FIG. 6 and NPL 1 is that the adders 420-1 to 420-$N_{SDM}$ are disposed between the IFFT & GI assigning circuits 313-1 to 313-$N_{SDM}$ and the time axis transmission weight multiplication circuits 761-1 to 761-$N_{SDM}$, the pilot signal storage circuit 321 is further added, and the transmit signal processing circuits 711-1 to 711-$N_{SDM}$ are changed to the transmit signal processing circuits 411-1 to 411-$N_{SDM}$.

This is similar to the first embodiment in that the difference between the configuration of related art and FIG. 2 is that the adders 320-1 to 320-$N_{Ant}$ are added between the IFFT & GI assigning circuits 813-1 to 813-$N_{Ant}$ and the D/A converters 814-1 to 814-$N_{Ant}$, the pilot signal storage circuit 321 is further added, and the transmit signal processing circuits 811-1 to 811-$N_{SDM}$ are changed to the transmit signal processing circuits 311-1 to 311-$N_{SDM}$.

Figure 26:
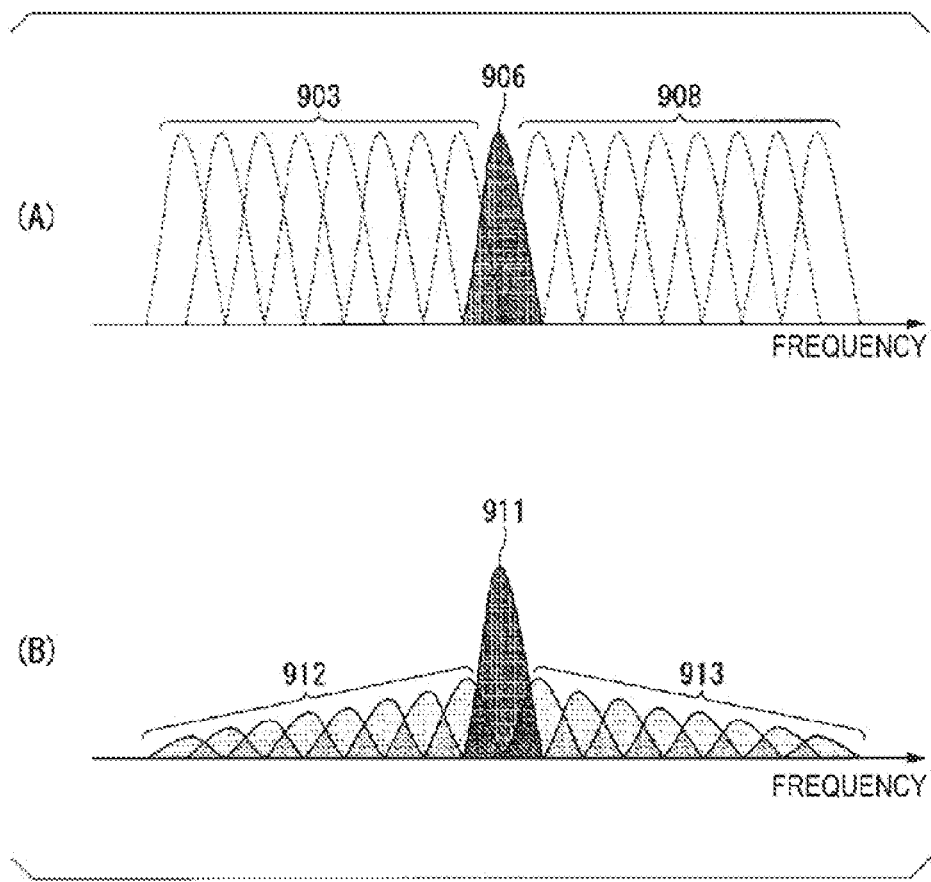
FIG. 26 is a diagram illustrating a relationship between a transmission training signal and a reception waveform thereof according to related art.
Figure 27:
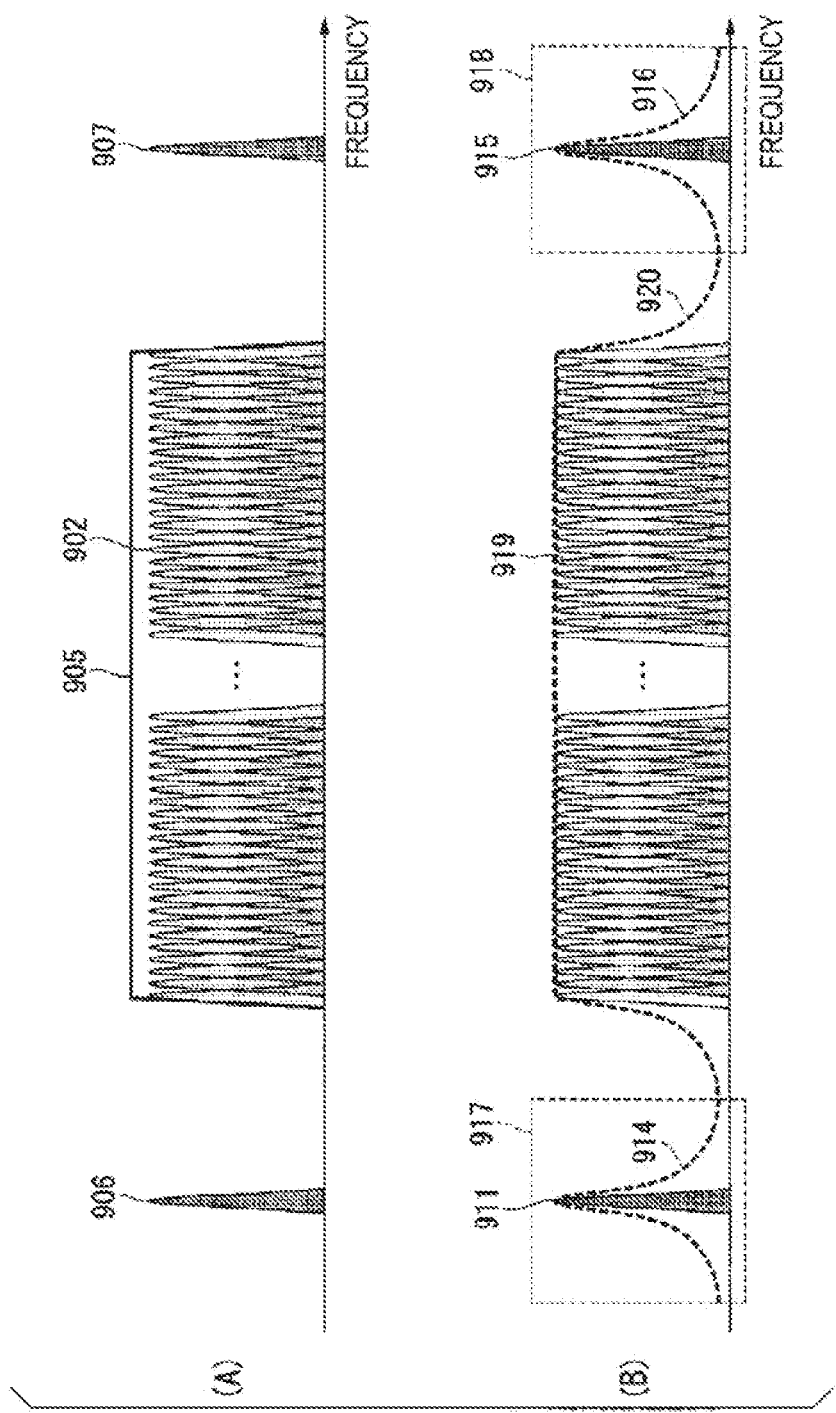
FIG. 27 is a diagram illustrating a relationship between waveforms of a transmit signal and a receive signal according to related art.

In other words, while performing the equivalent operation as the transmitter according to NPL 1, the transmitter 72a of FIG. 6 changes the processing for assigning the pilot signal at both ends of the effective bandwidth W to the transmit signal to the processing for assigning the pilot signal for each signal sequence to be spatially multiplexed, instead of performing for each antenna system. Furthermore, the difference corresponds to the change that, in the transmit signal processing circuit according to NPL 2, a signal allocated with the user data is generated within the effective bandwidth W illustrated in FIG. 25, whereas in FIG. 26, a signal allocated with the user data is generated within the reduced effective bandwidth W" illustrated in FIG. 25. However, while the multiplication processing of the transmission weight is performed in the transmit signal processing circuits 311-1 to 311-$N_{SDM}$ in FIG. 2, the multiplication processing of the transmission weight is not performed in the transmit signal processing circuits 411-1 to 411-$N_{SDM}$ in FIG. 6. The processing corresponding to the multiplication processing of the transmission weight is performed by the time axis transmission weight multiplication circuits 761-1 to 761-$N_{SDM}$ as a feature of the technique according to NPL 1.

In the above description, the assignment of the pilot signal at both ends of the effective bandwidth is performed at the adders 420-1 to 420-$N_{SDM}$ between the IFFT & GI assigning circuits 313-1 to 313-$N_{SDM}$ and the time axis transmission weight multiplication circuits 761-1 to 761-$N_{SDM}$. In contrast, in the same manner as in the first embodiment, a configuration may be adopted in which a signal allocated a pilot signal to the subcarriers on both ends of the effective bandwidth is generated in the transmit signal processing circuits 411-1 to 411-$N_{SDM}$. In this case, the adders 420-1 to 420-$N_{SDM}$ and the pilot signal storage circuit 321 are unnecessary, and equivalent processing is performed in the transmit signal processing circuits 411-1 to 411-$N_{SDM}$.

Note that, in the second embodiment, a configuration is taken in which the signals of the $N_{SDM}$ systems output from the time axis transmission weight multiplication circuits 761-1 to 761-$N_{SDM}$ are synthesized in the addition synthesis circuits 812-1 to 812-$N_{Ant}$, and the following D/A converters 814-1 to 814-$N_{Ant}$ to the antenna elements 819-1 to 819-$N_{Ant}$ are used together. In contrast, the signals may be implemented individually from the following D/A converters 814-1 to 814-$N_{Ant}$ to the antenna elements 819-1 to 819-$N_{Ant}$ without being synthesized at the addition synthesis circuits 812-1 to 812-$N_{Ant}$, and a subarray may be configured by the antenna elements 819-1 to 819-$N_{Ant}$ in each of the antennas.

Figure 7:
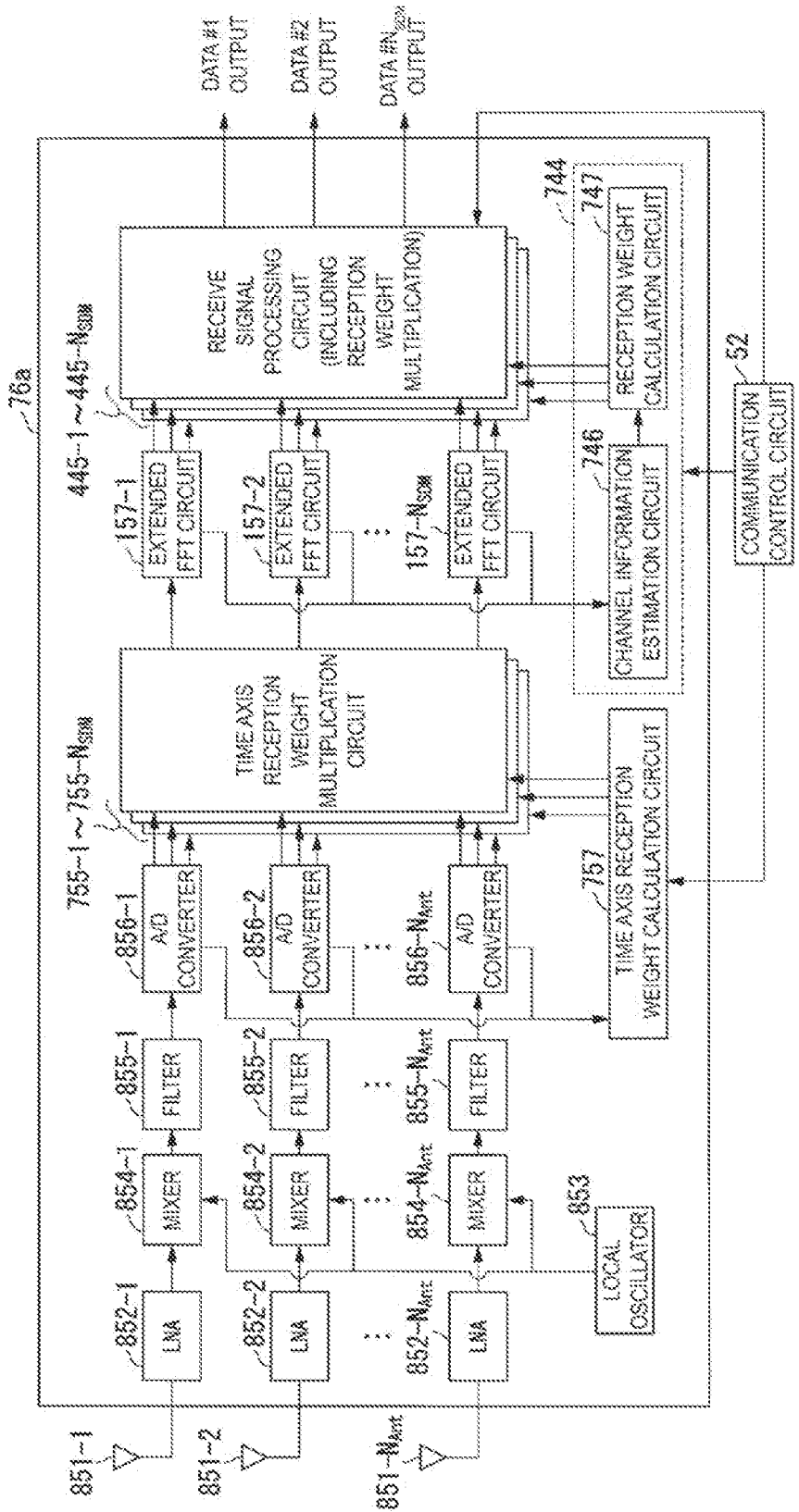
FIG. 7 is a schematic block diagram illustrating an example of a configuration of a receiver of the wireless station apparatus according to the second embodiment.

FIG. 7 is a schematic block diagram illustrating an example of a configuration of the receiver 76a of the wireless station apparatus 70 according to the second embodiment. As illustrated in FIG. 7, the receiver 76a includes: antenna elements 851-1 to 851-$N_{Ant}$; low noise amplifiers 852-1 to 852-$N_{Ant}$; a local oscillator 853; mixers 854-1 to 854-$N_{Ant}$; filters 855-1 to 855-$N_{Ant}$; A/D converters 856-1 to 856-$N_{Ant}$; extended FFT circuits 157-1 to 157-$N_{SDM}$; receive signal processing circuits 445-1 to 445-$N_{SDM}$; a reception weight processing unit 744; time axis reception weight multiplication circuits 755-1 to 755-$N_{SDM}$; and a time axis reception weight calculation circuit 757. The receive signal processing circuits 445-1 to 445-$N_{SDM}$, the reception weight processing unit 744, and the reception weight calculation circuit 747 are connected to the communication control circuit 52. The reception weight processing unit 744 includes a channel information estimation circuit 746 and a reception weight calculation circuit 747.

The difference between the configurations of the receivers described in FIG. 7 and NPL 1 is that the FFT circuits 257-1 to 257-$N_{SDM}$ are changed to the extended FFT circuits 157-1 to 157-$N_{SDM}$, and that the receive signal processing circuits 745-1 to 745-$N_{SDM}$ are changed to the receive signal processing circuits 445-1 to 445-$N_{SDM}$.

This is similar to the first embodiment in that the FFT circuits 257-1 to 257-$N_{SDM}$ are changed to the extended FFT circuits 157-1 to 157-$N_{SDM}$, and the receive signal processing circuits 845-1 to 845-$N_{SDM}$ are further changed to the receive signal processing circuits 345-1 to 345-$N_{SDM}$.

Figure 21:
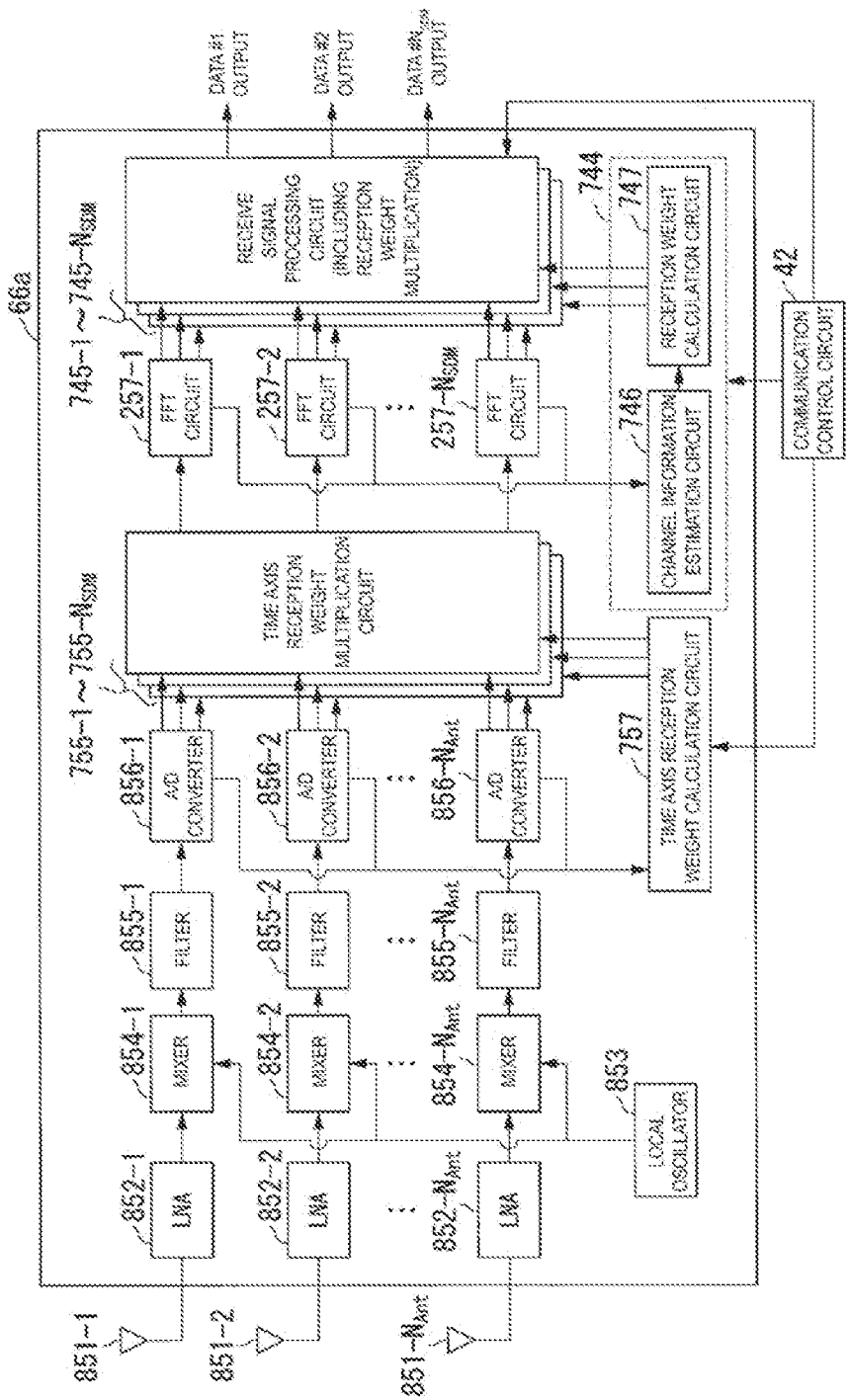
FIG. 21 is a schematic block diagram illustrating an example of a configuration of a receiver of a wireless station apparatus according to NPL 1.

In other words, the difference corresponds to the change that the receiver 76a in FIG. 7 adds a function of performing phase noise compensation by using the pilot signal at both ends of the effective bandwidth W on the transmit signal to the FFT circuits 257-1 to 257-$N_{SDM}$ (corresponding to the extended FFT circuits 157-1 to 157-$N_{SDM}$) while performing the equivalent operation as the receiver 66a in FIG. 21, and in the receive signal processing circuits 745-1 to 745-$N_{SDM}$ of FIG. 21, the receive signal processing is performed on the signal allocated with the user data within the effective bandwidth W illustrated in FIG. 23, whereas in FIG. 7, the receive signal processing is performed on the signal allocated with the user data within the reduced effective bandwidth W" illustrated in FIG. 25. Furthermore, other features are the same as those described with respect to the receiver 66a according to NPL 1 illustrated in FIG. 21.

According to the wireless station apparatus 70 according to the second embodiment configured as described above, the same effects as those of the first embodiment can be obtained in other configurations.

Third Embodiment

In the background art described in NPL 1, the time axis transmission weight multiplication circuits 761-1 to 761-$N_{SDM}$ digitally multiply the time axis transmission weight, and the time axis reception weight multiplication circuits 755-1 to 755-$N_{SDM}$ digitally multiply the time axis reception weight. However, the multiplication of the transmission and/or reception weight in the time domain corresponds to multiplying the entire frequency band by a common coefficient, and is equivalent to the process of rotating the phase by using a phase shifter directly to analog transmit signals or analog receive signals. Using this feature, in NPL 2, a method is adopted in which the calculation of the transmission and/or reception weight to be digitally multiplied is performed by the approach described in NPL 1, while processing corresponding to the multiplication of the actual time axis transmission and/or reception weight is performed in a phase shifter. In the following description, first, a description will be given of another circuit configuration in a case that the technique described in NPL 2 is applied as a background art of the present invention, and then the third embodiment will be described as a difference with it.

An embodiment in a case that the present invention is applied to the technique described in NPL 2 will be described below.

Circuit Configuration According to Third Embodiment

In the third embodiment of the present invention, the configuration of the wireless station apparatus takes an equivalent configuration as the wireless station apparatus 70 illustrated in FIG. 1. The difference from FIG. 1 is only that the transmitter 71 is replaced with a transmitter 72b, the receiver 75 is replaced with a receiver 76b, and the communication control circuit 51 is replaced with a communication control circuit 53, so that the overall functions and features are in accordance with FIG. 1, and the details of the drawings and descriptions are omitted herein.

Figure 8:
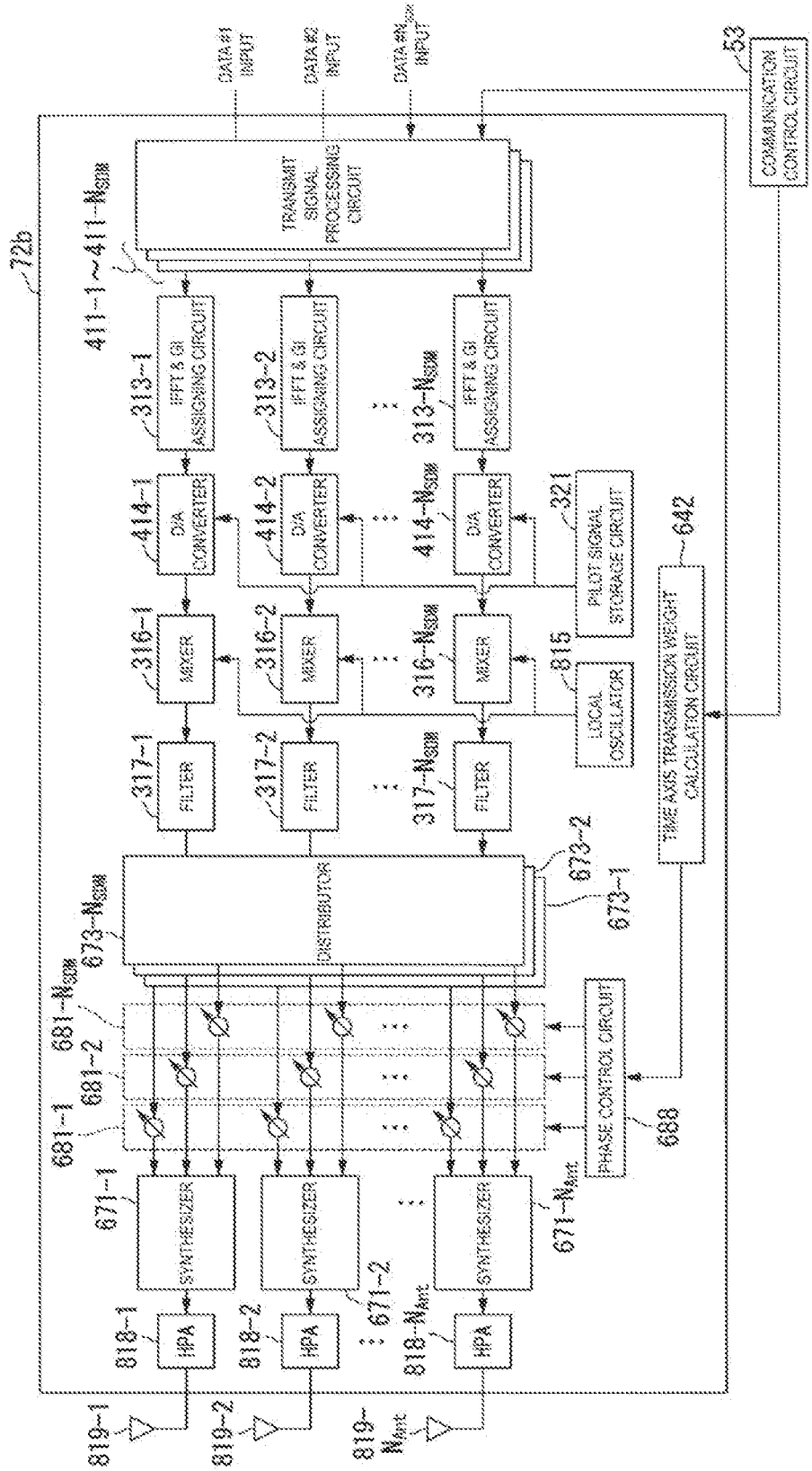
FIG. 8 is a diagram illustrating a schematic block diagram illustrating an example of a configuration of a transmitter of a wireless station apparatus according to the third embodiment.

FIG. 8 is a diagram illustrating a schematic block diagram illustrating an example of a configuration of the transmitter 72b of the wireless station apparatus 70 according to the third embodiment. As illustrated in FIG. 8, the transmitter 72b includes: transmit signal processing circuits 411-1 to 411-$N_{SDM}$; IFFT & GI assigning circuits 313-1 to 313-$N_{SDM}$; D/A converters 414-1 to 414-$N_{SDM}$; a local oscillator 815; mixers 316-1 to 316-$N_{SDM}$; filters 317-1 to 317-$N_{SDM}$; high power amplifiers 818-1 to 818-$N_{Ant}$; antenna elements 819-1 to 819-$N_{Ant}$; synthesizers 671-1 to 671-$N_{Ant}$; phase shifter groups 681-1 to 681-$N_{SDM}$; distributors 673-1 to 673-$N_{SDM}$; a phase control circuit 688; a time axis transmission weight calculation circuit 642; and a pilot signal storage circuit 321. The transmit signal processing circuits 411-1 to 411-$N_{SDM}$ and the time axis transmission weight calculation circuit 642 are connected to the communication control circuit 53.

Figure 22:
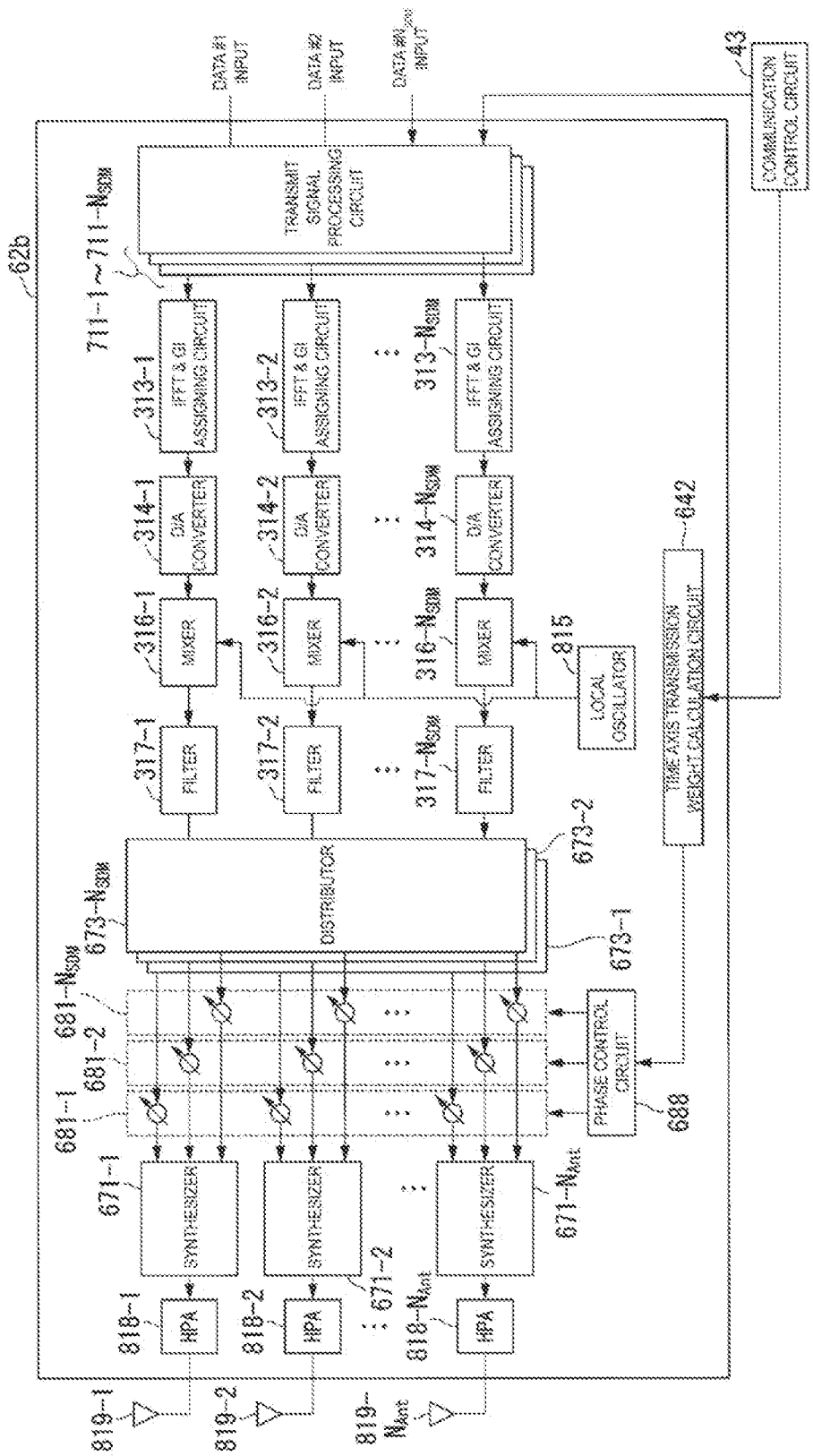
FIG. 22 is a schematic block diagram illustrating an example of a configuration of a transmitter of a wireless station apparatus according to NPL 2.

The difference from FIG. 22 is that the D/A converters 314-1 to 314-$N_{SDM}$ are changed to the D/A converters 414-1 to 414-$N_{SDM}$, the pilot signal storage circuit 321 is further added, and that the transmit signal processing circuits 711-1 to 711-$N_{SDM}$ are changed to the transmit signal processing circuits 411-1 to 411-$N_{SDM}$. The D/A converters 414-1 to 414-$N_{SDM}$ have functions to add a signal in the time domain from the IFFT & GI assigning circuits 313-1 to 313-$N_{SDM}$ and a signal in the time domain from the pilot signal storage circuit 321 for each sampling data, and performs D/A conversion on the added value. This is equivalent to a configuration in which the adders 420-1 to 420-$N_{SDM}$ are disposed after the IFFT & GI assigning circuits 313-1 to 313-$N_{SDM}$ (and prior to the D/A converters 314-1 to 314-$N_{SDM}$) similar to FIG. 8, and here the signal in the time domain from the pilot signal storage circuit 321 is added for each sampling data.

Figure 18:
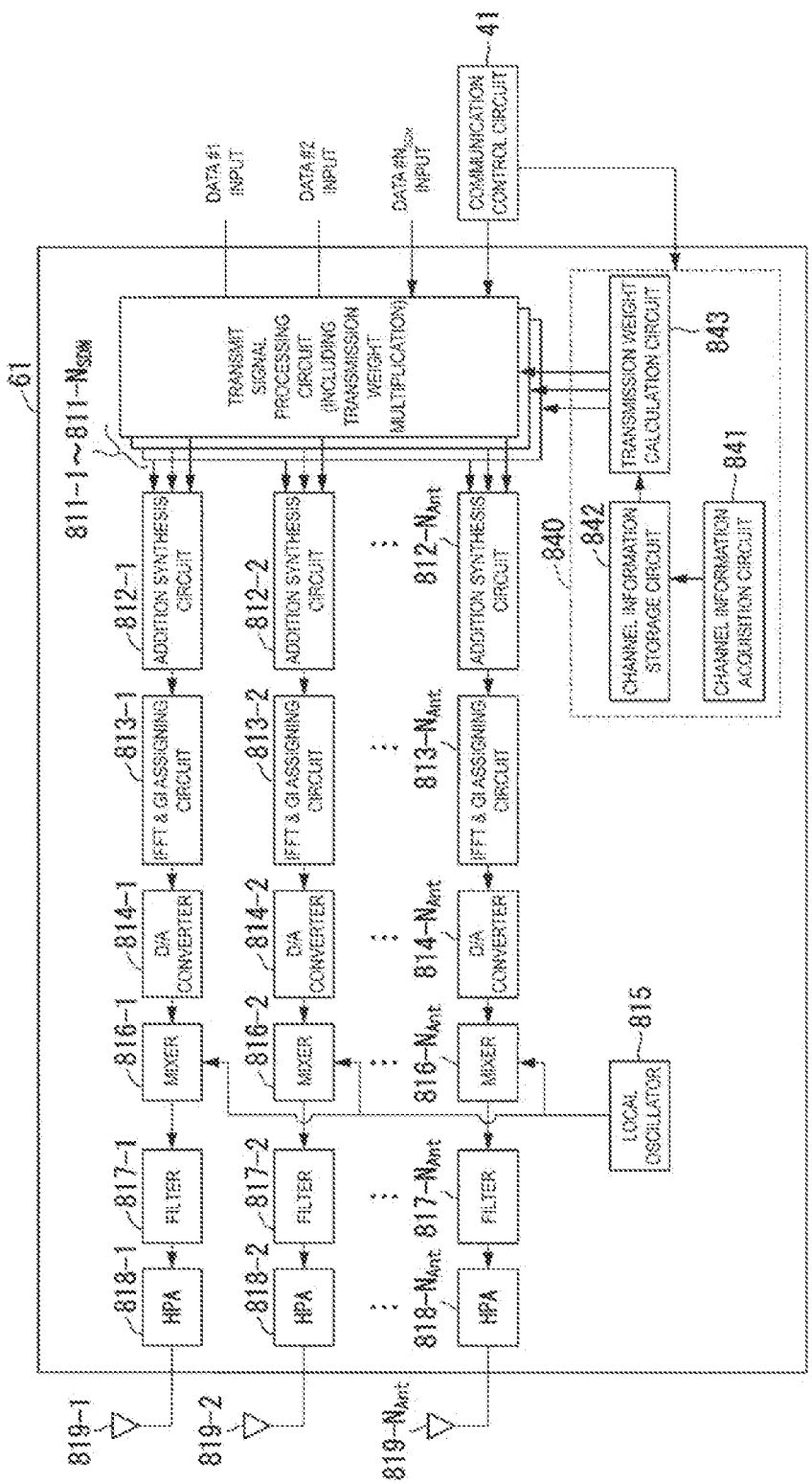
FIG. 18 is a schematic block diagram illustrating an example of a configuration of a transmitter in the wireless station apparatus.
Figure 19:
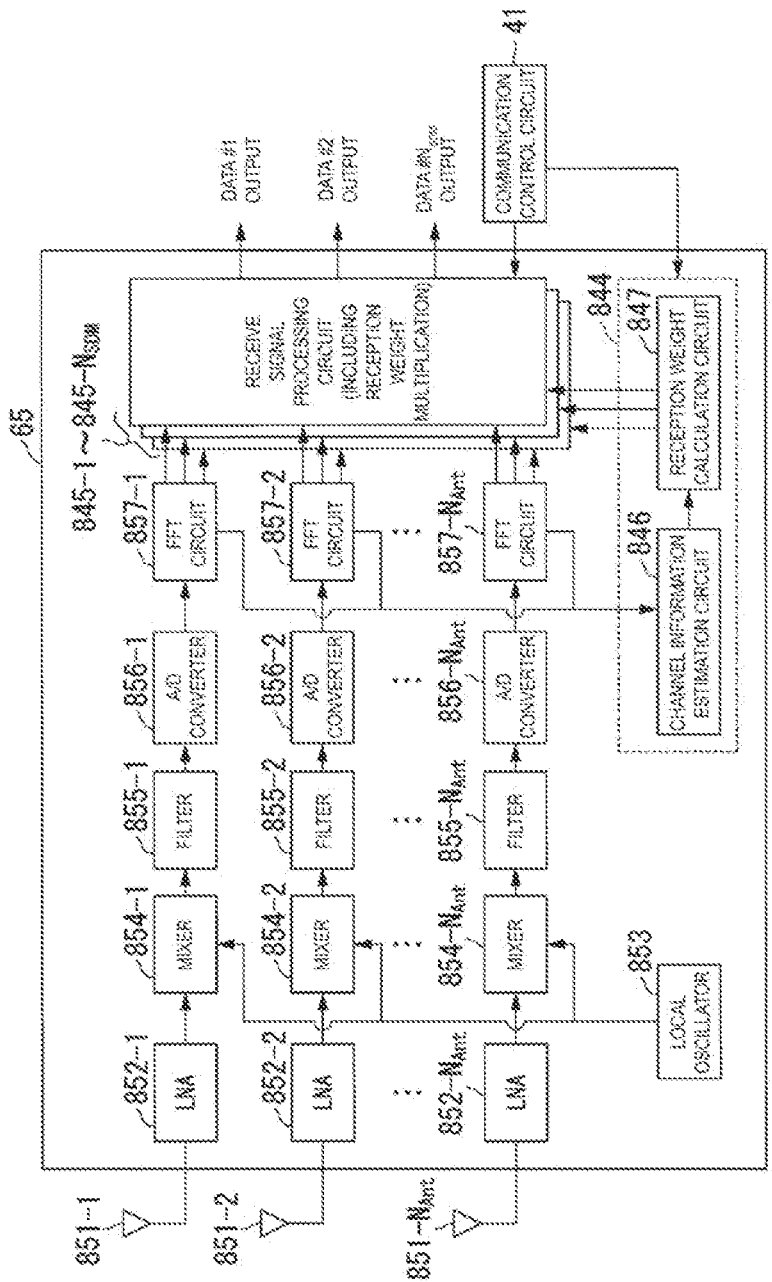
FIG. 19 is a schematic block diagram illustrating an example of a configuration of a receiver in the wireless station apparatus.
Figure 20:
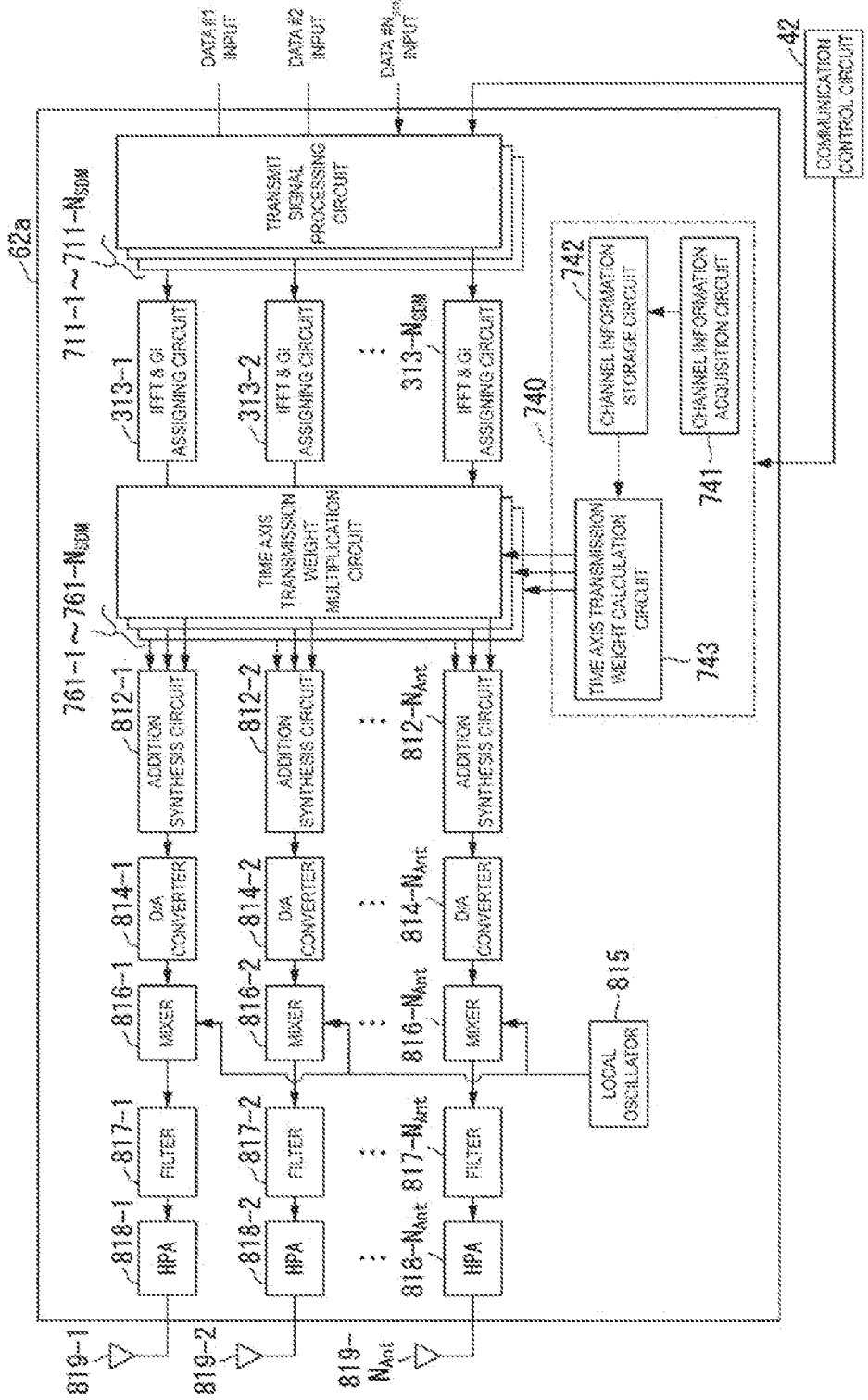
FIG. 20 is a schematic block diagram illustrating an example of a configuration of a transmitter of a wireless station apparatus according to NPL 1.

This is similar to the first embodiment in that the difference between FIG. 18 and FIG. 2 is that the adders 320-1 to 320-$N_{Ant}$ are added between the IFFT & GI assigning circuits 813-1 to 813-$N_{Ant}$ and the D/A converters 814-1 to 814-$N_{Ant}$, the pilot signal storage circuit 321 is further added, and the transmit signal processing circuits 811-1 to 811-$N_{SDM}$ are changed to the transmit signal processing circuits 311-1 to 311-$N_{SDM}$.

In other words, while performing the equivalent operation as the transmitter 62b in FIG. 22, the transmitter 72b of FIG. 8 changes the processing for assigning the pilot signal at both ends of the effective bandwidth W to the transmit signal to the processing for assigning the pilot signal for each signal sequence to be spatially multiplexed, instead of performing for each antenna system. Furthermore, the difference corresponds to the change that, in the transmit signal processing circuits 711-1 to 711-$N_{SDM}$ of FIG. 22, a signal allocated with the user data is generated within the effective bandwidth W illustrated in FIG. 23, whereas in FIG. 8, a signal allocated with the user data is generated within the reduced effective bandwidth W" illustrated in FIG. 25.

In the above description, the assignment of the pilot signal at both ends of the effective bandwidth is performed at the D/A converters 414-1 to 414-$N_{SDM}$. In contrast, in the same manner as the supplemental description of the second embodiment, a configuration may be adopted in which a signal allocated a pilot signal to the subcarriers on both ends of the effective bandwidth is generated in the transmit signal processing circuits 411-1 to 411-$N_{SDM}$. In this case, while the pilot signal storage circuit 321 is omitted, the D/A converters 414-1 to 414-$N_{SDM}$ are replaced with the D/A converters 314-1 to 314-$N_{SDM}$ that do not have an addition function with the pilot signal, and equivalent processing is performed in the transmit signal processing circuits 411-1 to 411-$N_{SDM}$.

Note that, in the third embodiment, in the same manner as the background art illustrated in FIG. 22, a configuration is taken in which $N_{SDM}$ systems from the distributors 673-1 to 673-$N_{SDM}$ to the phase shifter groups 681-1 to 681-$N_{SDM}$ are synthesized by the synthesizers 671-1 to 671-$N_{Ant}$, and the high power amplifiers 818-1 to 818-$N_{Ant}$ to the antenna elements 819-1 to 819-$N_{Ant}$ are used together for each signal sequence. In contrast, the signals may be implemented individually from the following high power amplifiers 818-1 to 818-$N_{Ant}$ to the antenna elements 819-1 to 819-$N_{Ant}$ without being synthesized by the synthesizers 671-1 to 671-$N_{Ant}$, and a subarray may be configured by the antenna elements 819-1 to 819-$N_{Ant}$ in each of the antennas. Furthermore, other features are the same as those described with respect to the transmitter 62b of the background art illustrated in FIG. 22.

Figure 9:
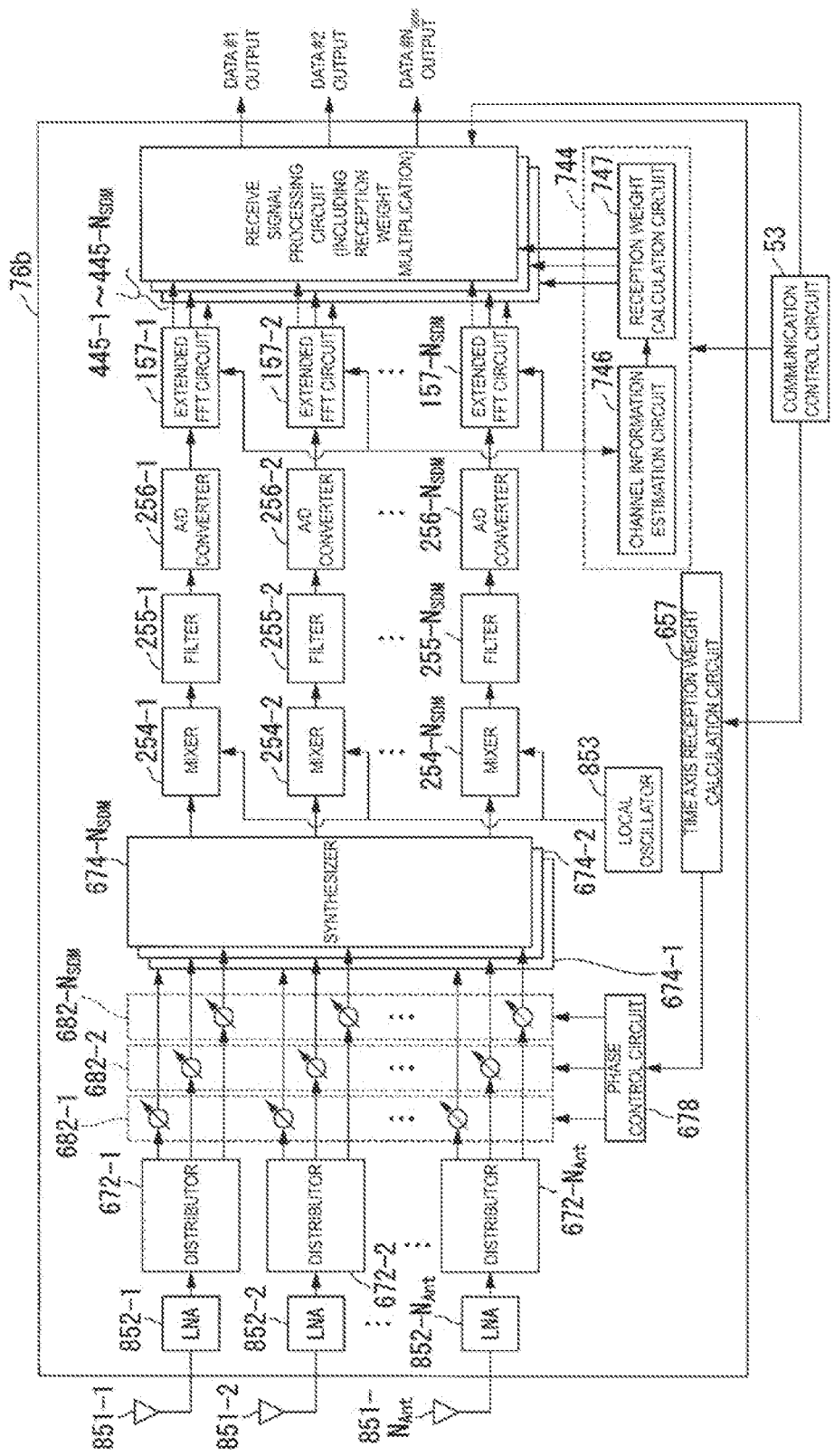
FIG. 9 is a diagram illustrating a schematic block diagram illustrating an example of a configuration of a receiver of the wireless station apparatus according to a third embodiment.

FIG. 9 is a diagram illustrating a schematic block diagram illustrating an example of a configuration of the receiver 76b of the wireless station apparatus 70 according to the third embodiment. As illustrated in FIG. 9, the receiver 76b includes: antenna elements 851-1 to 851-$N_{Ant}$; low noise amplifiers 852-1 to 852-$N_{Ant}$; a local oscillator 853; mixers 254-1 to 254-$N_{SDM}$; filters 255-1 to 255-$N_{SDM}$; A/D converters 256-1 to 256-$N_{SDM}$; extended FFT circuits 157-1 to 157-$N_{SDM}$; receive signal processing circuits 445-1 to 445-$N_{SDM}$; a reception weight processing unit 744; distributors 672-1 to 672-$N_{Ant}$; phase shifter groups 682-1 to 682-$N_{SDM}$; synthesizers 674-1 to 674-$N_{SDM}$; a time axis reception weight calculation circuit 657; and a phase control circuit 678. The receive signal processing circuits 445-1 to 445-$N_{SDM}$, the reception weight processing unit 744, and the time axis reception weight calculation circuit 657 are connected to the communication control circuit 53. The reception weight processing unit 744 includes a channel information estimation circuit 746 and a reception weight calculation circuit 747.

Figure 24:
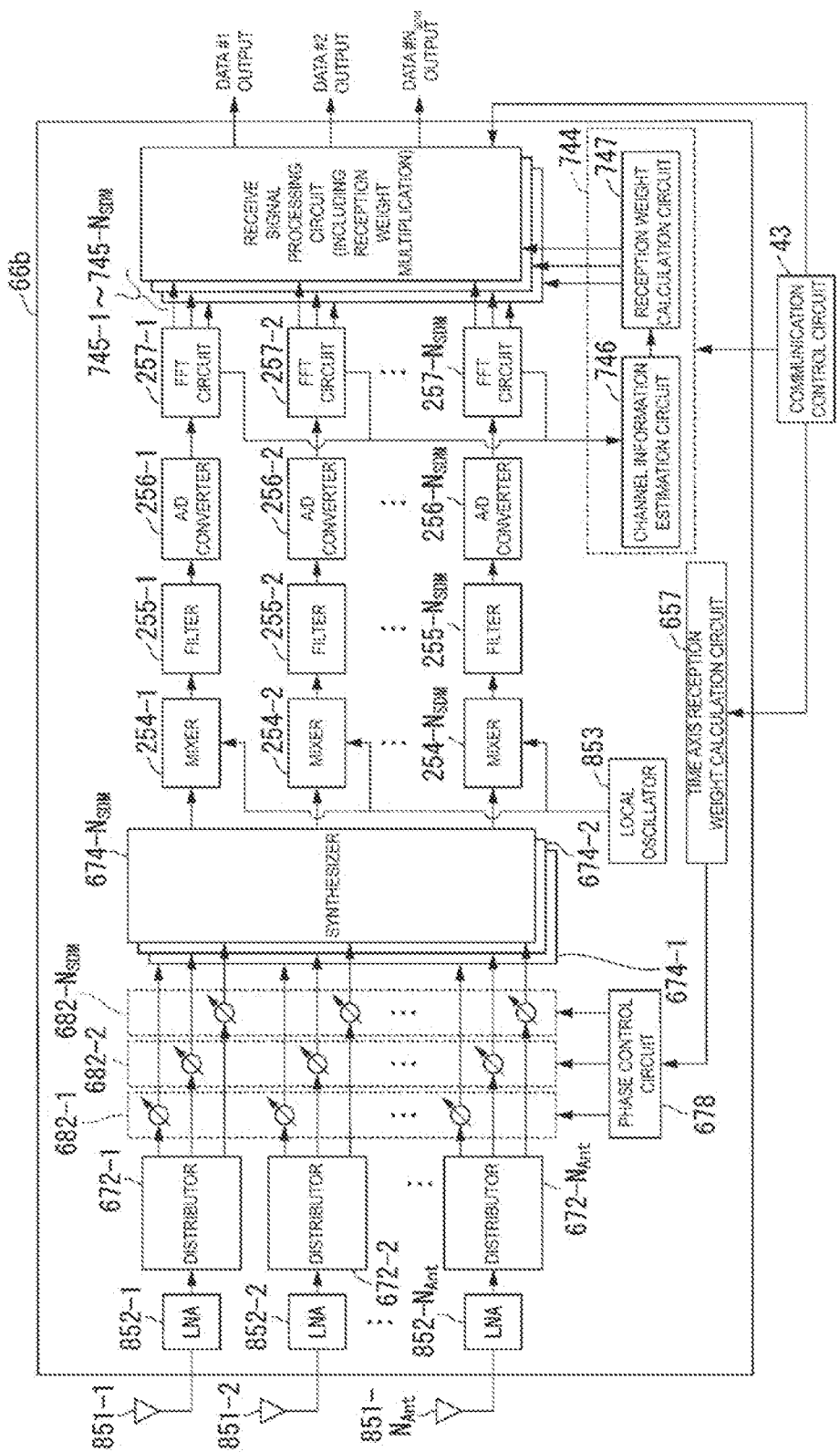
FIG. 24 is a schematic block diagram illustrating an example of a configuration of a receiver of a wireless station apparatus according to NPL 2.

The difference from FIG. 24 is that the FFT circuits 257-1 to 257-$N_{SDM}$ are changed to the extended FFT circuits 157-1 to 157-$N_{SDM}$, and that the receive signal processing circuits 745-1 to 745-$N_{SDM}$ are changed to the receive signal processing circuits 445-1 to 445-$N_{SDM}$. This is similar to the second embodiment in that the FFT circuits 257-1 to 257-$N_{SDM}$ are changed to the extended FFT circuits 157-1 to 157-$N_{SDM}$, and the receive signal processing circuits 845-1 to 845-$N_{SDM}$ are further changed to the receive signal processing circuits 445-1 to 445-$N_{SDM}$ when the receiver 66a illustrated in FIG. 21 of the background art is changed to the receiver 76a illustrated in FIG. 7 of the second embodiment.

In other words, the difference corresponds to the change that the receiver 76b in FIG. 9 adds a function of performing phase noise compensation by using the pilot signal at both ends of the effective bandwidth W on the transmit signal to the FFT circuits 257-1 to 257-$N_{SDM}$ (corresponding to the extended FFT circuits 157-1 to 157-$N_{SDM}$) while performing the equivalent operation as the receiver 66b in FIG. 24, and in the receive signal processing circuits 745-1 to 745-$N_{SDM}$ of FIG. 24, the receive signal processing is performed on the signal allocated with the user data within the effective bandwidth W illustrated in FIG. 23, whereas in FIG. 9, the receive signal processing is performed on the signal allocated with the user data within the reduced effective bandwidth W" illustrated in FIG. 25. Furthermore, other features are the same as those described with respect to the receiver 66b according to NPL 2 illustrated in FIG. 24.

According to the wireless station apparatus 70 according to the third embodiment configured as described above, the same effects as those of the first embodiment can be obtained in other configurations.

Fourth Embodiment

In the first to third embodiments of the present invention, the configurations of the extended FFT circuits 357 and 157 in the receiver uses the configuration illustrated in FIG. 4(B). Here, the input signal to the FFT circuit 857 is performed in a form that includes the pilot signal at both ends of the effective bandwidth W.

However, because the FFT circuit 857 and the receive signal processing circuits 345-1 to 345-$N_{SDM}$ or the receive signal processing circuits 445-1 to 445-$N_{SDM}$ do not require the pilot signal at both ends of the effective bandwidth W, it is possible to exclude the pilot signal on both ends of the effective bandwidth W before inputting into the FFT circuit 857. The configuration of the extended FFT circuit according to the fourth embodiment with this function is illustrated in FIG. 10.

Figure 10:
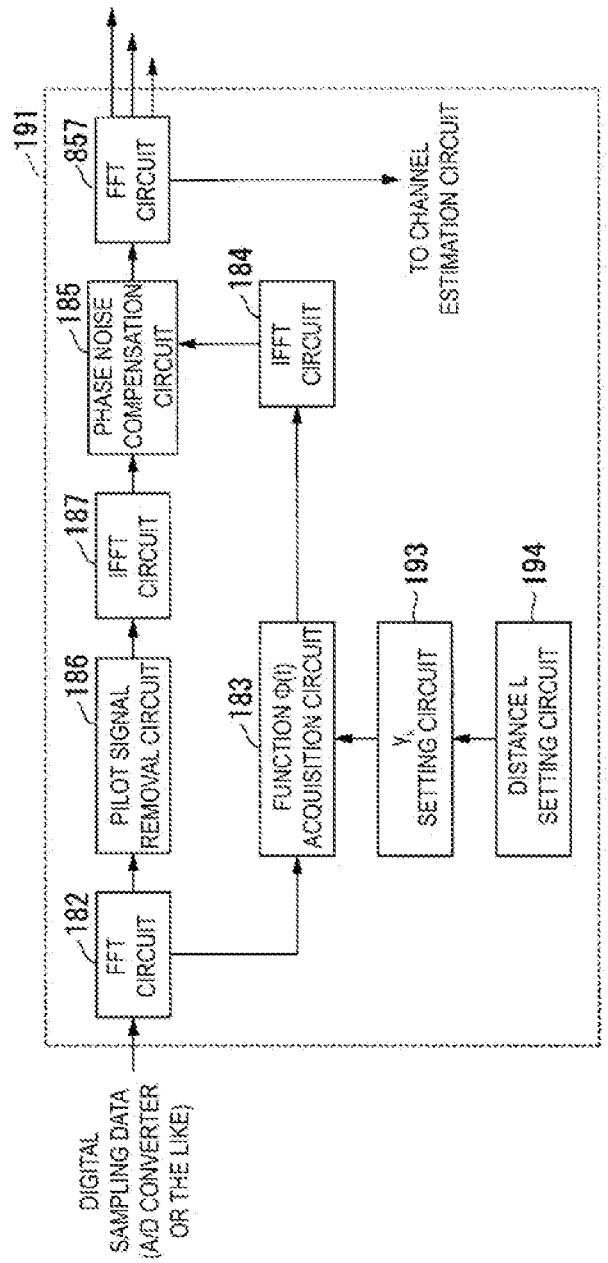
FIG. 10 is a diagram illustrating a configuration of an extended FFT circuit according to a fourth embodiment.

As illustrated in FIG. 10, the extended FFT circuit 191 includes an FFT circuit 182, a function ϕ (t) acquisition circuit 183, an IFFT circuit 184, an IFFT circuit 187, a phase noise compensation circuit 185, a $γ_k$ setting circuit 193, a distance L setting circuit 194, a pilot signal removal circuit 186, and an FFT circuit 857.

The difference from FIG. 4 is that the input to the phase noise compensation circuit 185 is a signal from which the pilot signal at both ends of the effective bandwidth W Chas been removed by the pilot signal removal circuit 186 and the IFFT circuit 187, rather than the input signal to the extended FFT circuit 190 duplicated by the replication circuit 181 itself. The operation of the pilot signal removal circuit 186 is to insert zero into the components of the subcarrier of the region 917 and the region 198 in FIG. 3 when the signal converted to the signal in the frequency domain is input by the FFT circuit 182. This signal is converted from the signal in the frequency domain to the signal in the time domain by the IFFT circuit 187. As a result, by canceling not only the pilot signal at both ends of the effective bandwidth W, but also the pilot signal including the components leaked to the neighboring subcarriers due to the influence of the phase noise, and by returning the signal in the frequency domain canceled to the signal in the time domain, it is possible to perform signal processing on data including of the effective region including the user data within the reduced effective bandwidth W" (precisely, within the band also including some subcarriers where signals have been leaked from the reduced effective bandwidth W") at the receive signal processing circuits 345-1 to 345-$N_{SDM}$ or the receive signal processing circuits 445-1 to 445-$N_{SDM}$.

Figure 11:
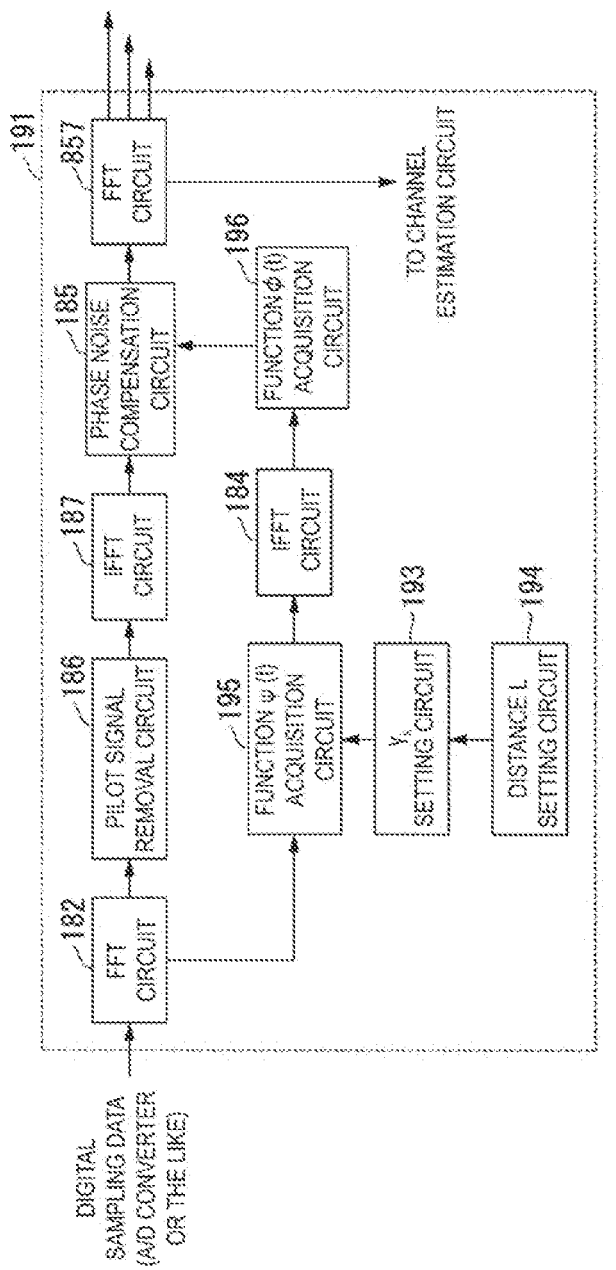
FIG. 11 is a schematic block diagram illustrating another example of a configuration of an extended FFT circuit according to the fourth embodiment.

Similarly, corresponding to FIG. 5, the configuration of FIG. 11 can be used. The difference from FIG. 5 is similar to FIG. 10 in that the input to the phase noise compensation circuit 185 is a signal from which the pilot signal at both ends of the effective bandwidth W Chas been removed by the pilot signal removal circuit 186 and the IFFT circuit 187, rather than the input signal to the extended FFT circuit 190 duplicated by the replication circuit 181 itself.

According to the wireless station apparatus 70 according to the fourth embodiment configured as described above, the same effects as those of the first embodiment can be obtained in other configurations.

Fifth Embodiment

In the description of the first to fourth embodiments, the case that the OFDM modulation scheme is applied is illustrated as a representative example, but the same process can be applied to a system of single carrier transmission. Systems of single carrier transmission include a SC-FDE scheme that performs equalization processing in the frequency domain, and the like, in addition to a common single carrier transmission. In the SC-FDE scheme among them, a common SC-FDE processing may be performed instead of signal processing of the OFDM modulation scheme in the receive signal processing circuits 345-1 to 345-$N_{SDM}$ or the receive signal processing circuits 445-1 to 445-$N_{SDM}$, for involving signal processing of the frequency domain. These are common techniques, and thus detailed description thereof is omitted. Similarly, the signal processing of the OFDM modulation scheme may be changed to a common SC-FDE processing on the transmitter side. For example, by generating a normal signal of a single carrier in the time domain in the transmit signal processing circuits 311-1 to 311-$N_{SDM}$ or the transmit signal processing circuits 411-1 to 411-$N_{SDM}$, and by implementing a circuit configured to assign GI without performing IFFT in the part of the IFFT & GI assigning circuits 313-1 to 313-$N_{SDM}$, the processing can correspond to single carrier transmission.

Figure 12:
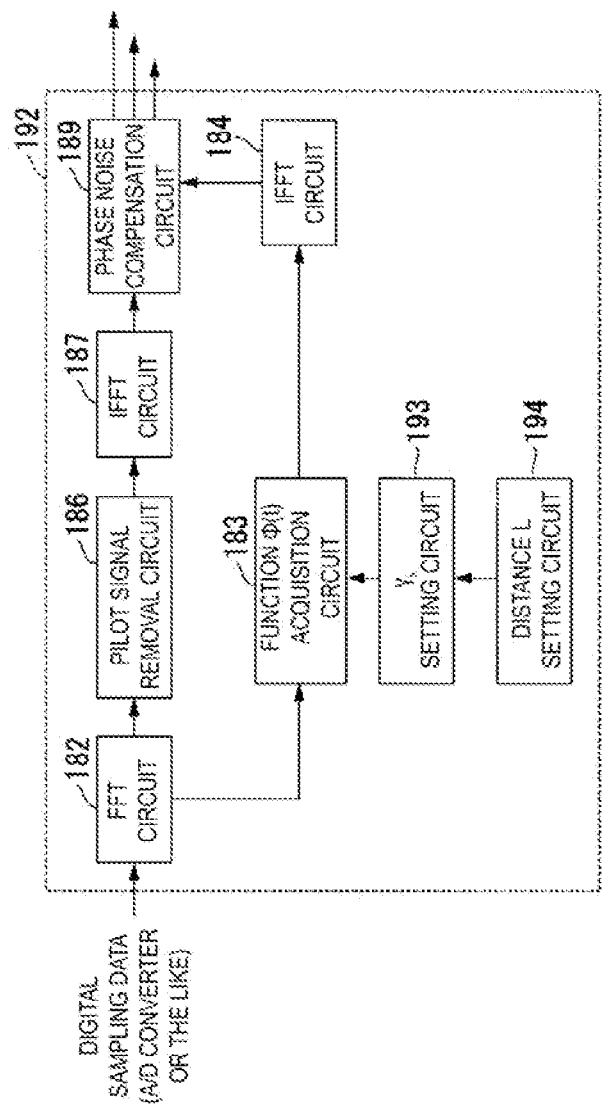
FIG. 12 is a diagram illustrating a configuration example of a single carrier compensation circuit according to a fifth embodiment.

However, in a case of a pure single carrier transmission rather than the SC-FDE scheme, it is not necessary to convert the signal in the time domain into the signal in the frequency domain by using the FFT circuit. Thus, the FFT circuit 857 implemented in the extended FFT circuit 357 is not needed, so that the extended FFT circuit will be replaced by a single carrier compensation circuit, and the assignment of GI in the part of the IFFT & GI assigning circuits 313-1 to 313-$N_{SDM}$ is also not needed. FIG. 12 is a diagram illustrating a configuration example of a single carrier compensation circuit according to the fifth embodiment.

As illustrated in FIG. 12, the single carrier compensation circuit 192 includes an FFT circuit 182, a function $\phi$ (t) acquisition circuit 183, an IFFT circuit 184, a pilot signal removal circuit 186, an IFFT circuit 187, a phase noise compensation circuit 189, a $\gamma_k$ setting circuit 193, a distance L setting circuit 194, a $\psi$ (t) acquisition circuit 195, and a function $\phi$ (t) acquisition circuit 196. The difference from FIG. 10 is that the FFT circuit 857 is omitted and the phase noise compensation circuit 185 is replaced by phase noise compensation circuit 189. The difference between the phase noise compensation circuit 185 and the phase noise compensation circuit 189 is that the output is changed from one system to $N_{SDM}$ systems of the same contents while having the same function. As illustrated in the fourth embodiment, the output signal from the phase noise compensation circuit 189 does not include the pilot signal at both ends of the effective bandwidth W, and a single carrier signal compensated for phase noise is output.

Figure 13:
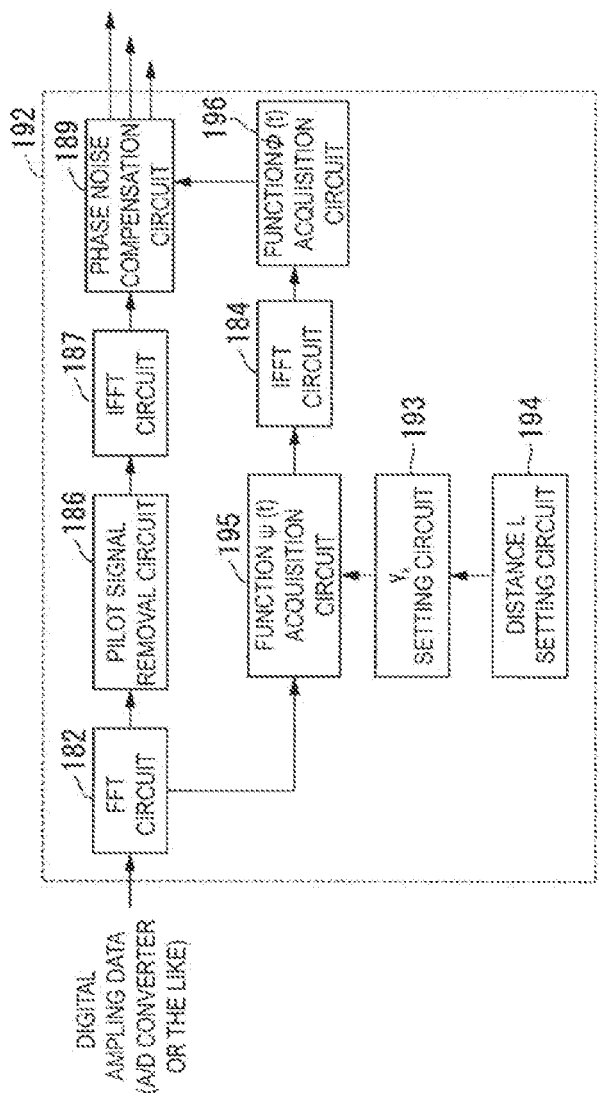
FIG. 13 is a diagram illustrating another configuration example of a single carrier compensation circuit according to the fifth embodiment.

Similarly, corresponding to FIG. 11, the configuration of FIG. 13 can be used. The difference from FIG. 11 is similar to the difference between FIG. 10 and FIG. 12 in that the FFT circuit 857 is omitted and the phase noise compensation circuit 185 is replaced by phase noise compensation circuit 189.

Figure 14:
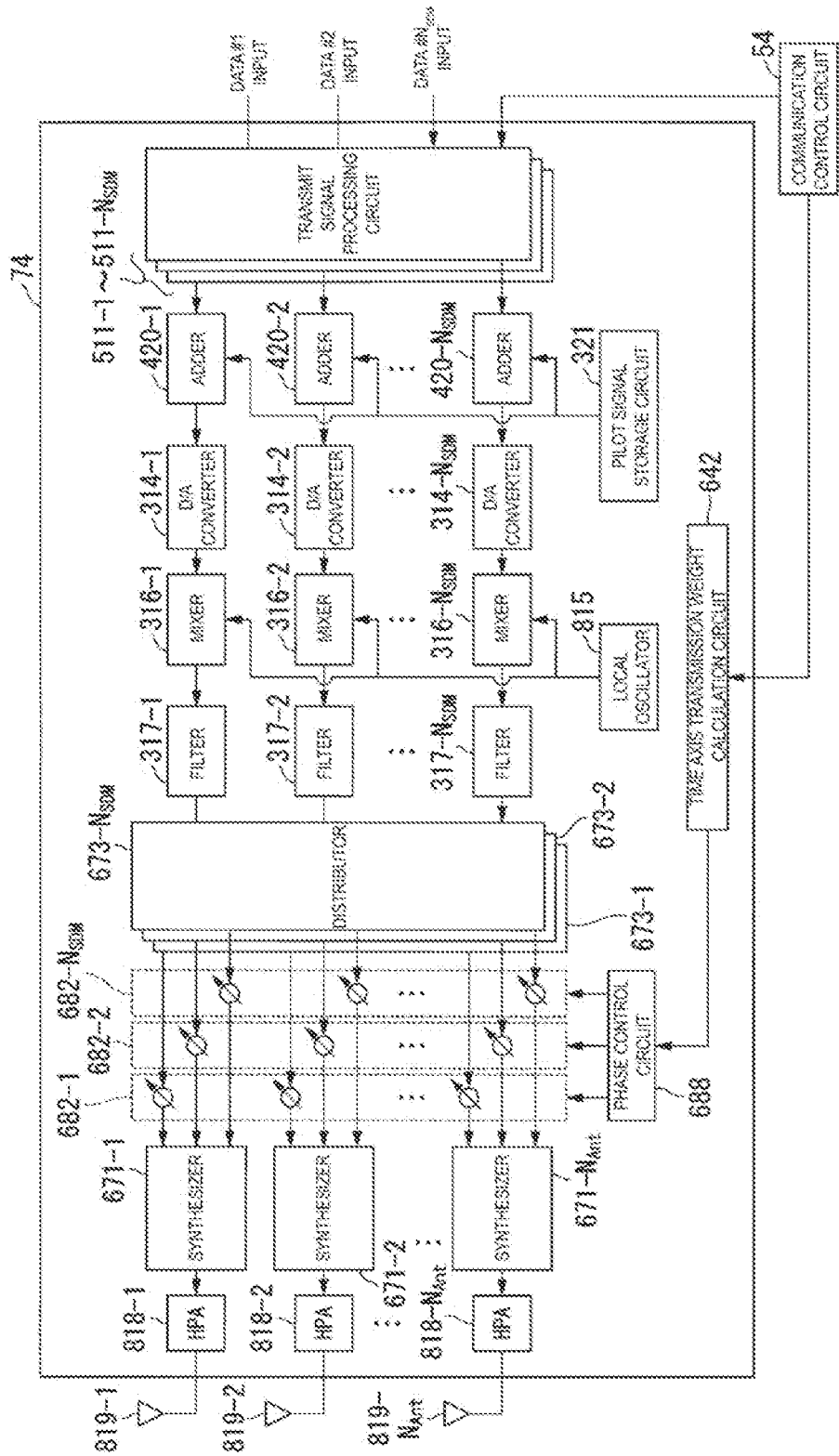
FIG. 14 is a diagram illustrating a schematic block diagram illustrating an example of a configuration of a transmitter during single carrier transmission according to the fifth embodiment.
Figure 15:
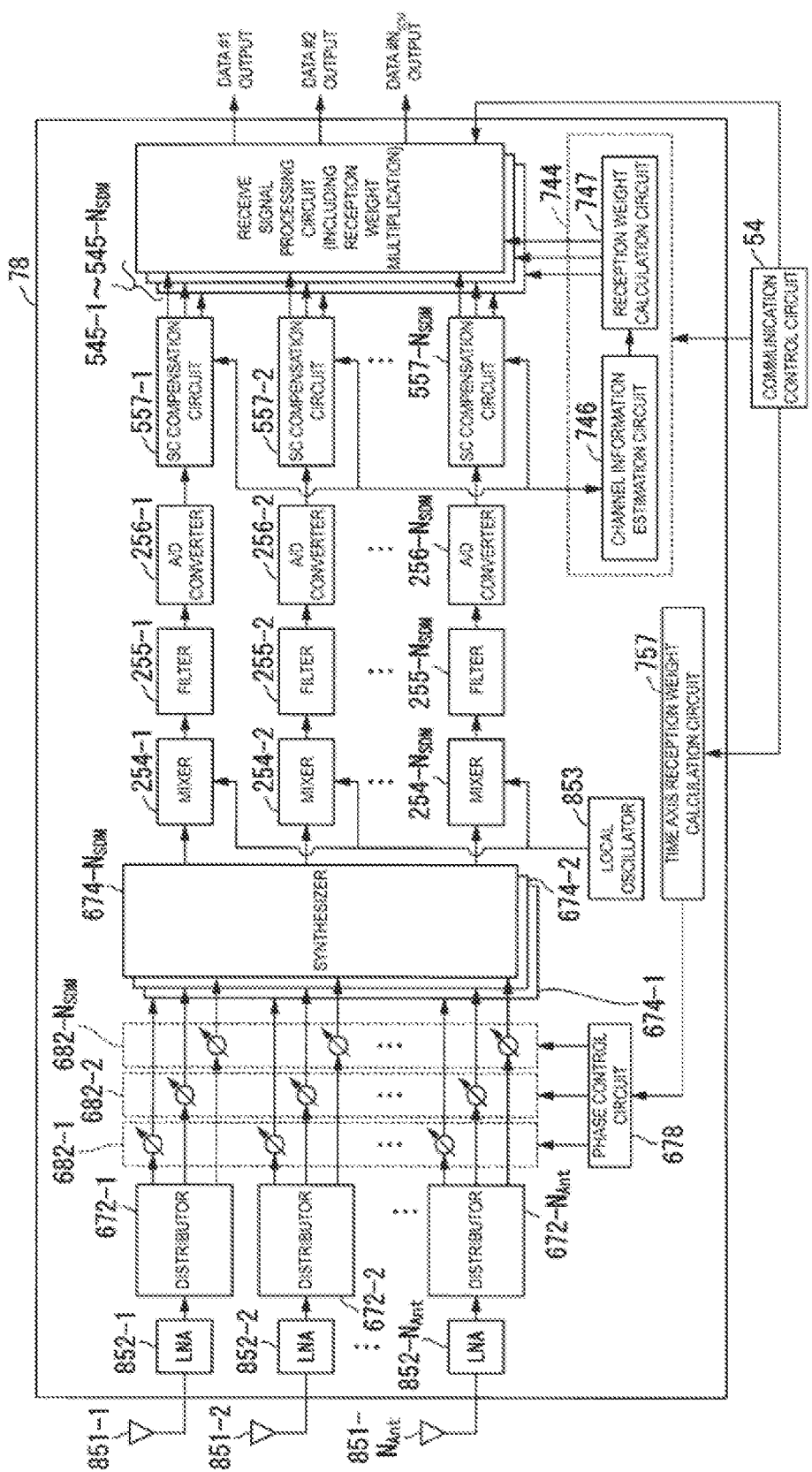
FIG. 15 is a diagram illustrating a schematic block diagram illustrating an example of a configuration of a receiver during single carrier transmission according to the fifth embodiment.

A configuration example of a transmitter and a receiver in single carrier transmission according to the fifth embodiment is illustrated in FIGS. 14 and 15 in a manner that reflects the changes described above. In the fifth embodiment of the present invention, the configuration of the wireless station apparatus takes an equivalent configuration as the wireless station apparatus 70 illustrated in FIG. 1. The difference from FIG. 1 is only that the transmitter 71 is replaced with a transmitter 74, the receiver 75 is replaced with a receiver 78, and the communication control circuit 51 is replaced with a communication control circuit 54, so that the overall functions and features are in accordance with FIG. 1, and the details of the drawings and descriptions are omitted herein. Hereinafter, a configuration example of the transmitter 74 and the receiver 78 is illustrated.

As illustrated in FIG. 14, the transmitter 74 according to the fifth embodiment include: transmit signal processing circuits 511-1 to 511-$N_{SDM}$; D/A converters 314-1 to 314-$N_{SDM}$; a local oscillator 815, mixers 316-1 to 316-$N_{SDM}$; filters 317-1 to 317-$N_{SDM}$; high power amplifiers 818-1 to 818-$N_{Ant}$; antenna elements 819-1 to 819-$N_{Ant}$; synthesizers 671-1 to 671-$N_{Ant}$; phase shifter groups 682-1 to 682-$N_{SDM}$; distributors 673-1 to 673-$N_{SDM}$; a phase control circuit 688; a time axis transmission weight calculation circuit 642; adders 420-1 to 420-$N_{SDM}$; and a pilot signal storage circuit 321. The transmit signal processing circuits 511-1 to 511-$N_{SDM}$ and the time axis transmission weight calculation circuit 642 are connected to the communication control circuit 54.

The difference from FIG. 8 is that the IFFT & GI assigning circuits 313-1 to 313-$N_{SDM}$ are omitted, and the transmit signal processing circuits 411-1 to 411-$N_{SDM}$ configured to perform processing of the frequency domain such as an OFDM modulation scheme are replaced with the transmit signal processing circuits 511-1 to 511-$N_{SDM}$ configured to perform signal processing of single carrier transmission in the time domain. Although the D/A converters 414-1 to 414-$N_{SDM}$ are described in divided portions as the D/A converters 314-1 to 314-$N_{SDM}$ and the adders 420-1 to 420-$N_{SDM}$, this is only describing a functionally equivalent circuit explicitly in divided portions, and essentially there is no difference.

Thus, it is changed from generating a transmit signal in the time domain of the digital baseband using an OFDM modulation scheme in combination of the transmit signal processing circuits 411-1 to 411-$N_{SDM}$ and IFFT & GI assigning circuits 313-1 to 313-$N_{SDM}$, to generating a transmit signal in the time domain of the digital baseband for single carrier transmission by the transmit signal processing circuits 511-1 to 511-$N_{SDM}$. Signal processing of single carrier transmission performed by the transmit signal processing circuits 511-1 to 511-$N_{SDM}$ is a common signal processing, and the signal such as a unique word is assigned as an overhead in advance of a signal that is subjected to modulation processing on the user data, although the details are omitted herein. The signal in the time domain including these will be output.

Note that, in the fifth embodiment as well, similar to the third embodiment, the high power amplifiers 818-1 to 818-$N_{Ant}$, the antenna elements 819-1 to 819-$N_{Ant}$, or the like may be implemented individually for each signal sequence spatially multiplexed, and a subarray may be configured for each of the signal sequences. Furthermore, other features are the same as those described with respect to the third embodiment.

As illustrated in FIG. 15, the receiver 78 according to the fifth embodiment includes: antenna elements 851-1 to 851-$N_{Ant}$; low noise amplifiers 852-1 to 852-$N_{Ant}$; a local oscillator 853; mixers 254-1 to 254-$N_{SDM}$; filters 255-1 to 255-$N_{SDM}$; A/D converters 256-1 to 256-$N_{SDM}$; single carrier compensation circuits 557-1 to 557-$N_{SDM}$ (the SC compensation circuit in FIG. 15); receive signal processing circuits 545-1 to 545-$N_{SDM}$; a reception weight processing unit 744; a time axis reception weight calculation circuit 757, distributors 672-1 to 672-$N_{Ant}$; phase shifter groups 682-1 to 682-$N_{SDM}$; and synthesizers 674-1 to 674-$N_{SDM}$. The receive signal processing circuits 545-1 to 545-$N_{SDM}$, the reception weight processing unit 744, and the time axis reception weight calculation circuit 757 are connected to the communication control circuit 54. The reception weight processing unit 744 includes a channel information estimation circuit 746 and a reception weight calculation circuit 747.

The difference from FIG. 9 is that the extended FFT circuits 157-1 to 157-$N_{SDM}$ are changed to the single carrier compensation circuits 557-1 to 557-$N_{SDM}$, and the receive signal processing circuits 445-1 to 445-$N_{SDM}$ configured to perform processing of the frequency domain such as the OFDM modulation scheme are changed to the receive signal processing circuits 545-1 to 545-$N_{SDM}$ configured to perform processing of the time domain of single carrier transmission.

Thus, it is changed from performing the signal detection processing of the time domain of the digital baseband using the OFDM modulation scheme by the receive signal processing circuits 445-1 to 445-$N_{SDM}$, to performing the signal detection processing of the time domain of the digital baseband in single carrier transmission by the receive signal processing circuits 545-1 to 545-$N_{SDM}$. Signal processing of single carrier transmission performed by the receive signal processing circuits 545-1 to 545-$N_{SDM}$ is a common signal processing, and the signal such as a unique word assigned in advance of a signal that is subjected to modulation processing on the user data is detected, the signal detection processing is started at an appropriate timing, and the signal on the transmitting side is reproduced and output to the MAC layer processing circuit 68 side, although the details are omitted herein.

The signal processing performed by the single carrier compensation circuits 557-1 to 557-$N_{SDM}$ is as described above, which performs the compensation processing of the phase noise, and outputs a single carrier signal within the reduced effective bandwidth W″ from which the pilot signal has been removed to the receive signal processing circuits 545-1 to 545-$N_{SDM}$.

Note that, in the fifth embodiment as well, similar to the third embodiment, low noise amplifiers 852-1 to 852-$N_{Ant}$, antenna elements 851-1 to 851-$N_{Ant}$, or the like may be implemented individually for each signal sequence spatially multiplexed, and a subarray may be configured for each of the signal sequences. Furthermore, other features are the same as those described with respect to the third embodiment.

According to the wireless station apparatus 70 according to the fifth embodiment configured as described above, the same effects as those of the first embodiment can be obtained even in a configuration in which single carrier transmission is performed.

Sixth Embodiment

In the first to fifth embodiments, in the transmitters 71, 72a, 72b, and 74 of each of the wireless station apparatuses 70, the antenna elements 819-1 to 819-$N_{Ant}$, the high power amplifiers 818-1 to 818-$N_{Ant}$, and the like may be implemented individually for each signal sequence spatially multiplexed, and a subarray may be configured for each of the signal sequences. Similarly, in the receivers 75, 76a, 76b, and 78, the antenna elements 851-1 to 851-$N_{Ant}$, the low noise amplifiers 852-1 to 852-$N_{Ant}$, and the like may be implemented individually for each signal sequence spatially multiplexed, and a subarray may be configured for each of the signal sequences. In a case that the subarray antennas of the transmitters 71, 72a, 72b, and 74 and the receivers 75, 76a, 76b, and 78 are physically installed, for example, at positions separated by several m, each of the local oscillator 815 and the local oscillator 853 may be individually implemented, and different phase noises may be added between each of the subarrays.

Figure 16:
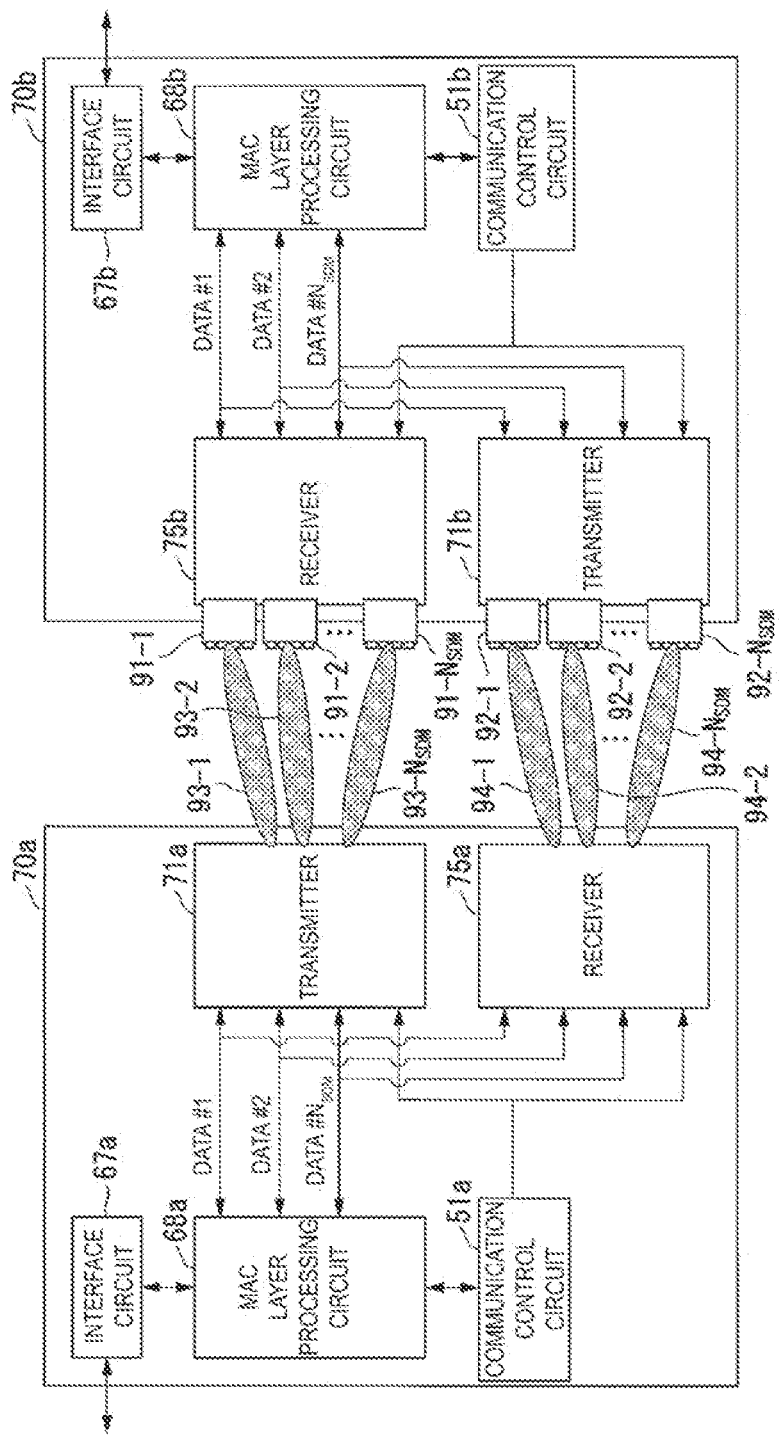
FIG. 16 is a diagram illustrating an overview of an opposing wireless station apparatus according to a sixth embodiment.
Figure 17:
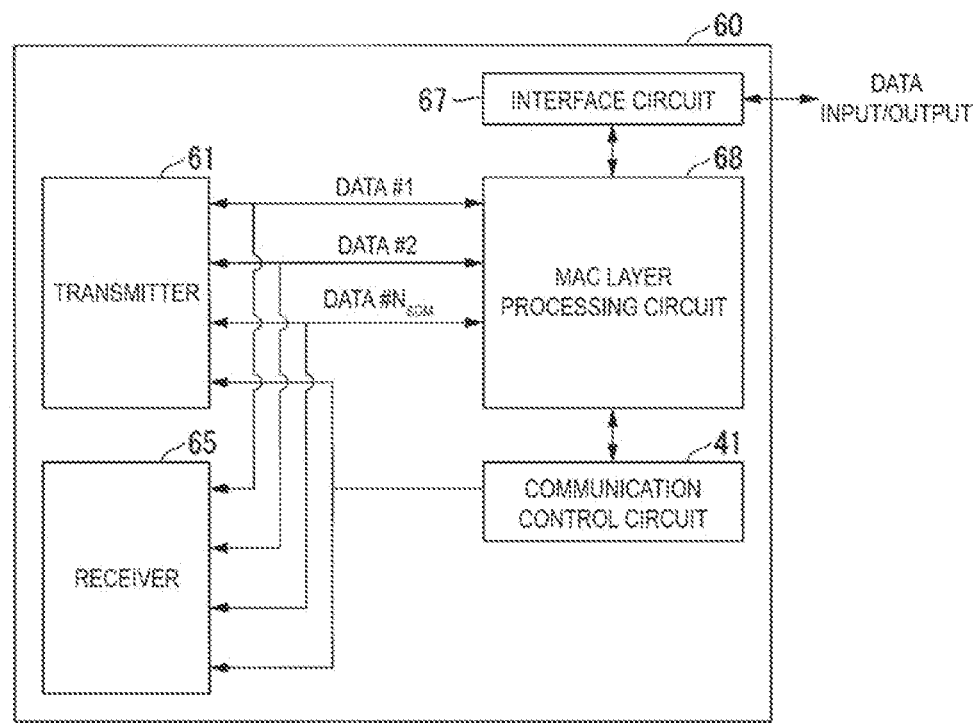
FIG. 17 is a diagram illustrating a circuit configuration of a wireless station apparatus of related art.

FIG. 16 is a diagram illustrating an overview of a counterpart wireless station apparatus 70 in the sixth embodiment. As illustrated in FIG. 16, the wireless station apparatuses 70a and 70b include transmitters 71a and 71b, receivers 75a and 75b, interface circuits 67a and 67b, MAC layer processing circuits 68a and 68b, and communication control circuits 51a and 51b. The wireless station apparatus 70b takes the subarray configuration as described above, and the transmitter 71b includes subarrays 92-1 to 92-$N_{SDM}$, and the receiver 75b includes subarrays 91-1 to 91-$N_{SDM}$. The wireless station apparatus 70a includes antennas used together without taking a subarray configuration, and forms transmit directivity beams 93-1 to 93-$N_{SDM}$ by multiplication of the transmission weight to face the subarrays 91-1 to 91-$N_{SDM}$, and forms receive directivity beams 94-1 to 94-$N_{SDM}$ similarly by multiplication of the reception weight to face the subarrays 92-1 to 92-$N_{SDM}$.

For example, as described with reference to the third embodiment, processing is performed in which transmit directivity beams 93-1 to 93-$N_{SDM}$ are formed in the synthesizers 671-1 to 671-$N_{Ant}$, the phase shifter groups 681-1 to 681-$N_{SDM}$, and the distributors 673-1 to 673-$N_{SDM}$ in the transmitter 72b of FIG. 8 corresponding to the transmitter 71a, and receive directivity beams 94-1 to 94-$N_{SDM}$ are formed in the distributors 672-1 to 672-$N_{Ant}$, the phase shifter groups 682-1 to 682-$N_{SDM}$, and the synthesizers 674-1 to 674-$N_{SDM}$ in the receiver 76b of FIG. 9 corresponding to the receiver 75a.

At this time, because the receiver 75a and 75b are applied with the local oscillator 815 and/or the local oscillator 853 different for each signal sequence to be spatially multiplexed, individual independent phase noises are added. At this time, for example, with the third embodiment as an example, the interference components are expected to be suppressed to some extent in the input signal to each of the extended FFT circuits 157-1 to 157-$N_{SDM}$ because the mutual signal separation is generally made by the above-described directivity formation. In this case, in a case where the above-described processing is performed individually on each of the extended FFT circuits 157-1 to 157-$N_{SDM}$, appropriate phase noise compensation can be performed in each signal sequence.

Similarly, even in a multi-user MIMO environment in which one base station apparatus performs spatial multiplex transmission with a plurality of terminal station apparatuses, the same phase noise compensation may be performed by each of the individual extended FFT circuits 157-1 to 157-$N_{SDM}$ because the mutual signal separation is generally made by the above-described directivity formation. Here, in a case that the number of users of the multi-user MIMO is two, it is possible to operate to further reduce the mutual interference by allocating one of the pilot signals at both ends of the effective bandwidth W to the user #1, and the other to the user #2. Otherwise, while taking a subarray configuration, in a case that the local oscillator 815 and/or the local oscillator 853 are used together between subarrays, it is expected that the phase noise added to each signal sequence will be completely equivalent phase noise. In FIG. 1, a method of placing a pilot signal on both ends of the effective bandwidth W and averaging information obtained from a plurality of pilot signals to increase the extraction accuracy of the phase noise is as described above, but similar averaging processing can be performed across the extended FFT circuits 157-1 to 157-$N_{SDM}$. In this case, signal lines are required to exchange the mutual information between the extended FFT circuits 157-1 to 157-$N_{SDM}$.

In this way, the embodiments of the present invention can be applied even in a case of taking a subarray configuration or a case of performing multi-user MIMO transmission in addition to single user MIMO.

Although the embodiments of the present invention have been described above with reference to the drawings, it is clear that the above embodiments are merely examples of the present invention, and the present invention is not limited to the embodiments described above. For example, in the descriptions of the embodiments of the present invention, the apparatus configurations and signal processing are mainly described assuming the OFDM modulation scheme, the single carrier transmission scheme, the SC-FDE scheme, and the like, but in order to apply other schemes, an apparatus configuration of the scheme according to related art may be reflected in the embodiments of the present invention. Although the present invention has been described in the context of a general Point-to-Point type of spatial multiplex transmission without clearly expressing in the present invention, the same discussion holds true even in a case of a Point-to-Multipoint type of communication configuration equipped with a plurality of wireless station apparatuses. Furthermore, at this time, the configuration can also be extended to a configuration in which communication is performed concurrently in parallel with a plurality of wireless station apparatuses by the multi-user MIMO transmission.

The processing of the assignment on the transmitting side of the pilot signal used in the embodiment of the present invention may be achieved by separately adding the information (sampling data) in the time domain of the pilot signal stored in the memory to the transmit signal generated by any section. In a case that signal processing in the frequency domain is involved on the transmitting side, such as an OFDM modulation scheme, an SC-FDE scheme, or the like, it can be managed by allocating the components of the pilot signals in the frequency domain, and collectively generating the pilot signals. In this sense, the pilot signal is essentially assigned to the transmit signal, and the manner in which the pilot signal is assigned can be achieved by various variations.

While terms such as frequency domain, time domain, time axis, and the like are used herein. the digital sampling data can be converted into signals of a plurality of frequency components or subcarriers by FFT processing performed when applying an OFDM modulation scheme or a SC-FDE scheme, for example, and the signal of each frequency component or each subcarrier is referred to herein as the signal in the frequency domain (or frequency axis). In contrast to this, the digital sampling data is a signal of time sequence, which is referred to as a signal in the time domain (or time axis), and in this sense, because the analog signal is a temporally continuous signal, and the rotation processing of the complex phase performed by the phase shifter, for example, in the third embodiment or the like, corresponds to signal processing in the time domain. Basically, signal processing in the time domain does not require FFT processing unlike the signal processing in the frequency domain, and thus basically has a feature of being easy to avoid the problem of signal leakage to adjacent frequency components. Thus, even in a case where other signal processing of the time domain not described herein may be added additionally, the present invention can be operated without any influence.

Here, the descriptions have been made mainly of the embodiments provided with a plurality of antenna elements, assuming a case that phase noise compensation is performed for spatial multiplex transmissions that cannot be managed by the known background arts. However, the essence of the present invention is a feature that a pilot signal in the band (the feature is not to allocate signal in the frequency domain around the pilot signal) is assigned on the transmitting side, a replica of phase noise is generated on the receiving side by using the pilot signal and the frequency components around the pilot signal, and the phase noise is removed from the receive signal by using these, as illustrated in FIG. 25. In this sense, it is not necessary to use a plurality of antenna elements, and even in a case that spatial multiplex transmission is not used, phase noise compensation can be performed by the application of the present invention. At this time, in the embodiments of the present invention, the pilot signal is disposed at both ends of the effective bandwidth, but this is in order to actively utilize the guard band originally with no signal allocation, and the pilot signal is not necessary disposed at both ends of the effective bandwidth, but it is possible to allocate a pilot signal to any location within the band. Further, although an example of assigning two pilot signals is illustrated in the embodiments of the present invention, it is possible to utilize only one or three or more of the pilot signals. In particular, in a case that a plurality of wireless stations and one wireless station (base station apparatus) perform spatial multiplex transmissions at the same time, or in a case that a wireless station using a subarray configuration performs spatial multiplex transmission between subarrays, a configuration may be adopted in which each of the signal sequences with independent phase noise is allocated an individual pilot subcarrier, and the wireless stations other than the wireless station does not perform signal transmission to the pilot subcarrier. In this case, phase noise compensation is performed individually for each signal sequence corresponding to the individual wireless stations or subarrays on the receiving station side. Thus, it is also within the scope of the present invention to appropriately modify and implement the individual parameters described in the embodiments of the present invention.

Thus, addition, omission, substitution, and other modifications of the constituent components may be made without departing from the spirit and scope of the present invention.

REFERENCE SIGNS LIST 51, 51a, 51b, 52, 53 Communication control circuit
60 Wireless station apparatus
61, 62 Transmitter
65, 66 Receiver
67, 67a, 67b Interface circuit
68, 68a, 68b MAC layer processing circuit
70 Wireless station apparatus
71, 71a, 71b, 72a, 72b, 74 Transmitter
75, 75a, 75b, 76a, 76b, 78 Receiver
157-1 to 157-$N_{SDM}$ Extended FFT circuit
181 Replication circuit
182 FFT circuit
183 Function $\Phi$ (t) acquisition circuit
184 IFFT circuit
185 Phase noise compensation circuit
186 Pilot signal removal circuit
187 IFFT circuit
189 Phase noise compensation circuit
191 Extended FFT circuit
193 $\gamma_k$ setting circuit
194 Distance L setting circuit
195 Function $\psi$ (t) acquisition circuit
196 Function $\Phi$ (t) acquisition circuit
192 Single carrier compensation circuit
254-1 to 254-$N_{SDM}$ Mixer
255-1 to 255-$N_{SDM}$ Filter
256-1 to 256-$N_{SDM}$ A/D (analog to digital) converter
257-1 to 257-$N_{SDM}$ FFT circuit
311-1 to 311-$N_{SDM}$ Transmit signal processing circuit
313-1 to 313-$N_{SDM}$ IFFT & GI assigning circuit
314-1 to 314-$N_{SDM}$ D/A converter 316-1 to 316-$N_{SDM}$ Mixer
317-1 to 317-$N_{SDM}$ Filter
320-1 to 320-$N_{Ant}$ Adder
321 Pilot signal storage circuit
345-1 to 345-$N_{SDM}$ Receive signal processing circuit
357-1 to 357-$N_{Ant}$ Extended FFT circuit
411-1 to 411-$N_{SDM}$ Transmit signal processing circuit
414-1 to 414-$N_{SDM}$ D/A converter
420-1 to 420-$N_{SDM}$ Adder
445-1 to 445-$N_{SDM}$ Receive signal processing circuit
511-1 to 511-$N_{SDM}$ Transmit signal processing circuit
642 Time axis transmission weight calculation circuit
657 Time axis reception weight calculation circuit
671-1 to 671-$N_{Ant}$ Synthesizer
672-1 to 672-$N_{Ant}$ Distributor
673-1 to 673-$N_{SDM}$ Distributor
674-1 to 674-$N_{SDM}$ Synthesizer
678 Phase control circuit
681-1 to 681-$N_{SDM}$ Phase shifter group
682-1 to 682-$N_{SDM}$ Phase shifter group
688 Phase control circuit
740 Transmission weight processing unit
741 Channel information acquisition circuit
742 Channel information storage circuit
743 Transmission weight calculation circuit
744 Reception weight processing unit
746 Channel information estimation circuit
747 Reception weight calculation circuit
755-1 to 755-$N_{SDM}$ Time axis reception weight multiplication circuit
757 Time axis transmission weight calculation circuit
761-1 to 761-$N_{SDM}$ Time axis transmission weight multiplication circuit
812-1 to 812-$N_{Ant}$ Addition synthesis circuit
813-1 to 813-$N_{Ant}$ IFFT & GI assigning circuit
814-1 to 814-$N_{Ant}$ D/A converter
815 Local oscillator
816-1 to 816-$N_{Ant}$ Mixer
817-1 to 817-$N_{Ant}$ Filter
818-1 to 818-$N_{Ant}$ High power amplifier (HPA)
819-1 to 819-$N_{Ant}$ Antenna element
840 Transmission weight processing unit
841 Channel information acquisition circuit
842 Channel information storage circuit
843 Transmission weight calculation circuit
844 Reception weight processing unit
846 Channel information estimation circuit
847 Reception weight calculation circuit
851-1 to 851-$N_{Ant}$ Antenna element
852-1 to 852-$N_{Ant}$ Low noise amplifier (LNA)
853 Local oscillator
854-1 to 854-$N_{Ant}$ Mixer
855-1 to 855-$N_{Ant}$ Filter
856-1 to 856-$N_{Ant}$ A/D (analog to digital) converter
857-1 to 857-$N_{Ant}$ FFT circuit
887 Local oscillator

The invention claimed is:

1. A wireless communication apparatus in a wireless communication system including a first wireless communication apparatus and a second wireless communication apparatus,
the first wireless communication apparatus comprising:
a processor; and
a storage medium having computer program instructions stored thereon, when executed by the processor, perform to:
generate a transmit signal including information to be transmitted in a region or a portion of the region excluding an empty region within an effective bandwidth, the empty region being a predetermined frequency region within the effective bandwidth;
generate a pilot signal without an effective signal component at least in an adjacent frequency component to a predetermined frequency component within the effective bandwidth and assign the pilot signal to the transmit signal; and
transmit the transmit signal including the pilot signal generated by the pilot signal assigning section at a wireless frequency, and
the second wireless communication apparatus comprising:
a processor; and
a storage medium having computer program instructions stored thereon, when executed by the processor, perform to:
receive a signal of the wireless frequency;
convert the received signal received by the reception section or a frequency-converted signal obtained by frequency conversion of the received signal from a sampling signal in a time domain to a signal in a frequency domain;
set an approximate value L' of a distance between the second wireless communication apparatus and the first wireless communication apparatus;
calculate a coefficient γk given by Equation (1) below for the approximate value L' of the distance, an effective bandwidth W, a speed of light c, a number of FFT points NFFT, and a frequency component number k;
extract, a signal in a frequency domain including a frequency component of the pilot signal and a plurality of peripheral frequency components including at least adjacent frequency components of the pilot signal, and generate a replica of phase noise, based on a coefficient for each frequency component of the extracted signal and the coefficient γk;
generate a phase noise compensated sampling signal by using the replica of the phase noise and the sampling signal in the time domain or a sampling signal modified based on the sampling signal in the time domain; and
reproduce data transmitted by the first wireless communication apparatus, based on an output signal from the phase noise compensation section

[Math. 1]

$$\gamma_k = e^{2\pi j \times \frac{L'W}{c} \times \frac{k}{N_{FFT}}}. \quad (1)$$

2. The wireless communication apparatus according to claim 1, wherein the computer program instructions further perform to
allocate a subcarrier for a pilot signal to frequency components of both ends or to a frequency component of either end of the effective bandwidth, and set a neighboring subcarrier including an adjacent subcarrier as an empty subcarrier.

3. The wireless communication apparatus according to claim 1, wherein the first wireless communication apparatus includes:
a memory that stores sampling data of a length of one cycle or an integer multiple times of the cycle of a sine wave signal of a predetermined frequency or a synthesized signal of a plurality of sine wave signals of predetermined frequencies; and wherein the computer program instructions further perform to output continuous time domain signals of the pilot signal by repeatedly reading the sampling data from the memory at predetermined intervals.

4. The wireless communication apparatus according to claim 1, wherein the computer program instructions further perform to generate sampling data at a time t by following Equation (2) or sampling data given by an inverse of Equation (2) as a replica of phase noise, based on a coefficient βk of the pilot signal of a k-th frequency component and a coefficient βk+k' of a (k+k')-th frequency component, for a positive integer NPN greater than or equal to 1 and an integer k' which satisfies −NPN≤k'≤NPN

[Math. 2]

$$\Phi_k(t) = \left( \sum_{k'=-N_{PS}}^{N_{PS}} \frac{\alpha_{k+k'}}{\alpha_k} \times \gamma_{k+k'} e^{2\pi jk'\Delta ft} \right)^{-1}. \quad (2)$$

5. The wireless communication apparatus according to claim 1, wherein the computer program instructions further perform to generate sampling data at a time t by following Equations (3) and (4) or sampling data given by an inverse of Equation (4) as a replica of phase noise, based on a coefficient βk of the pilot signal of a k-th frequency component and a coefficient βk+k' of a (k+k')-th frequency component, for a positive integer NPN greater than or equal to 1 and an integer k' which satisfies −NPN≤k'≤NPN

[Math. 3]

$$\Psi_k(t) \approx \sum_{k'=-N_{PS}}^{N_{PS}} \beta_{k+k'} \times \gamma_{k+k'} e^{2\pi j(f_k + k'\Delta f)t} \quad (3)$$

[Math. 4]

$$\Phi_k(t)^{-1} = \Psi_k(t) \times \frac{1}{\beta_k} e^{-2\pi jf_k t}. \quad (4)$$

6. The wireless communication apparatus according to claim 1, wherein the computer program instructions further perform to remove the pilot signal and predetermined frequency components around the pilot signal from a receive signal.

7. A wireless communication method performed by a wireless communication apparatus in a wireless communication system including a first wireless communication apparatus and a second wireless communication apparatus, the wireless communication method comprising:

generating, by the first wireless communication apparatus, a transmit signal including information to be transmitted in a region or a portion of the region excluding an empty region within an effective bandwidth, the empty region being a predetermined frequency region within the effective bandwidth;

generating, by the first wireless communication apparatus, a pilot signal without an effective signal component at least in an adjacent frequency component to a predetermined frequency component within the effective bandwidth and assigning the pilot signal to the transmit signal generated by the generating of the transmit signal;

transmitting, by the first wireless communication apparatus, the transmit signal including the pilot signal generated by the assigning of the pilot signal at a wireless frequency;

receiving, by the second wireless communication apparatus, a signal of the wireless frequency;

converting, by the second wireless communication apparatus, the received signal received by the receiving or a frequency-converted signal obtained by frequency conversion of the received signal from a sampling signal in a time domain to a signal in a frequency domain;

setting, by the second wireless communication apparatus, an approximate value L' of a distance between the second wireless communication apparatus and the first wireless communication apparatus;

calculating, by the second wireless communication apparatus, a coefficient γk given by Equation (5) below for the approximate value L' of the distance, an effective bandwidth W, a speed of light c, a number of FFT points NFFT of the time/frequency conversion section, and a frequency component number k;

extracting, by the second wireless communication apparatus, from an output in the converting of the signal, a signal in a frequency domain including a frequency component of the pilot signal and a plurality of peripheral frequency components including at least adjacent frequency components of the pilot signal, and generating a replica of phase noise, based on a coefficient for each frequency component of the extracted signal and the coefficient γk;

generating, by the second wireless communication apparatus, a phase noise compensated sampling signal by using the replica of the phase noise and the sampling signal in the time domain or a sampling signal modified based on the sampling signal in the time domain; and reproducing, by the second wireless communication apparatus, data transmitted by the first wireless communication apparatus, based on an output signal in the compensating of the phase noise

[Math. 5]

$$\gamma_k = e^{2\pi j \times \frac{L'W}{c} \times \frac{k}{N_{FFT}}}. \quad (5)$$

* * * * *